US012811785B2

(12) United States Patent
Saito

(10) Patent No.: US 12,811,785 B2
(45) Date of Patent: Nov. 24, 2026

(54) COMMUNICATION SYSTEM, ILLUMINATION SYSTEM, AND COMMUNICATION METHOD

(71) Applicant: Japan Display Inc., Tokyo (JP)

(72) Inventor: Hitoshi Saito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/173,504

(22) Filed: Apr. 8, 2025

(65) Prior Publication Data

US 2025/0240158 A1 Jul. 24, 2025

Related U.S. Application Data

(63) Continuation of application No. PCT/JP2023/034404, filed on Sep. 22, 2023.

(30) Foreign Application Priority Data

Oct. 11, 2022 (JP) ................................ 2022-163223

(51) Int. Cl.
*H04L 9/08* (2006.01)

(52) U.S. Cl.
CPC .................................... *H04L 9/088* (2013.01)

(58) Field of Classification Search
CPC ........ H04L 9/32; H04W 12/50; H04W 76/30; H04W 84/10
See application file for complete search history.

(56) References Cited

U.S. PATENT DOCUMENTS

| | | | | |
|---|---|---|---|---|
| 8,776,562 | B2 * | 7/2014 | Tong | E05B 17/0004 70/442 |
| 10,341,104 | B2 * | 7/2019 | Moon | H04L 63/0457 |
| 2009/0222659 | A1 * | 9/2009 | Miyabayashi | H04L 9/3239 713/175 |
| 2015/0200917 | A1 * | 7/2015 | Fujii | G06F 21/602 713/171 |
| 2015/0341178 | A1 * | 11/2015 | Tanaka | H04L 9/0822 713/156 |

(Continued)

FOREIGN PATENT DOCUMENTS

| | | | |
|---|---|---|---|
| JP | 2012209758 | A | 10/2012 |
| JP | 5119791 | B2 | 1/2013 |
| JP | 2015211322 | A | 11/2015 |

OTHER PUBLICATIONS

International Search Report from International Patent Application No. PCT/JP2023/034404, mailed Nov. 7, 2023. 6 pages.

*Primary Examiner* — Beemnet W Dada
(74) *Attorney, Agent, or Firm* — K&L Gates LLP

(57) ABSTRACT

A communication system is configured to transmit and receive control data between a master device and a slave device. the slave device generates a first key code and a first security code. in first processing after communication connection between the slave device and the master device is established, the master device received the first key code and the first security code from the slave device, and retains the first key code as a second key code and retains the first security code as a second security code. And in second processing after the first processing, the slave device terminates the communication connection with the master device in a case where a first code generated by the slave device and a second code received from the master device do not match.

20 Claims, 44 Drawing Sheets

(56) References Cited

U.S. PATENT DOCUMENTS

| | | | | |
|---|---|---|---|---|
| 2020/0044838 | A1* | 2/2020 | Yoo | G06F 21/62 |
| 2021/0281399 | A1* | 9/2021 | Michael | G06F 21/606 |
| 2022/0407845 | A1* | 12/2022 | El Soussi | H04L 63/0428 |

* cited by examiner

FIG. 8A

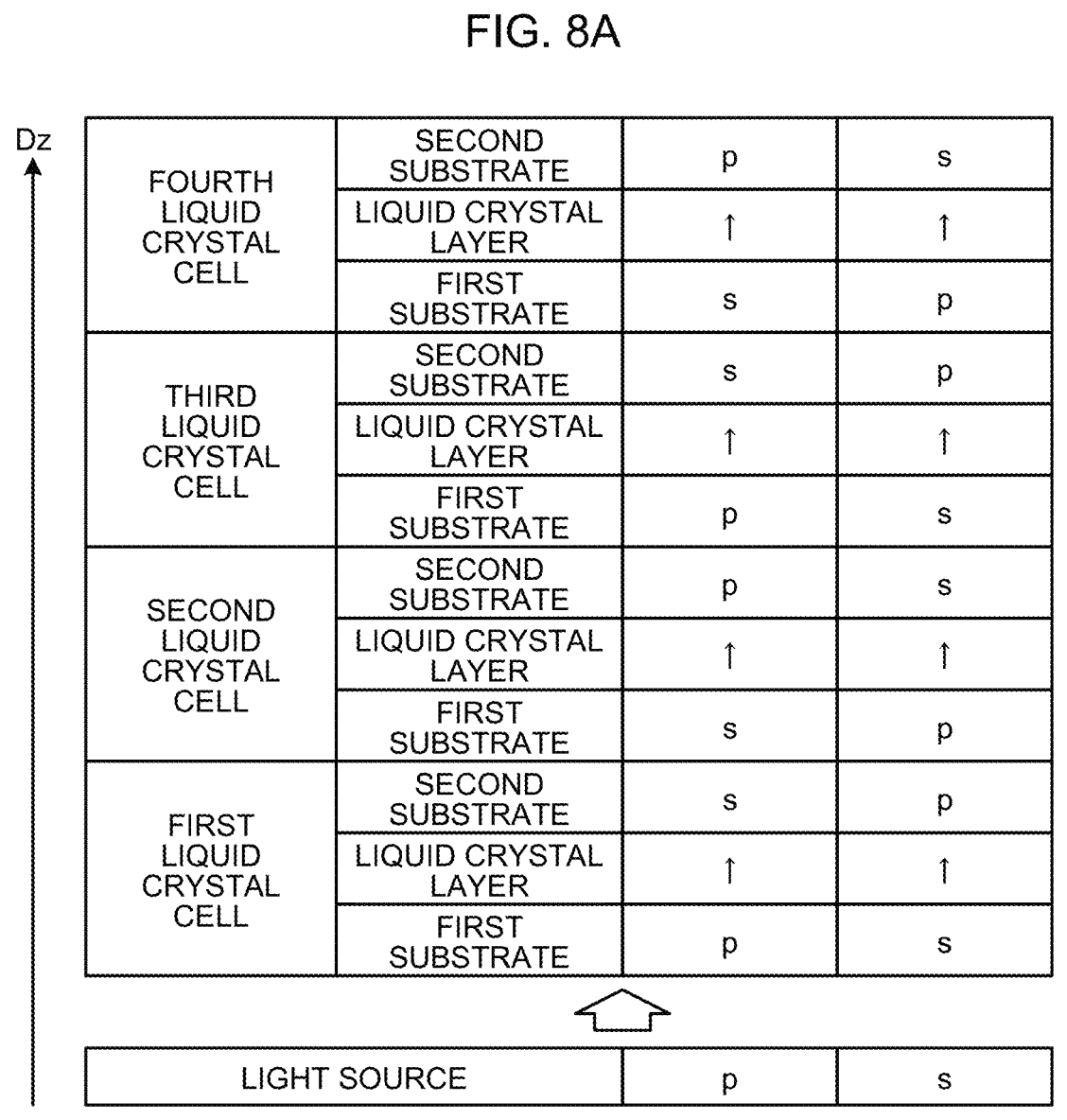

Dz ↑

| | | | |
|---|---|---|---|
| FOURTH LIQUID CRYSTAL CELL | SECOND SUBSTRATE | p | s |
| | LIQUID CRYSTAL LAYER | ↑ | ↑ |
| | FIRST SUBSTRATE | s | p |
| THIRD LIQUID CRYSTAL CELL | SECOND SUBSTRATE | s | p |
| | LIQUID CRYSTAL LAYER | ↑ | ↑ |
| | FIRST SUBSTRATE | p | s |
| SECOND LIQUID CRYSTAL CELL | SECOND SUBSTRATE | p | s |
| | LIQUID CRYSTAL LAYER | ↑ | ↑ |
| | FIRST SUBSTRATE | s | p |
| FIRST LIQUID CRYSTAL CELL | SECOND SUBSTRATE | s | p |
| | LIQUID CRYSTAL LAYER | ↑ | ↑ |
| | FIRST SUBSTRATE | p | s |

⇧

| | | |
|---|---|---|
| LIGHT SOURCE | p | s |

FIG. 8C

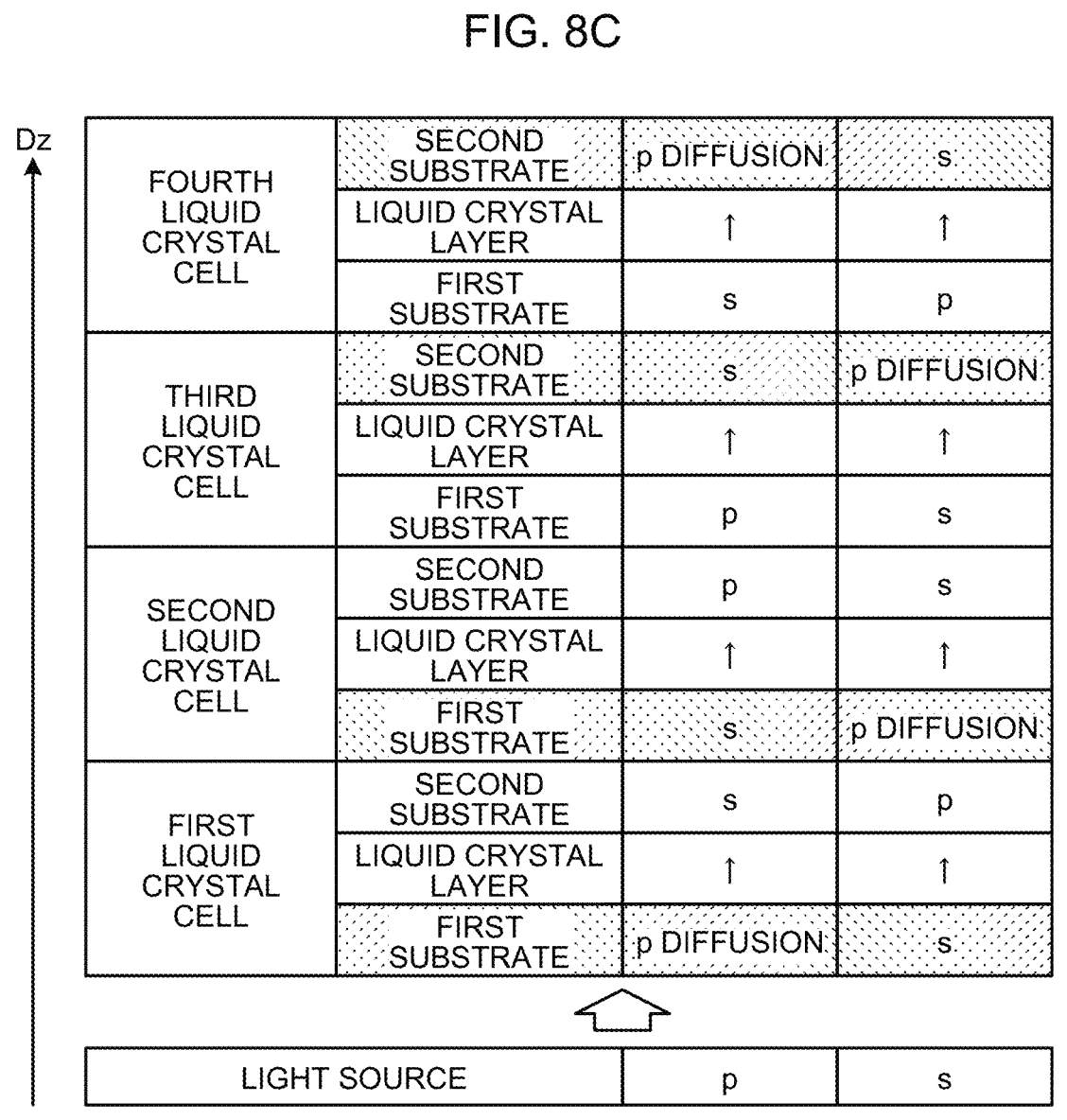

Dz ↑

| | | | |
|---|---|---|---|
| FOURTH LIQUID CRYSTAL CELL | SECOND SUBSTRATE | p DIFFUSION | s |
| | LIQUID CRYSTAL LAYER | ↑ | ↑ |
| | FIRST SUBSTRATE | s | p |
| THIRD LIQUID CRYSTAL CELL | SECOND SUBSTRATE | s | p DIFFUSION |
| | LIQUID CRYSTAL LAYER | ↑ | ↑ |
| | FIRST SUBSTRATE | p | s |
| SECOND LIQUID CRYSTAL CELL | SECOND SUBSTRATE | p | s |
| | LIQUID CRYSTAL LAYER | ↑ | ↑ |
| | FIRST SUBSTRATE | s | p DIFFUSION |
| FIRST LIQUID CRYSTAL CELL | SECOND SUBSTRATE | s | p |
| | LIQUID CRYSTAL LAYER | ↑ | ↑ |
| | FIRST SUBSTRATE | p DIFFUSION | s |

⇧

| | | |
|---|---|---|
| LIGHT SOURCE | p | s |

FIG. 21C

51

| β \ α | **1** | **2** | **3** | **4** | 5 | 6 |
|---|---|---|---|---|---|---|
| **7** | **12** | 34 | 56 | 78 | 9A | BC |
| **8** | DE | **EF** | FE | ED | CB | A9 |
| **9** | 87 | 65 | **43** | 21 | 13 | 57 |
| **A** | 9B | DE | 24 | **68** | AC | EF |
| B | 14 | 58 | 9C | DF | 23 | 67 |
| C | AB | EE | 1E | 3F | 5E | 7C |

FIG. 21D

51

| β \ α | **001** | **002** | **003** | **004** | ⋯ | 0FF |
|---|---|---|---|---|---|---|
| **100** | **12** | 34 | 56 | 78 | ⋯ | BC |
| **101** | DE | **EF** | FE | ED | ⋯ | A9 |
| **102** | 87 | 65 | **43** | 21 | ⋯ | 57 |
| **103** | 9B | DE | 24 | **68** | ⋯ | EF |
| ⋮ | ⋮ | ⋮ | ⋮ | ⋮ | ⋮ | ⋮ |
| 1FE | AB | EE | 1E | 3F | ⋯ | 7C |

FIG. 22C

61

| β \ α | 1 | 2 | 3 | 4 | 5 | 6 |
|---|---|---|---|---|---|---|
| 7 | 12 | 34 | 56 | 78 | 9A | BC |
| 8 | DE | EF | FE | ED | CB | A9 |
| 9 | 87 | 65 | 43 | 21 | 13 | 57 |
| A | 9B | DE | 24 | 68 | AC | EF |
| B | 14 | 58 | 9C | DF | 23 | 67 |
| C | AB | EE | 1E | 3F | 5E | 7C |

FIG. 22D

61

| β \ α | 001 | 002 | 003 | 004 | ··· | 0FF |
|---|---|---|---|---|---|---|
| 100 | 12 | 34 | 56 | 78 | ··· | BC |
| 101 | DE | EF | FE | ED | ··· | A9 |
| 102 | 87 | 65 | 43 | 21 | ··· | 57 |
| 103 | 9B | DE | 24 | 68 | ··· | EF |
| ⋮ | ⋮ | ⋮ | ⋮ | ⋮ | ⋮ | ⋮ |
| 1FE | AB | EE | 1E | 3F | ··· | 7C |

FIG. 26A

61

| β \ α | **1** | **2** | **3** | **4** | 5 | 6 |
|---|---|---|---|---|---|---|
| **7** | **12** | 34 | 56 | 78 | 9A | BC |
| **8** | DE | **EF** | FE | ED | CB | A9 |
| **9** | 87 | 65 | **43** | 21 | 13 | 57 |
| **A** | 9B | DE | 24 | **68** | AC | EF |
| B | 14 | 58 | 9C | DF | 23 | 67 |
| C | AB | EE | 1E | 3F | 5E | 7C |

FIG. 26B

| | | | |
|---|---|---|---|
| **17** | **28** | **39** | **4A** |

FIG. 26E

51

| β \ α | **1** | **2** | **3** | **4** | 5 | 6 |
|---|---|---|---|---|---|---|
| **7** | **12** | 34 | 56 | 78 | 9A | BC |
| **8** | DE | **EF** | FE | ED | CB | A9 |
| **9** | 87 | 65 | **43** | 21 | 13 | 57 |
| **A** | 9B | DE | 24 | **68** | AC | EF |
| B | 14 | 58 | 9C | DF | 23 | 67 |
| C | AB | EE | 1E | 3F | 5E | 7C |

FIG. 26F

| | | | |
|---|---|---|---|
| **12** | **EF** | **43** | **68** |

COMMUNICATION SYSTEM, ILLUMINATION SYSTEM, AND COMMUNICATION METHOD

CROSS-REFERENCE TO RELATED APPLICATION

This application claims the benefit of priority from Japanese Patent Application No. 2022-163223 filed on Oct. 11, 2022 and International Patent Application No. PCT/JP2023/034404 filed on Sep. 22, 2023, the entire contents of which are incorporated herein by reference.

BACKGROUND

1. Technical Field

The present disclosure relates to a communication system, an illumination system, and a communication method.

2. Description of the Related Art

Conventionally, for example, an illumination system has been disclosed in which an illumination device having received a predetermined key operation from a remote controller device transmits identification information of the own device to the remote controller device, and in a case where control information including the identification information of the own device is received from the remote controller device, the illumination device performs operation (for example, lighting) in accordance with the control information (refer to Japanese Patent No. 5119791, for example). In addition, for example, a wireless communication system has been disclosed in which connection with a user device having transmitted a pairing signal in a duration other than an effective pairing duration is not performed to lower the probability of connection with an unexpected user device, thereby achieving secure connection (refer to Japanese Patent Application Laid-open Publication No. 2012-209758 (JP-A-2012-209758), for example). Moreover, for example, a wireless communication system has been disclosed in which connection control for Bluetooth (registered trademark) communication is performed between a master device and a slave device, and specifically, when having received an operation signal during pairing, the slave device transmits a security number to the master device and then data indicating the security number and control contents is communicated, which makes it possible to easily achieve pairing with high security (refer to Japanese Patent Application Laid-open Publication No. 2015-211322 (JP-A-2015-211322), for example).

In Japanese Patent No. 5119791 described above, when registering the identification information of the illumination device to the remote controller device, the user needs to perform a predetermined key operation different from normal operations. In JP-A-2012-209758 described above, wireless communication using Bluetooth (registered trademark) is assumed and adaptation to other communication standards is not considered. In JP-A-2015-211322 described above, since the security number (S/ID) of the slave device is transmitted to the master device that executes pairing, exclusive communication may not always be achieved.

For the foregoing reasons, there is a need for providing a communication system, an illumination system, and a communication method capable of implementing a secure communication connection environment without depending on communication platforms and user operations.

SUMMARY

According to an aspect, a communication system includes a slave device, and a master device configured to control the slave device. The communication system is configured to transmit and receive control data between the master device and the slave device. The slave device generates a first key code and a first security code in which a plurality of random number data corresponding to respective address data are assigned. In first processing after communication connection between the slave device and the master device is established, the slave device transmits the first key code and the first security code to the master device, and the master device retains the first key code as a second key code and retains the first security code as a second security code. In second processing after the first processing, the master device transmits an address code and a second code to the slave device, the address code is generated based on the second security code, the second code is generated based on the address code and the second key code. And the slave device terminates the communication connection with the master device in a case where a first code and the second code received from the master device do not match, the first code is generated based on the address code, the first key code, and the first security code.

According to another aspect, an illumination system includes a light source, an illumination device, and a control device. The illumination device is provided on an optical axis of the light source and including an optical element capable of setting a light distribution state of light emitted from the light source. The control device is capable of changing the light distribution state. And the illumination device generates a first key code and a first security code in which a plurality of random number data corresponding to respective address data are assigned.

In first processing after communication connection between the illumination device and the control device is established, the illumination device transmits the first key code and the first security code to the control device. And the control device retains the first key code as a second key code and retains the first security code as a second security code. In second processing after the first processing, the control device transmits an address code and a second code to the illumination device, the address code is generated based on the second security code, the second code is generated based on the address code and the second key code. And the illumination device terminates the communication connection with the control device in a case where a first code and the second code received from the control device do not match, the first code is generated based on the address code, the first key code, and the first security code.

BRIEF DESCRIPTION OF THE DRAWINGS

FIG. 8A is a conceptual diagram for describing light shape change through the optical element according to the embodiment;

FIG. 8C is a conceptual diagram for describing light shape change through the optical element according to the embodiment;

FIG. 21C is a first schematic diagram of security code (A) stored in the first storage of the slave device;

FIG. 21D is a second schematic diagram of security code (A) stored in the first storage of the slave device;

FIG. 22C is a first schematic diagram of security code (B) stored in the second storage of the master device;

FIG. 22D is a second schematic diagram of security code (B) stored in the second storage of the master device;

FIG. 26A is a schematic diagram of security code (B) stored in the second storage of the master device;

FIG. 26B is a schematic diagram of an address code in which address data selected from security code (B) is arranged in the selection order;

FIG. 26E is a schematic diagram of security code (A) stored in the first storage of the slave device;

FIG. 26F is a schematic diagram of selected security code (A) in which random number data extracted from security code (A) is arranged in the order of received address data;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those that are identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1A:
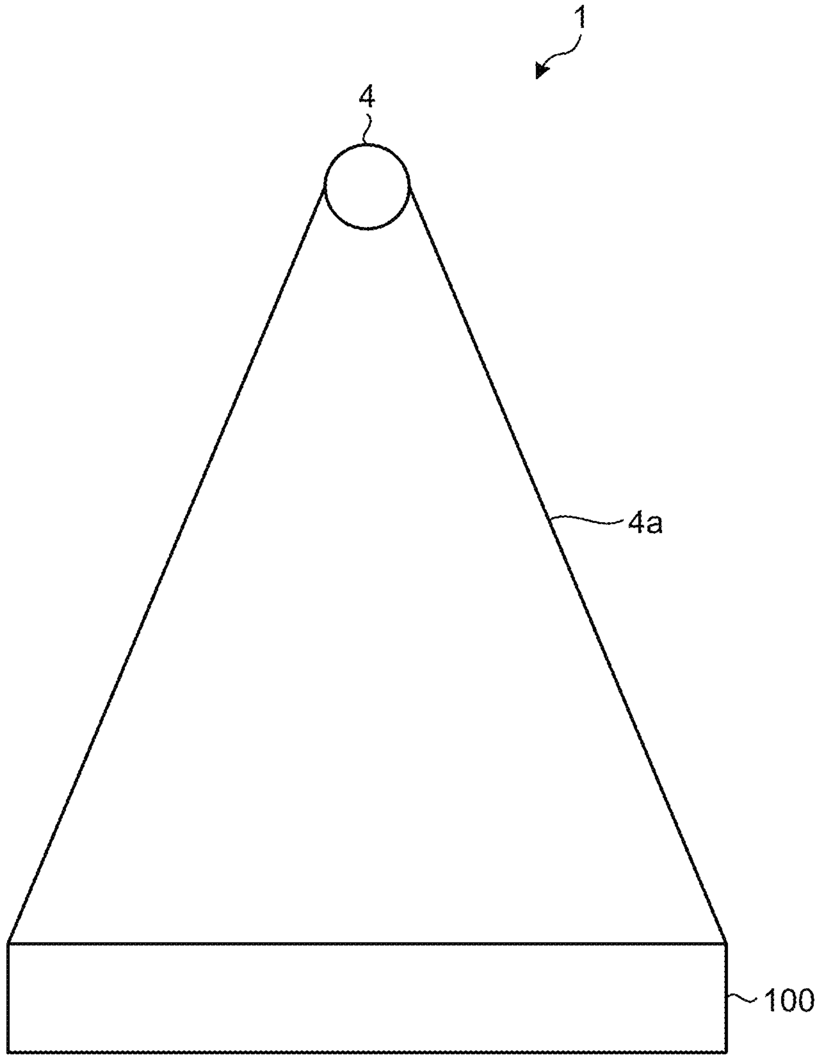
FIG. 1A is a side view illustrating an example of an illumination device according to an embodiment.
Figure 1B:
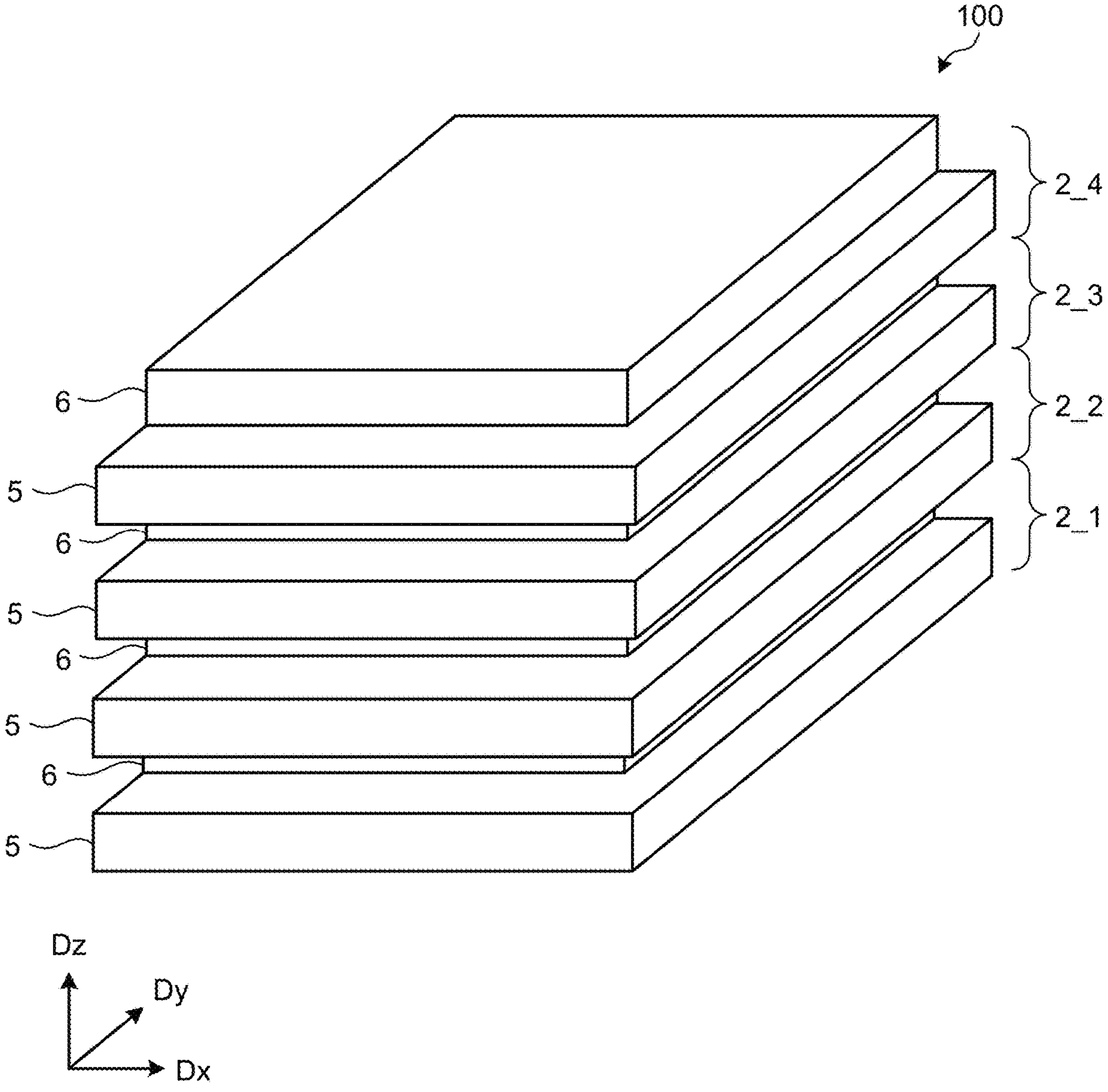
FIG. 1B is a perspective view illustrating an example of an optical element according to the embodiment.

FIG. 1A is a side view illustrating an example of an illumination device 1 according to an embodiment. FIG. 1B is a perspective view illustrating an example of an optical element 100 according to the embodiment. As illustrated in FIG. 1A, the illumination device 1 includes a light source 4, a reflector 4*a*, and an optical element 100. As illustrated in FIG. 1B, the optical element 100 includes a first liquid crystal cell 2_1, a second liquid crystal cell 2_2, a third liquid crystal cell 2_3, and a fourth liquid crystal cell 2_4. The light source 4 is constituted by, for example, a light emitting diode (LED). The reflector 4*a* is a component that condenses light from the light source 4 to the optical element 100.

In FIG. 1B, a Dz direction indicates the emission direction of light from the light source 4 and the reflector 4*a*. The optical element 100 has a configuration in which the first liquid crystal cell 2_1, the second liquid crystal cell 2_2, the third liquid crystal cell 2_3, and the fourth liquid crystal cell 2_4 are stacked in the Dz direction. In the present disclosure, the optical element 100 has a configuration in which the first liquid crystal cell 2_1, the second liquid crystal cell 2_2, the third liquid crystal cell 2_3, and the fourth liquid crystal cell 2_4 are sequentially stacked from the light source 4 side (lower side in FIG. 1B). In FIG. 1B, one direction of a plane orthogonal to the Dz direction and parallel to stacking surfaces of the first liquid crystal cell 2_1, the second liquid crystal cell 2_2, the third liquid crystal cell 2_3, and the fourth liquid crystal cell 2_4 is set as a Dx direction (first direction), and a direction orthogonal to both the Dx direction and the Dz direction is set as a Dy direction (second direction).

The first liquid crystal cell 2_1, the second liquid crystal cell 2_2, the third liquid crystal cell 2_3, and the fourth liquid crystal cell 2_4 each have the same configuration. In the present disclosure, the first liquid crystal cell 2_1 and the fourth liquid crystal cell 2_4 are liquid crystal cells for p-wave polarization. The second liquid crystal cell 2_2 and the third liquid crystal cell 2_3 are liquid crystal cells for s-wave polarization. Hereinafter, the first liquid crystal cell 2_1, the second liquid crystal cell 2_2, the third liquid crystal cell 2_3, and the fourth liquid crystal cell 2_4 are also collectively referred to as "liquid crystal cells 2".

Figure 2:
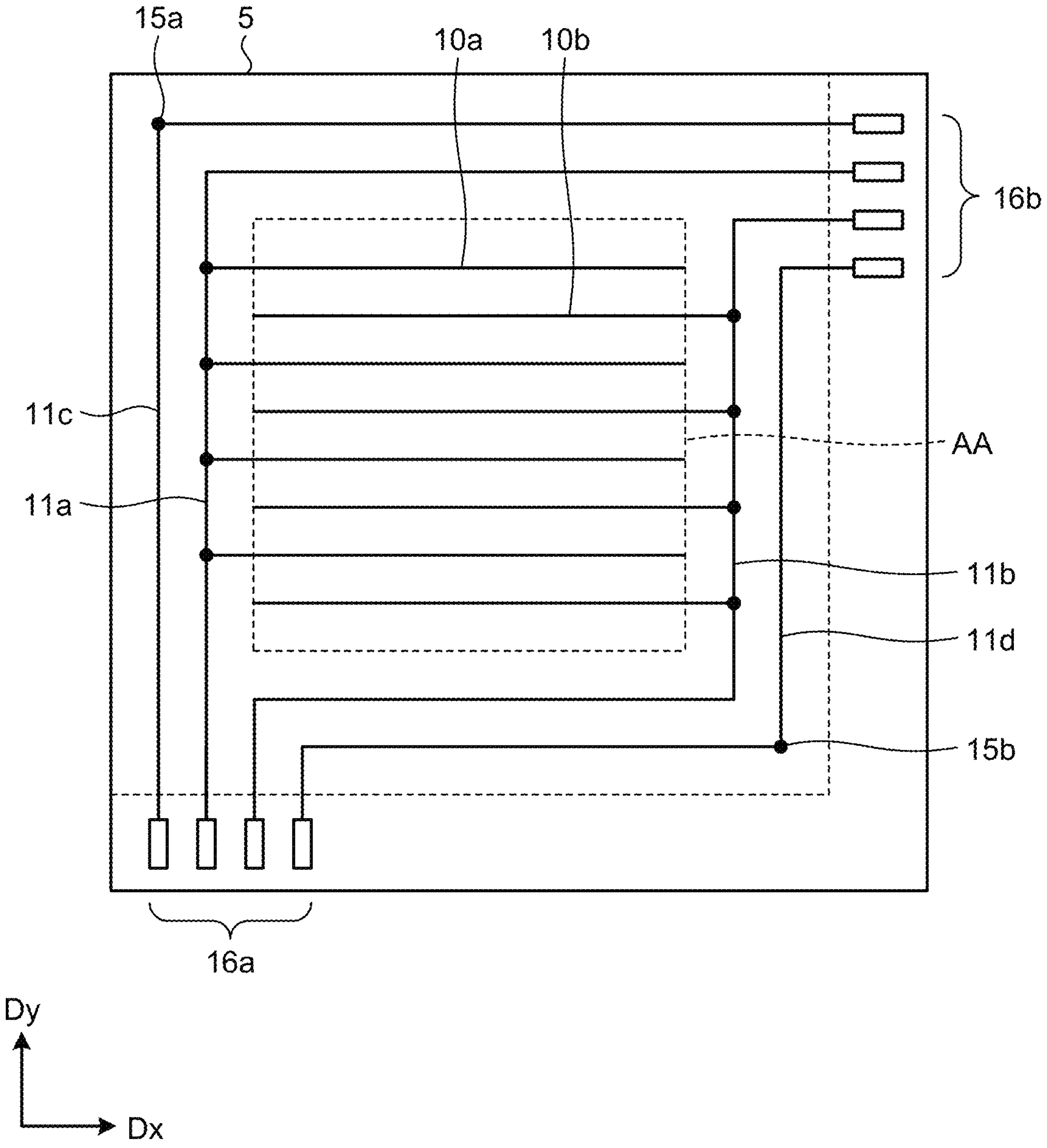
FIG. 2 is a schematic plan view of a first substrate when viewed in a Dz direction.
Figure 3:
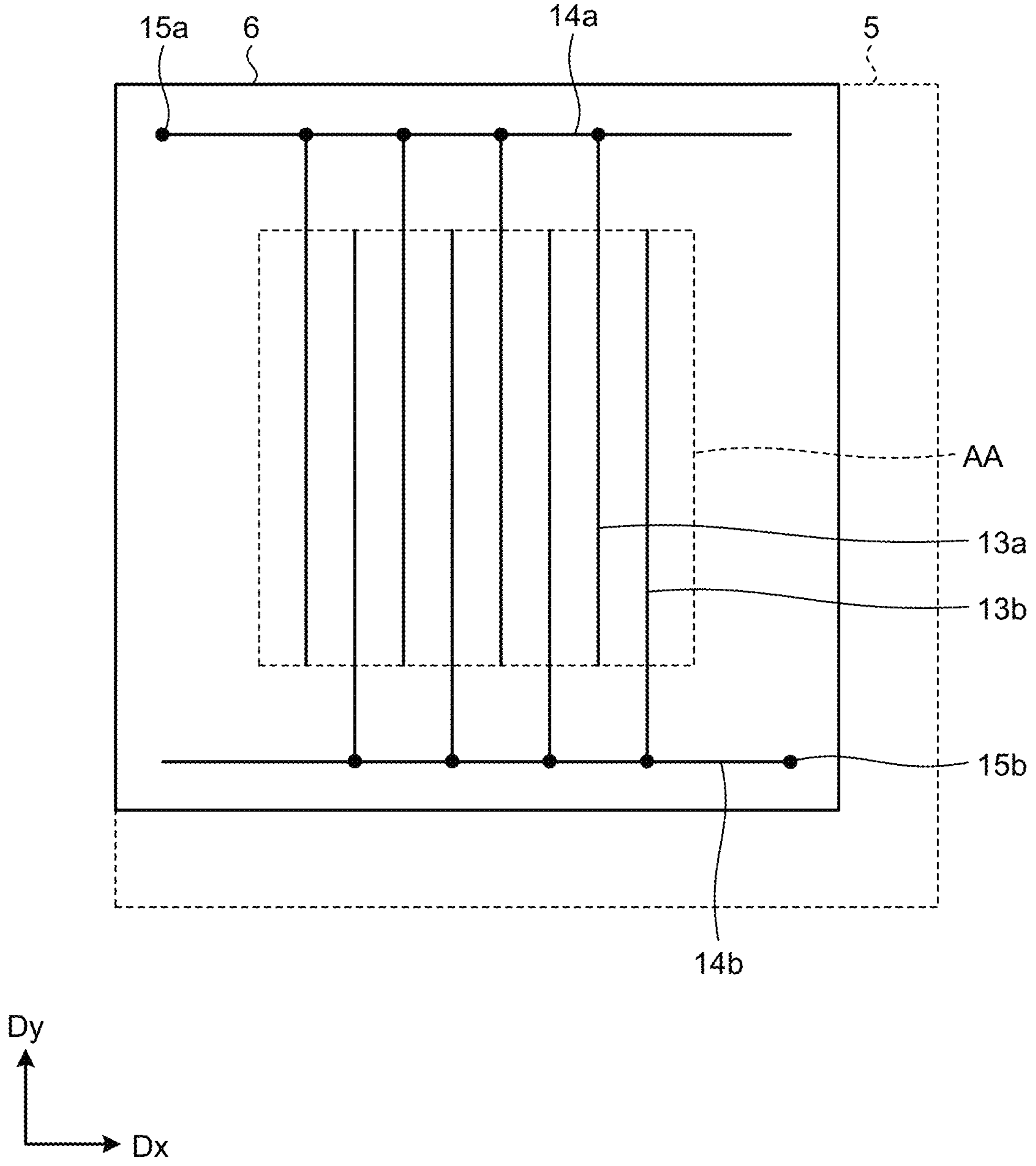
FIG. 3 is a schematic plan view of a second substrate when viewed in the Dz direction.
Figure 4:
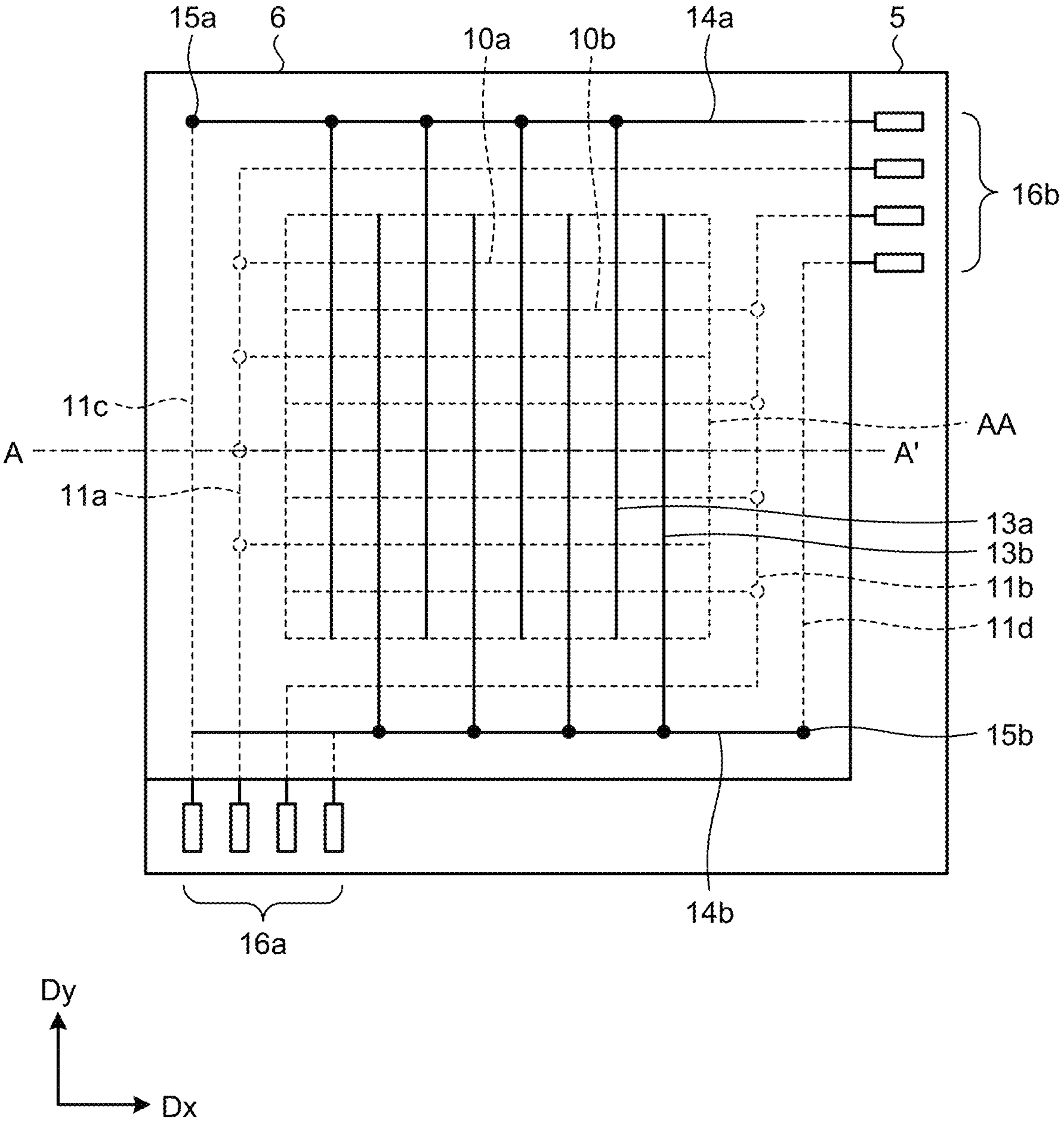
FIG. 4 is a transparent view of a liquid crystal cell in which the first substrate and the second substrate overlap each other in the Dz direction.
Figure 5:
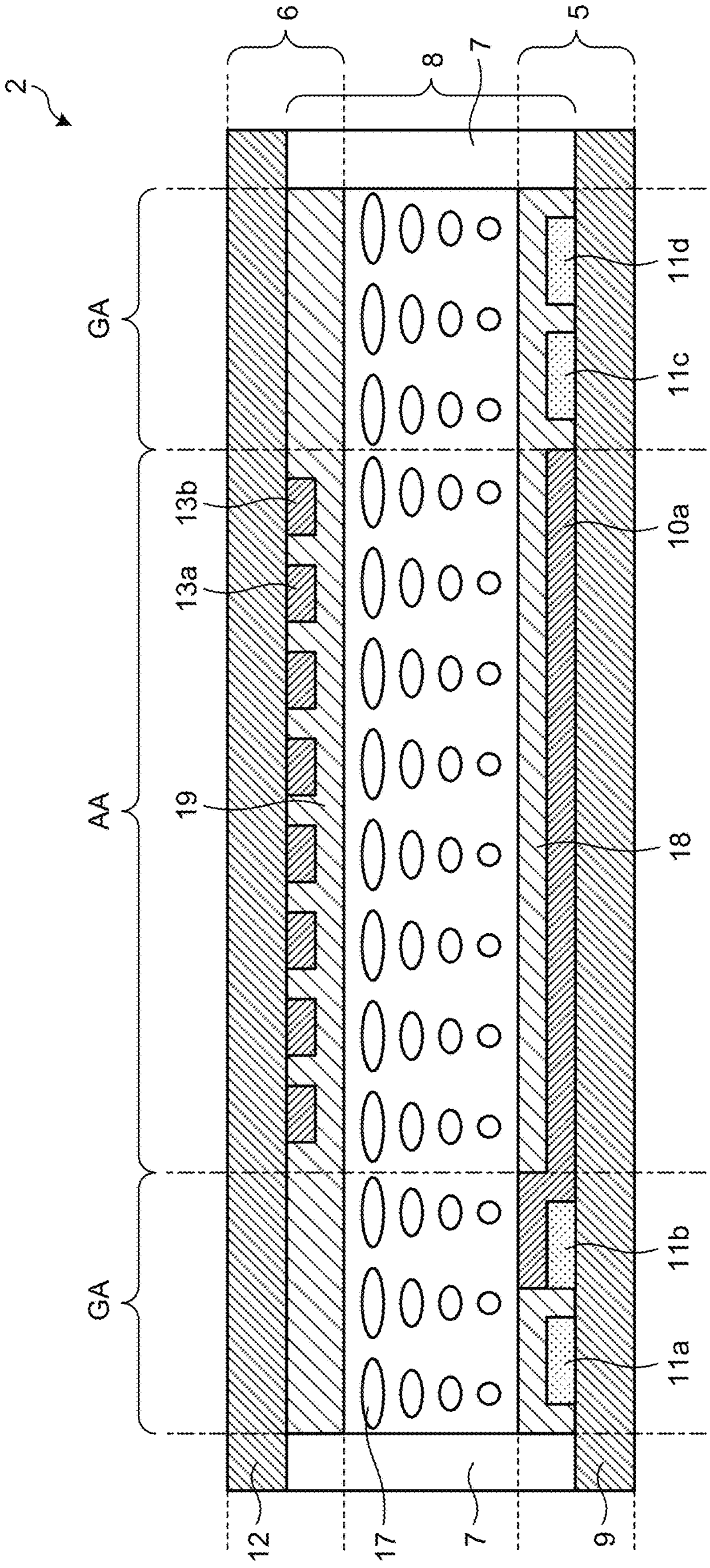
FIG. 5 is a sectional view along line A-A' illustrated in FIG. 4.

Each liquid crystal cell 2 includes a first substrate 5 and a second substrate 6. FIG. 2 is a schematic plan view of the first substrate 5 when viewed in the Dz direction. FIG. 3 is a schematic plan view of the second substrate 6 when viewed in the Dz direction. In FIG. 3, drive electrodes are visible through the substrates, but for clarity, drive electrodes and wires are illustrated with solid lines. FIG. 4 is a transparent view of a liquid crystal cell in which the first substrate 5 and the second substrate 6 overlap each other in the Dz direction. In FIG. 4 as well, for clarity, drive electrodes and wires on the second substrate side are illustrated with solid lines, and drive electrodes and wires on the first substrate side are illustrated with dotted lines. FIG. 5 is a sectional view along line A-A' illustrated in FIG. 4. FIGS. 2, 3, 4, and 5 exemplarily illustrate the third liquid crystal cell 2_3 and the fourth liquid crystal cell 2_4 in which drive electrodes 10*a* and 10*b* of the first substrate 5 extend in the Dx direction and drive electrodes 13*a* and 13*b* of the second substrate 6 extend in the Dy direction.

As illustrated in FIG. 5, the liquid crystal cell 2 includes a liquid crystal layer 8 sealed around its periphery by a sealing member 7 between the first substrate 5 and the second substrate 6.

The liquid crystal layer 8 modulates light passing through the liquid crystal layer 8 in accordance with the state of electric field. As liquid crystal molecules, positive-type nematic liquid crystals are used, but other liquid crystals with the same effects may be used.

Figure 7:
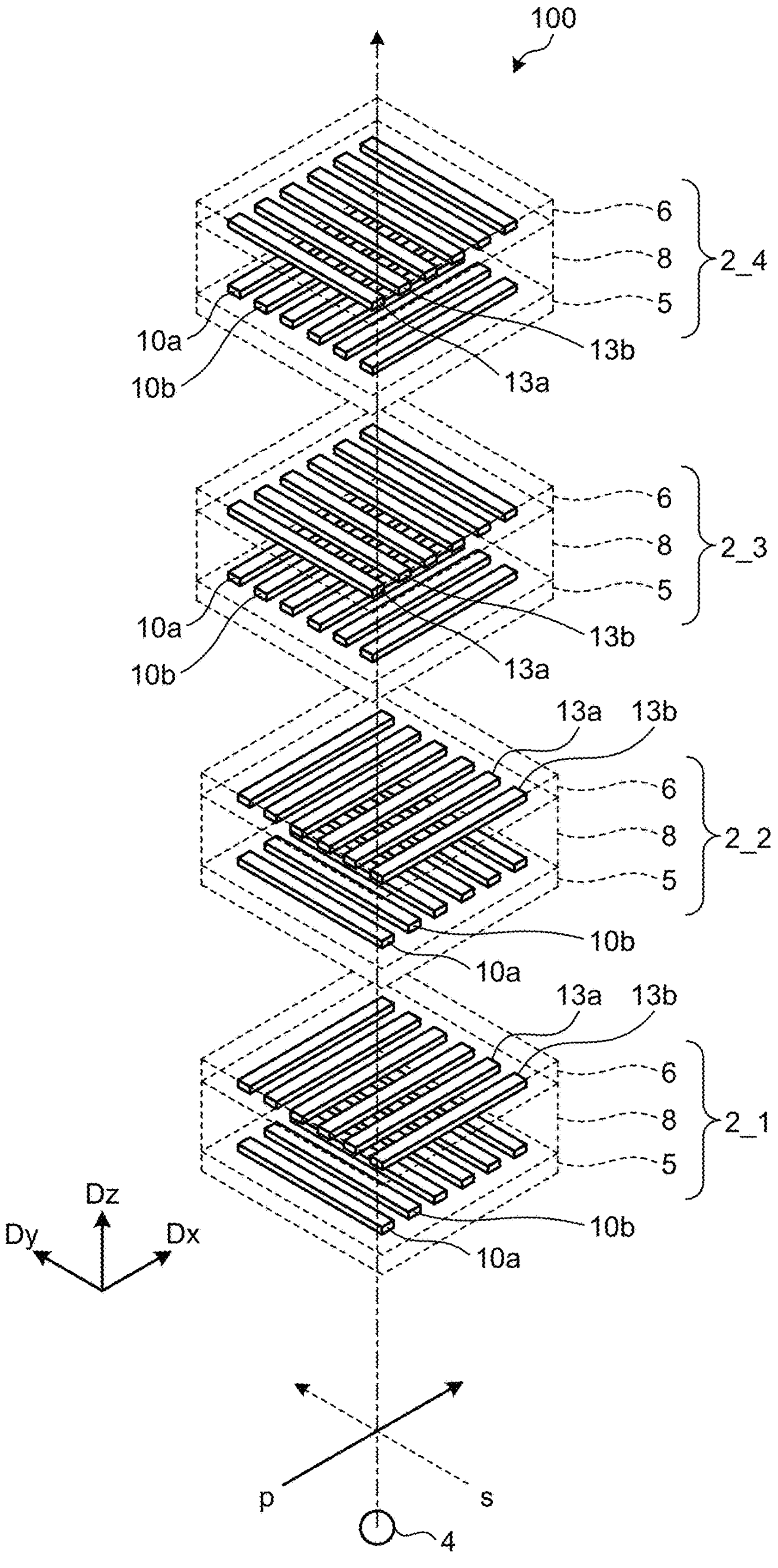
FIG. 7 is a multilayered structure diagram of the optical element according to the embodiment.

As illustrated in FIG. 2, the drive electrodes 10*a* and 10*b*, a plurality of metal wires 11*a* and 11*b* that supply drive voltage applied to the drive electrodes 10*a* and 10*b*, and a plurality of metal wires 11*c* and 11*d* that supply drive voltage applied to the drive electrodes 13*a* and 13*b* (refer to FIG. 3) provided on the second substrate 6 to be described later are provided on the liquid crystal layer 8 side of a base material 9 of the first substrate 5. The metal wires 11*a*, 11*b*, 11*c*, and 11*d* are provided in a wiring layer of the first substrate 5. The metal wires 11*a*, 11*b*, 11*c*, and 11*d* are provided at intervals in the wiring layer on the first substrate 5. Hereinafter, the drive electrodes 10*a* and 10*b* are simply referred to as "drive electrodes 10" in some cases. The metal wires 11*a*, 11*b*, 11*c*, and 11*d* are referred to as "first metal wires 11" in some cases. As illustrated in FIGS. 2 and 7, in the third liquid crystal cell 2_3 and the fourth liquid crystal cell 2_4, the drive electrodes 10 on the first substrate 5 extend in the Dx direction. In the first liquid crystal cell 2_1 and the second liquid crystal cell 2_2, the drive electrodes 10 on the first substrate 5 extend in the Dy direction.

As illustrated in FIG. 3, the drive electrodes 13*a* and 13*b* and a plurality of metal wires 14*a* and 14*b* that supply drive voltage applied to these drive electrodes 13 are provided on the liquid crystal layer 8 side of a base material 12 of the second substrate 6 illustrated in FIG. 5. The metal wires 14*a* and 14*b* are provided in a wiring layer of the second substrate 6. The metal wires 14*a* and 14*b* are provided at intervals in the wiring layer on the second substrate 6. Hereinafter, the drive electrodes 13*a* and 13*b* are simply referred to as "drive electrodes 13" in some cases. The metal wires 14*a* and 14*b* are referred to as "second metal wires 14" in some cases. As illustrated in FIGS. 3 and 7, in the third liquid crystal cell 2_3 and the fourth liquid crystal cell 2_4, the drive electrodes 13 on the second substrate 6 extend in the Dy direction. In the first liquid crystal cell 2_1 and the second liquid crystal cell 2_2, the drive electrodes 13 on the second substrate 6 extend in the Dx direction.

The drive electrodes 10 and 13 are light-transmitting electrodes formed of a light-transmitting conductive material (light-transmitting conductive oxide) such as indium tin oxide (ITO). The first substrate 5 and the second substrate 6 are light-transmitting substrates of glass, resin, or the like. The first metal wires 11 and the second metal wires 14 are formed of at least one metallic material among aluminum (Al), copper (Cu), silver (Ag), molybdenum (Mo), and alloys thereof. The first metal wires 11 and the second metal wires 14 may be each formed of one or more of these metallic materials as a multilayered body of a plurality of layers. The at least one metallic material among aluminum (Al), copper (Cu), silver (Ag), molybdenum (Mo), and alloys thereof has a resistance lower than that of light-transmitting conductive oxide such as ITO.

The metal wire 11*c* of the first substrate 5 and the metal wire 14*a* of the second substrate 6 are coupled by a conduction part 15*a* made of, for example, conductive paste. The metal wire 11*d* of the first substrate 5 and the metal wire 14*b* of the second substrate 6 are coupled by a conduction part 15*b* made of, for example, conductive paste.

Coupling (Flex-on-Board) terminal parts 16*a* and 16*b* coupled to non-illustrated flexible printed circuits (FPC) are provided in a region on the first substrate 5 that does not overlap the second substrate 6 in the Dz direction. The coupling terminal parts 16*a* and 16*b* each include four coupling terminals corresponding to the metal wires 11*a*, 11*b*, 11*c*, and 11*d*.

The coupling terminal parts 16*a* and 16*b* are provided in the wiring layer of the first substrate 5. Drive voltage to be applied to the drive electrodes 10*a* and 10*b* on the first substrate 5 and to the drive electrodes 13*a* and 13*b* on the second substrate 6 is supplied to the liquid crystal cell 2 from an FPC coupled to the coupling terminal part 16*a* or the coupling terminal part 16*b*. Hereinafter, the coupling terminal parts 16*a* and 16*b* are simply referred to as "coupling terminal parts 16" in some cases.

As illustrated in FIG. 4, in the liquid crystal cell 2, the first substrate 5 and the second substrate 6 overlap in the Dz direction (irradiation direction of light), and the drive electrodes 10 on the first substrate 5 intersect the drive electrodes 13 on the second substrate 6 when viewed in the Dz direction. In the liquid crystal cell 2 thus configured, the orientation direction of liquid crystal molecules 17 in the liquid crystal layer 8 can be controlled by supplying drive voltage to the drive electrodes 10 on the first substrate 5 and the drive electrodes 13 on the second substrate 6. A region in which the orientation direction of the liquid crystal molecules 17 in the liquid crystal layer 8 can be controlled is referred to as an "effective region AA". The diffusion degree of light transmitting through the effective region AA of the liquid crystal cell 2 can be controlled as refractive index distribution of the liquid crystal layer 8 changes in the effective region AA. A region outside the effective region AA, where the liquid crystal layer 8 is sealed by the sealing member 7 is referred to as a "peripheral region GA" (refer to FIG. 5).

As illustrated in FIG. 5, the drive electrodes 10 (in FIG. 5, the drive electrode 10*a*) in the effective region AA of the first substrate 5 are covered by an orientation film 18. The drive electrodes 13 (in FIG. 5, the drive electrodes 13*a* and 13*b*) in the effective region AA of the second substrate 6 are covered by an orientation film 19. The orientation direction of the liquid crystal molecules is different between the orientation film 18 and the orientation film 19.

Figure 6A:
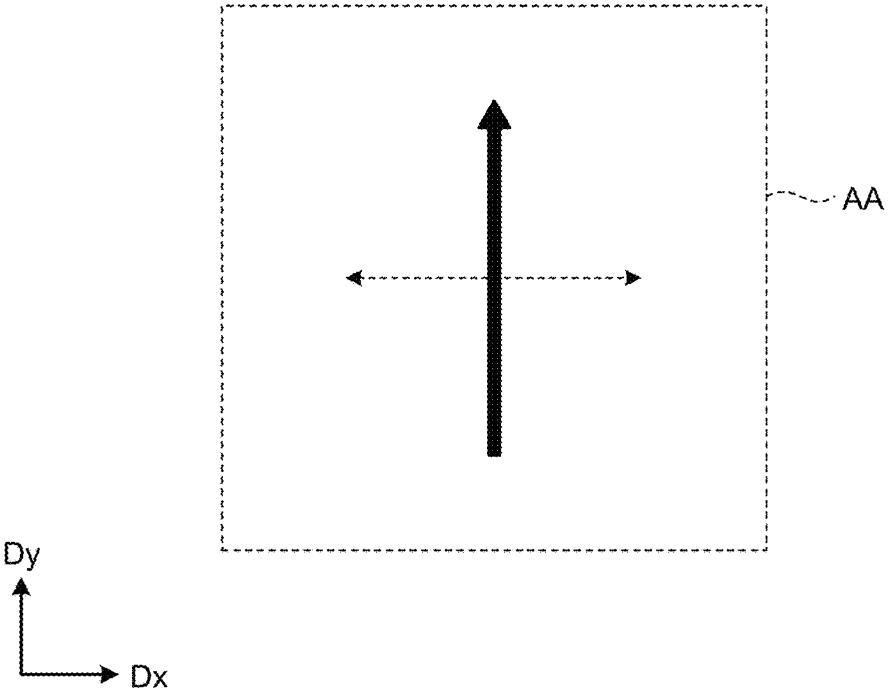
FIG. 6A is a diagram illustrating the orientation direction of an orientation film of the first substrate.
Figure 6B:
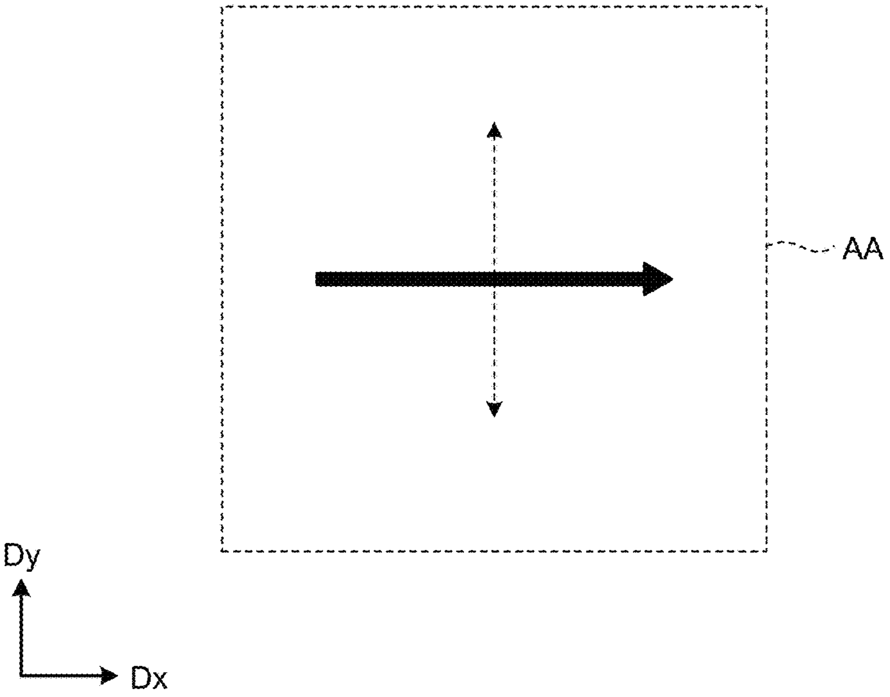
FIG. 6B is a diagram illustrating the orientation direction of an orientation film of the second substrate.

FIG. 6A is a diagram illustrating the orientation direction of the orientation film of the first substrate 5. FIG. 6B is a diagram illustrating the orientation direction of the orientation film of the second substrate 6.

As illustrated in FIGS. 6A and 6B, the orientation direction of the orientation film 18 of the first substrate 5 and the orientation direction of the orientation film 19 of the second substrate 6 are directions intersecting each other in a plan view. Specifically, as illustrated with a solid arrow in FIG. 6A, the orientation direction of the orientation film 18 of the first substrate 5 is orthogonal to the extending direction of the drive electrodes 10*a* and 10*b*, which is illustrated with a dashed arrow in FIG. 6A. As illustrated with a solid arrow in FIG. 6B, the orientation direction of the orientation film 19 of the second substrate 6 is orthogonal to the extending direction of the drive electrodes 13*a* and 13*b*, which is illustrated with a dashed arrow in FIG. 6B. In the following description, the extending directions of the drive electrodes 10 and 13 are orthogonal to the orientation directions of the orientation films 18 and 19 covering them, but these may intersect at an angle other than being orthogonal, for example, in the angle range of 85° to 90°. The drive electrodes 10 on the first substrate 5 side and the drive electrodes 13 on the second substrate 6 side are preferably orthogonal to each other but may intersect, for example, in the angle range of 85° to 90°. The orientation directions of the orientation films 18 and 19 are formed by rubbing processing or light orientation processing.

A mechanism for changing the shape of light by using the liquid crystal cells 2 (the first liquid crystal cell 2_1, the second liquid crystal cell 2_2, the third liquid crystal cell 2_3, and the fourth liquid crystal cell 2_4) will be described below. FIG. 7 is a multilayered structure diagram of the optical element 100 according to the embodiment. FIGS. 8A, 8B, 8C, and 8D are conceptual diagrams for describing light shape change through the optical element 100 according to the embodiment. FIGS. 8A, 8B, 8C, and 8D illustrate examples in which potential difference is generated between the drive electrodes of hatched substrates of the liquid crystal cells 2.

As illustrated in FIG. 7, the optical element 100 is provided on the optical axis of the light source 4, which is illustrated with a dashed and single-dotted line, and as described above, the first liquid crystal cell 2_1, the second liquid crystal cell 2_2, the third liquid crystal cell 2_3, and the fourth liquid crystal cell 2_4 are sequentially stacked from the light source 4 side (lower side in FIG. 7). The third liquid crystal cell 2_3 and the fourth liquid crystal cell 2_4 are stacked in a state of being rotated by 90° relative to the first liquid crystal cell 2_1 and the second liquid crystal cell 2_2.

In each liquid crystal cell 2, the orientation directions of the orientation films on the first substrate 5 side and the second substrate 6 side intersect each other as illustrated in FIGS. 6A and 6B. Accordingly, the orientation of the liquid crystal molecules in the liquid crystal layer 8 gradually changes from the Dx direction to the Dy direction (or from the Dy direction to the Dx direction) as the position moves from the first substrate 5 side toward the second substrate 6 side, and the polarized light component of transmitted light rotates along with the change. That is, in the liquid crystal cell 2, the polarized light component, which was a p-polarized component on the first substrate 5 side, changes to an s-polarized light component as the position moves toward the second substrate 6 side, and the polarized light component, which was an s-polarized light component on the first substrate 5 side, changes to a p-polarized component as the position moves toward the second substrate 6 side. This rotation of the polarized light component may be referred to as optical rotation.

FIG. 8A illustrates a state in which no potential is generated between adjacent electrodes in each liquid crystal cell 2. In this case, only optical rotation occurs in each liquid crystal cell 2 and no polarized light component is diffused.

Figure 8B:
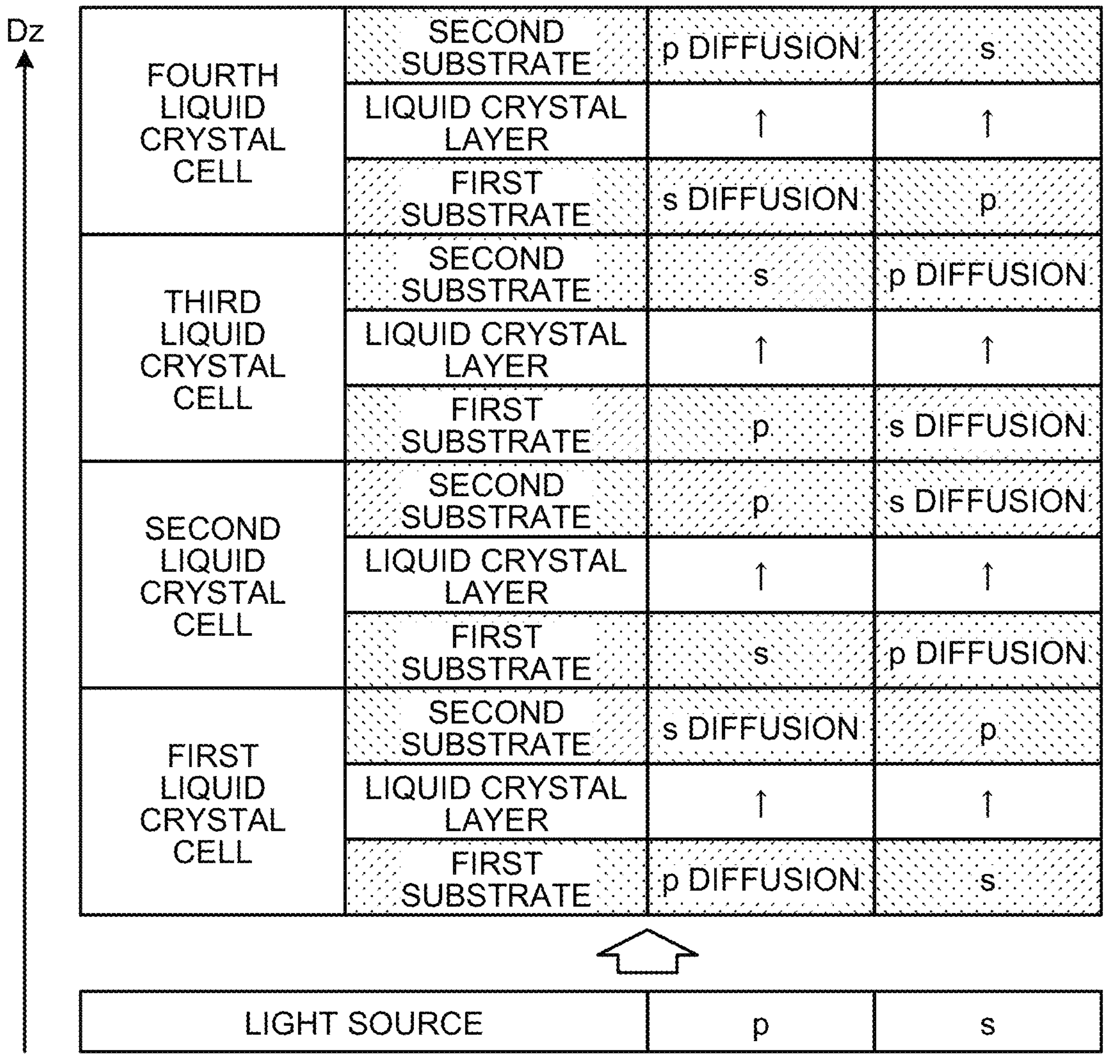
FIG. 8B is a conceptual diagram for describing light shape change through the optical element according to the embodiment.

As illustrated in FIG. 8B, for example, when potential difference is generated between the drive electrodes 10*a* and 10*b* on the first substrate 5 side in the first liquid crystal cell 2_1 to induce a horizontal electric field, the liquid crystal molecules between the electrodes are aligned in a circular arc shape, and accordingly, refractive index distribution is formed in the Dx direction in the liquid crystal layer 8. As light from the light source 4 passes through in this state, the above-described refractive index distribution acts on the polarized light component (in FIG. 8B, p-polarized component) parallel to the Dx direction, and accordingly, the p-polarized component diffuses in the Dx direction.

In addition, when potential difference is generated between the drive electrodes 13*a* and 13*b* on the second substrate 6 side in the first liquid crystal cell 2_1, refractive index distribution is formed in the Dy direction on the second substrate 6 side, and accordingly, the s-polarized light component diffuses in the Dy direction on the second substrate 6 side. That is, the polarized light component having changed from a p-polarized component to an s-polarized light component during passing through the liquid crystal layer 8 in the first liquid crystal cell 2_1 diffuses in the Dy direction as well. However, the s-polarized light component at incidence on the first liquid crystal cell 2_1 optically rotates during passing through the liquid crystal layer 8 but intersects each refractive index distribution, and accordingly, only optically rotates without diffusing and passes through the first liquid crystal cell 2_1.

The s-polarized light component at incidence on the first liquid crystal cell 2_1 changes to a p-polarized component after passing through the first liquid crystal cell 2_1, and the second liquid crystal cell 2_2 acts on this p-polarized component. Specifically, as illustrated in FIGS. 8A and 8B, the first liquid crystal cell 2_1 acts on the p-polarized component among light incident on the optical element 100, and the second liquid crystal cell 2_2 acts on the s-polarized light component. Since the third liquid crystal cell 2_3 and the fourth liquid crystal cell 2_4 are provided with rotation by 90° relative to the first liquid crystal cell 2_1 and the second liquid crystal cell 2_2, polarized light components on which they act are switched by 90°. Specifically, the third liquid crystal cell 2_3 acts on the s-polarized light component at incidence on the optical element 100, and the fourth liquid crystal cell 2_4 acts on the p-polarized component at incidence on the optical element 100.

As illustrated in FIG. 8C, in the optical element, it is possible to act on the p-polarized component by providing potential difference between drive electrodes extending in the Dy direction in each liquid crystal cell 2 (between the drive electrodes 10*a* and 10*b* of the first substrate 5 in the first liquid crystal cell 2_1 and the second liquid crystal cell 2_2 and between the drive electrodes 13*a* and 13*b* of the second substrate 6 in the third liquid crystal cell 2_3 and the fourth liquid crystal cell 2_4), thereby increasing the shape of light mainly in the Dx direction. This effect may be referred to as horizontal diffusion.

Figure 8D:
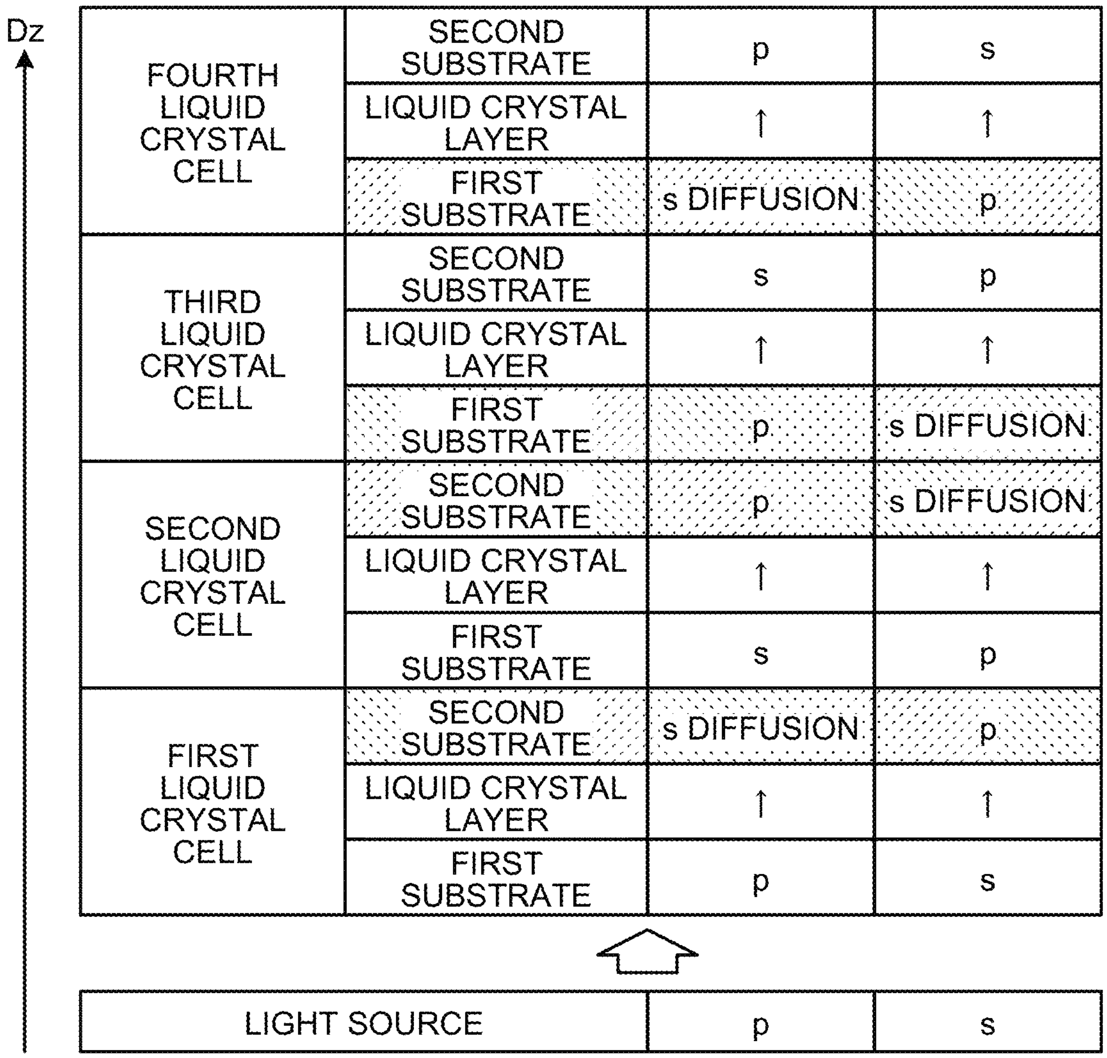
FIG. 8D is a conceptual diagram for describing light shape change through the optical element according to the embodiment.

As illustrated in FIG. 8D, it is possible to act on the s-polarized light component by providing potential difference between drive electrodes extending in the Dx direction in each liquid crystal cell 2 (between the drive electrodes 13*a* and 13*b* of the second substrate 6 in the first liquid crystal cell 2_1 and the second liquid crystal cell 2_2 and between the drive electrodes 10*a* and 10*b* of the first substrate 5 in the third liquid crystal cell 2_3 and the fourth liquid crystal cell 2_4), thereby increasing the shape of light mainly in the Dy direction. This effect may be referred to as vertical diffusion.

The diffusion degree of light in each direction depends on the potential difference between the drive electrodes 10*a* and 10*b* (or between the drive electrodes 13*a* and 13*b*) adjacent to each other. The spread of light in the direction is maximum (100(%)) in a case where the potential difference between the drive electrodes 10*a* and 10*b* (or between the drive electrodes 13*a* and 13*b*) is maximum potential difference (for example, 30 (V)) defined in advance, and no spread of light (0(%)) occurs in the direction in a case where no potential difference is generated. Alternatively, the spread of light in the direction is 50(%) in a case where the potential difference between the drive electrodes 10*a* and 10*b* (or between the drive electrodes 13*a* and 13*b*) is 50(%) (for example, 15 (V)) of the above-described maximum potential difference. Note that, in a case where the relation between voltage difference and light spread is not linear, it is possible to set another potential difference instead of 15 (V).

In each liquid crystal cell 2, the interval (also referred to as a cell gap) between its substrates (between the first substrate 5 and the second substrate 6) is large at 10 μm to 50 μm approximately, more preferably at 15 μm to 35 μm approximately, and accordingly, influence of an electric field formed in one of the substrates on the other substrate side is suppressed as much as possible. It goes without saying that drive voltage that generates potential difference between the drive electrodes 10*a* and 10*b* (or between the drive electrodes 13*a* and 13*b*) adjacent to each other is what is called alternating-current square wave, thereby preventing burn-in of the liquid crystal molecules.

The orientation directions of the orientation films, the extending directions of the drive electrodes on the substrates, and the angle between them may be modified as appropriate for the entire optical element 100 or each liquid crystal cell 2 in accordance with the characteristics of liquid crystals to be employed and optical specifications to be intentionally obtained.

In the present embodiment, description is made on the configuration of the optical element 100 in which the four liquid crystal cells of the first liquid crystal cell 2_1, the second liquid crystal cell 2_2, the third liquid crystal cell 2_3, and the fourth liquid crystal cell 2_4 are stacked, but the optical element 100 is not limited to this configuration and may employ, for example, a configuration in which two or three liquid crystal cells 2 are stacked or a configuration in which a plurality of liquid crystal cells 2, five or more liquid crystal cells 2, are stacked.

In the present disclosure, in the illumination device 1 with the above-described configuration, light incident on the optical element from the light source 4 is controlled in the two directions of the Dx direction (direction of horizontal diffusion) and the Dy direction (direction of vertical diffusion) by controlling drive voltage of each liquid crystal cell 2. The above-described vertical diffusion and horizontal diffusion may be collectively referred to as light diffusion. Accordingly, the shape of light emitted from the optical element is changed. The shape of light is a light shape that appears on a plane parallel to an emission surface of the optical element, and this may be referred to as a light distribution shape. Hereinafter, control of the light diffusion degree in the present disclosure will be described below with reference to FIG. 9.

Figure 9:
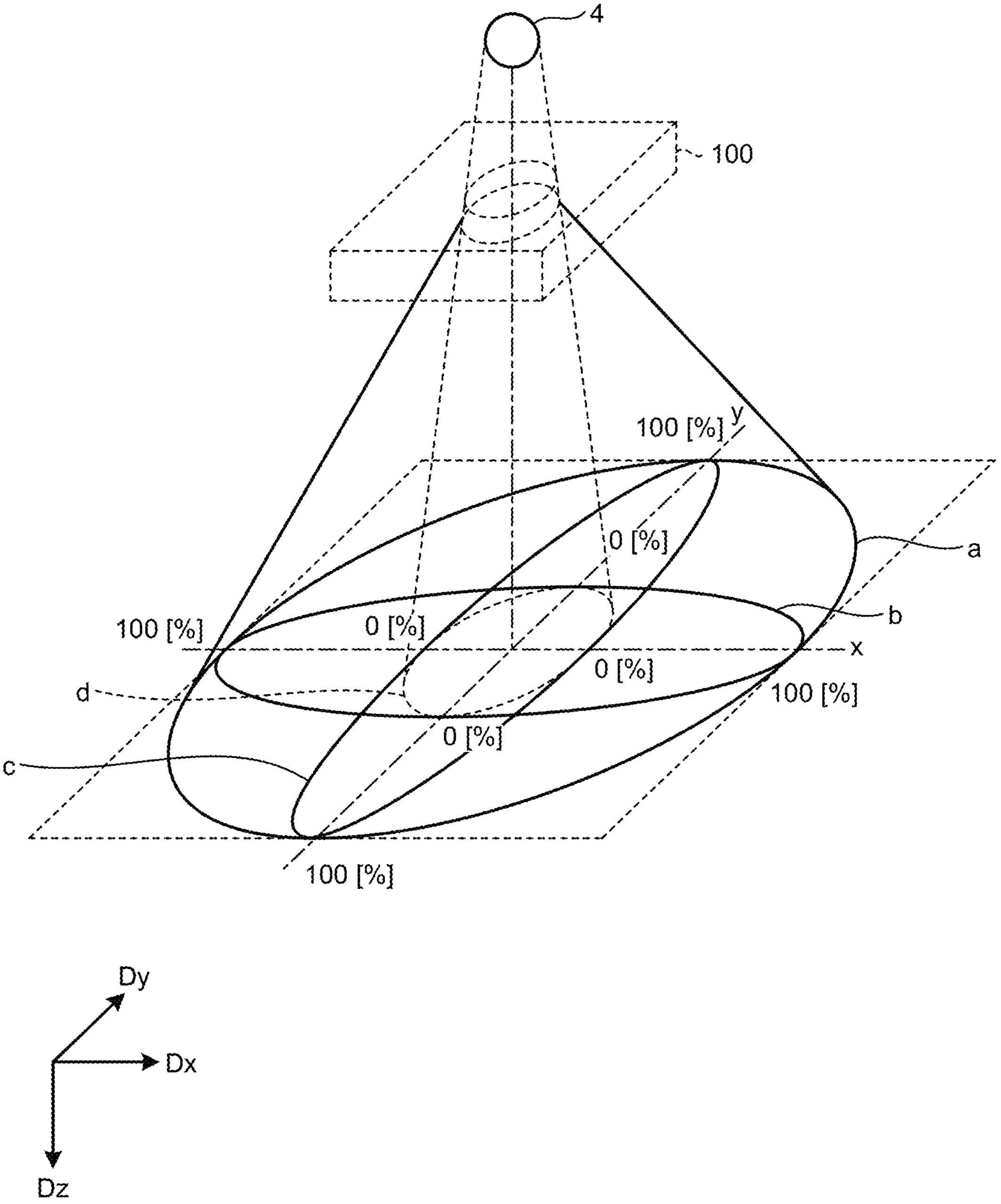
FIG. 9 is a conceptual diagram for conceptually describing control of the light diffusion degree by the illumination device according to the embodiment.

FIG. 9 is a conceptual diagram for conceptually describing control of the light diffusion degree by the illumination device 1 according to the embodiment. FIG. 9 illustrates an irradiation area of light on a virtual plane xy orthogonal to the Dz direction. The outline of the actual irradiation area is slightly unclear depending on the distance from the light source 4, a light diffraction phenomenon, and the like.

As described above, the orientation direction of the liquid crystal molecules 17 in the liquid crystal layer 8 is controlled by drive voltage being supplied to the drive electrodes 10 and 13 of each liquid crystal cell 2 of the optical element 100 provided on the optical axis of the light source 4. Accordingly, the light distribution shape of light emitted from the optical element 100 is controlled.

Specifically, for example, the light distribution shape in the Dx direction changes in accordance with drive voltage applied to the drive electrodes 10 or drive electrodes 13 extending in the Dy direction in each liquid crystal cell 2 as described above (horizontal diffusion). The light distribution shape in the Dy direction changes in accordance with drive voltage applied to the drive electrodes 10 or drive electrodes 13 extending in the Dx direction in the first to fourth liquid crystal cells (vertical diffusion).

In the present disclosure, the minimum diffusion degrees of the horizontal diffusion and the vertical diffusion are 0(%) and the maximum diffusion degrees thereof are 100(%). More specifically, in a case where the horizontal diffusion degree is 0(%), drive electrodes (for example, the drive electrodes 10 extending in the Dy direction on the first substrate 5 in the first liquid crystal cell 2_1) functioning to expand the light distribution state in the Dx direction do not act on the refractive index distribution of the liquid crystal layer 8. In this case, no potential difference is present between the adjacent drive electrodes 10*a* and 10*b* or no potential is supplied to the electrodes. On the other hand, in a case where the horizontal diffusion degree is 100(%), drive electrodes (for example, the drive electrodes 10 extending in the Dy direction on the first substrate 5 in the first liquid crystal cell 2_1) functioning to expand the light distribution state in the Dx direction maximumly act on the refractive index distribution of the liquid crystal layer 8. In this case, the potential difference between the adjacent drive electrodes 10*a* and 10*b* is set to the maximum potential difference (for example, 30 (V)) in the optical element 100. In a case where the horizontal diffusion degree is larger than 0(%) and smaller than 100(%), potential for which the potential difference between the adjacent drive electrodes 10*a* and 10*b* is modulated to be larger than 0 (V) and smaller than the maximum potential difference (for example, 30 (V)) is applied to the electrodes. The same applies to the vertical diffusion.

Outline “a” illustrated in FIG. 9 exemplarily indicates the irradiation area in a case where the horizontal diffusion degree and the vertical diffusion degree are both 100(%). Outline “b” illustrated in FIG. 9 exemplarily indicates the irradiation area in a case where the horizontal diffusion degree is 100(%) and the vertical diffusion degree is 0(%). Outline “c” illustrated in FIG. 9 exemplarily indicates the irradiation area in a case where the horizontal diffusion degree is 0(%) and the vertical diffusion degree is 100(%). Outline “d” illustrated in FIG. 9 exemplarily indicates the irradiation area in a case where the horizontal diffusion degree and the vertical diffusion degree are both 0(%). In other words, outline “d” indicates the light distribution state when light from the light source 4 is emitted without being controlled by the optical element 100 (or simply transmitting through the optical element 100).

In this manner, in the illumination device 1 with the above-described configuration, it is possible to control the horizontal and vertical diffusion degrees of emission light from the optical element 100 by performing drive voltage control of each liquid crystal cell 2. Accordingly, it is possible to change the light distribution shape of emission light from the illumination device 1. Hereinafter, control that changes the light distribution shape of emission light from the illumination device 1 is also referred to as “light distribution control”.

Note that the illumination device 1 capable of light distribution control in the two directions of the Dx and Dy directions is exemplarily described in the present disclosure, but controllable parameters of the illumination device 1 is not limited to light distribution (light spread). For example, the illumination device 1 may be capable of light modulation control. In this case, controllable parameters of the illumination device 1 may include light modulation (brightness). Note that in the following description, the Dx direction is referred to as an H direction (first direction), and the Dy direction is referred to as a V direction (second direction).

Figure 10:
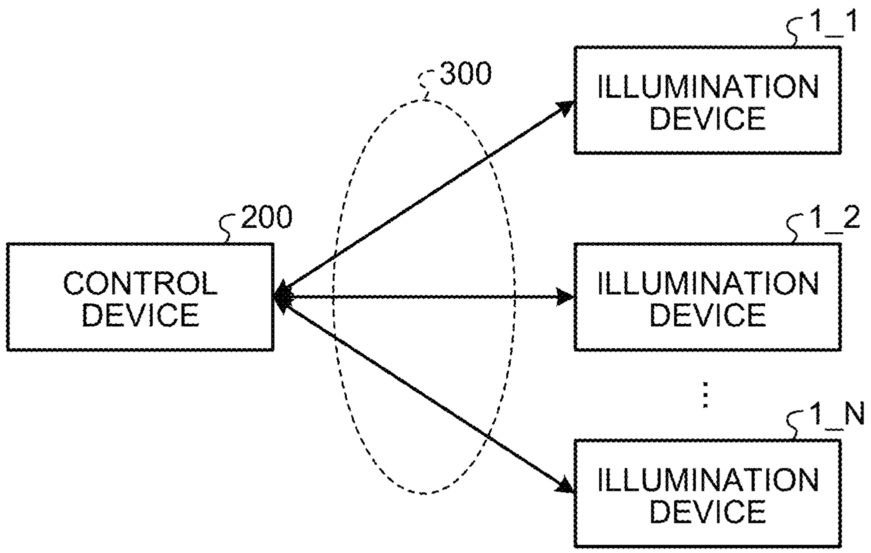
FIG. 10 is a schematic diagram illustrating an example of the configuration of an illumination system according to the embodiment.

FIG. 10 is a schematic diagram illustrating an example of the configuration of an illumination system according to the embodiment. The illumination system includes illumination devices 1 (1_1, 1_2, . . . , 1_N) and a control device 200. The control device 200 is, for example, a portable communication terminal device such as a smartphone or a tablet. In the present disclosure, the illumination devices 1 (1_1, 1_2, . . . , 1_N) are registered to the control device 200 as control target devices with light distribution controllable by the control device 200.

Data and various command signals are transmitted and received between the illumination devices 1 (1_1, 1_2, . . . 1_N) and the control device 200 through a communication means 300. In the present disclosure, the communication means 300 is a wireless communication means including, for example, Bluetooth (registered trademark) or WiFi (registered trademark). Wireless communication may be performed between the illumination devices 1 (1_1, 1_2, . . . 1_N) and the control device 200 through a predetermined network such as a mobile communication network. Alternatively, the illumination devices 1 (1_1, 1_2, . . . , 1_N) and the control device 200 may be coupled to each other in a wired manner to perform wired communication therebetween.

Note that, although the illumination devices 1 (1_1, 1_2, . . . , 1_N) are registered in the example illustrated in FIG. 10, at least one illumination device 1 may be registered as a control target device with controllable light distribution in the present disclosure.

In the above-described illumination system, the control device 200 can change the light distribution state of the illumination device 1 in the H and V directions. The following describes the control device 200 of the illumination system according to the embodiment.

Figure 11:
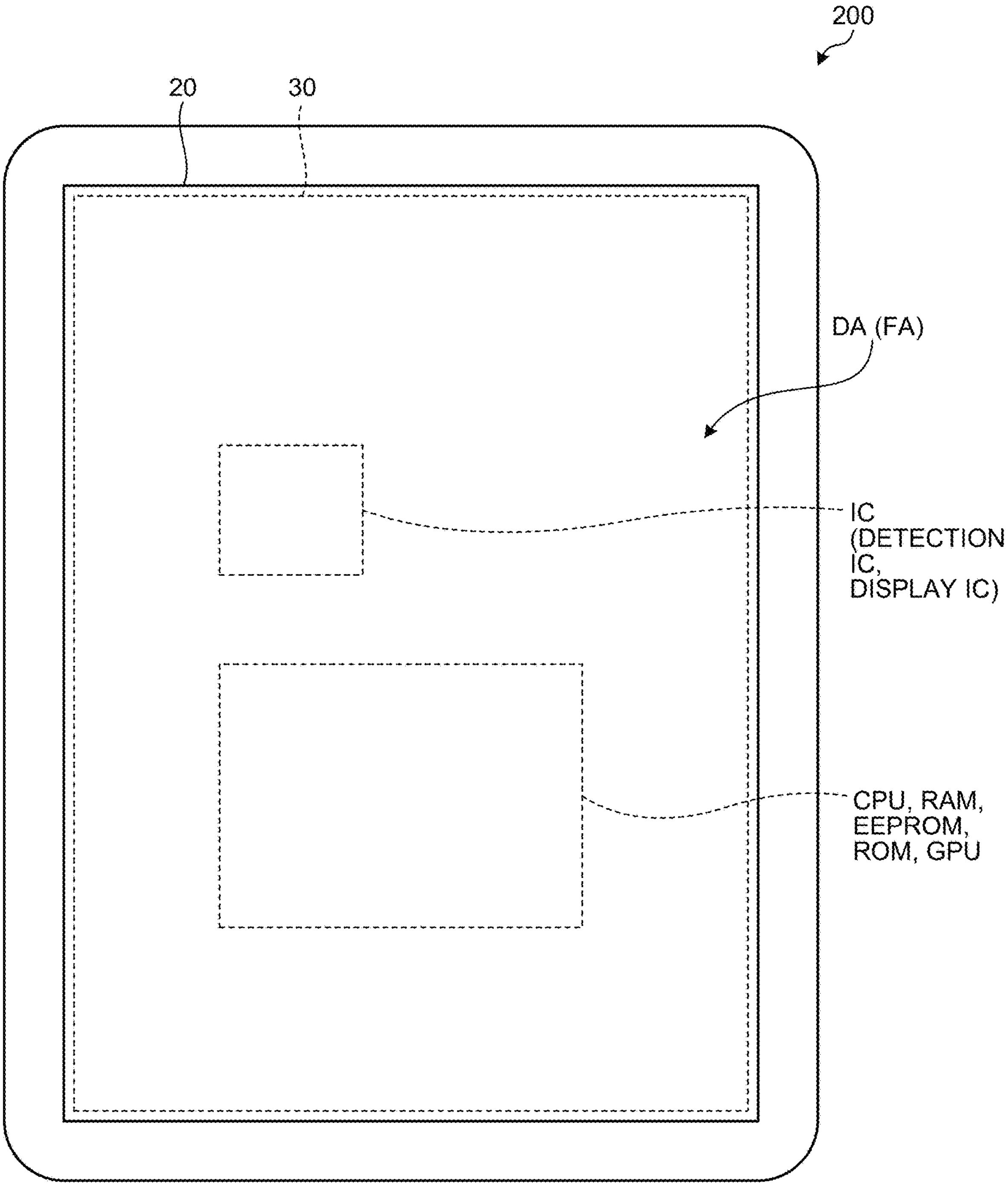
FIG. 11 is a sketch drawing illustrating an example of a control device according to the embodiment.

FIG. 11 is a sketch drawing illustrating an example of the control device 200 according to the embodiment. The control device 200 is a display device (touch screen) with a touch detection function in which a display panel 20 and a touch sensor 30 are integrated. The control device 200 includes, as internal components, for example, various ICs such as a detection IC and a display IC, and/or a central processing unit (CPU), a random access memory (RAM), an electrically erasable programmable read only memory (EEPROM), a read only memory (ROM), and a graphics processing unit (GPU) of the smartphone or tablet constituting the control device 200.

The display panel 20 is what is called an in-cell or hybrid device in which the touch sensor 30 is built and integrated. Building and integrating the touch sensor 30 in the display panel 20 includes, for example, sharing some members such as substrates and electrodes used as the display panel 20 and some members such as substrates and electrodes used as the touch sensor 30. The display panel 20 may be what is called an on-cell device in which the touch sensor 30 is mounted on a display device.

The display panel 20 is, for example, a liquid crystal display panel including a liquid crystal display element. The display panel 20 is not limited thereto but may be, for example, an organic EL display panel (OLED: organic light emitting diode) or an inorganic EL display panel (micro LED or mini LED).

The touch sensor 30 is, for example, a capacitive touch sensor. The touch sensor 30 is not limited thereto but may be, for example, a touch sensor of a resistance film scheme or a touch sensor of an ultrasonic wave scheme or an optical scheme.

Figure 12:
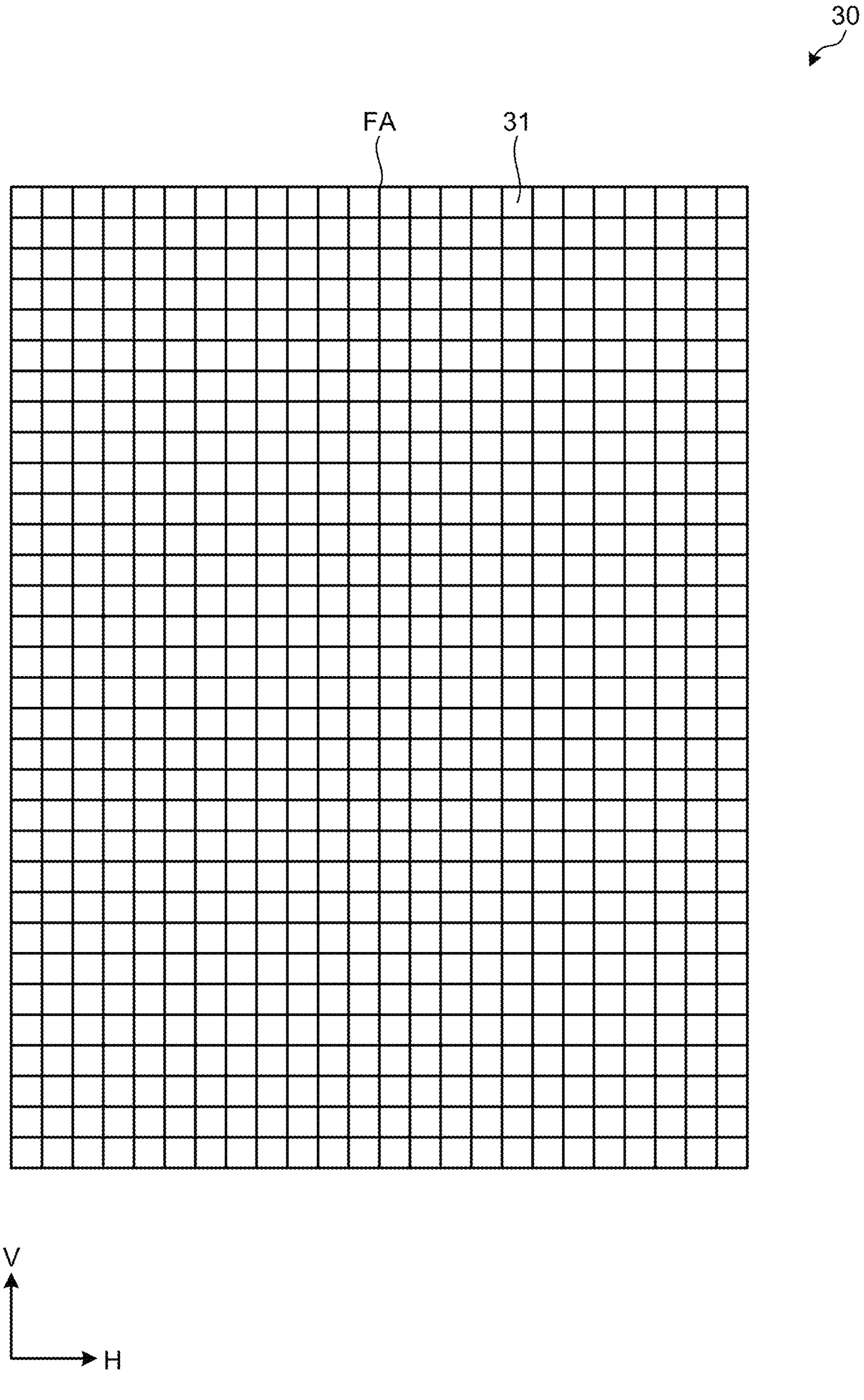
FIG. 12 is a conceptual diagram illustrating an example of a touch detection region of a touch sensor.

FIG. 12 is a conceptual diagram illustrating an example of a touch detection region of the touch sensor. A plurality of detection elements 31 are provided in a detection region FA of the touch sensor 30. The detection elements 31 in the detection region FA of the touch sensor 30 are arranged side by side in an X direction and a Y direction orthogonal to the X direction and provided in a matrix of a row-column configuration. In other words, the touch sensor 30 has the detection region FA overlapping the detection elements 31 arranged in the X direction and the Y direction.

Figure 13:
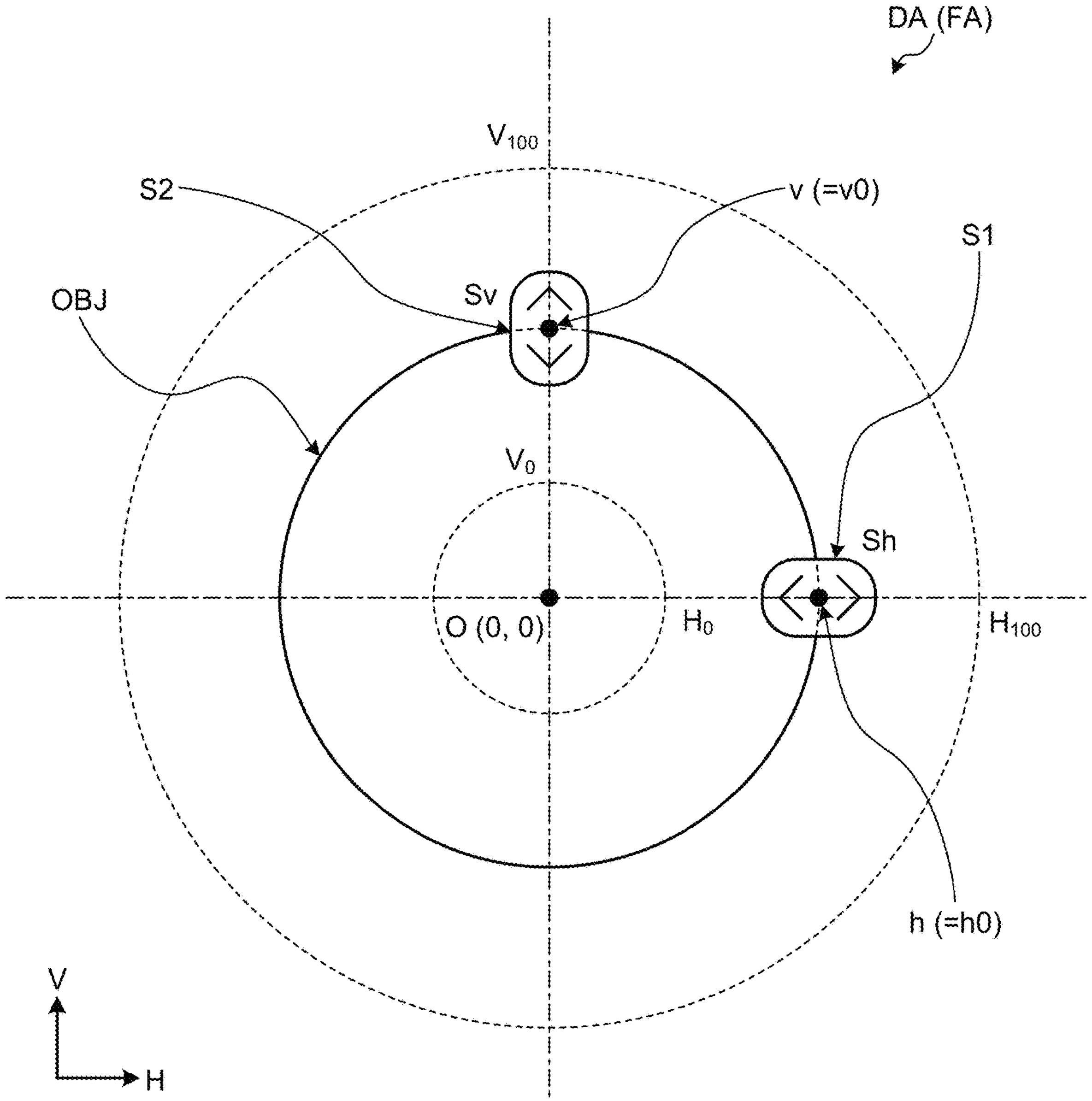
FIG. 13 is a diagram for describing an example of the display aspect of a setting change screen of the control device according to the embodiment.

FIG. 13 is a diagram for describing an example of the display aspect of a setting change screen of the control device 200 according to the embodiment. A display region DA overlapping the detection region FA of the touch sensor 30 in a plan view is provided on the display panel 20 and displays the setting change screen illustrated in FIG. 13. An HV plane with an origin O(0, 0) at a predetermined position on the setting change screen illustrated in FIG. 13 is defined.

In the example illustrated in FIG. 13, a light distribution shape object OBJ with a central point at the origin O(0, 0) of the HV plane on the setting change screen is displayed, and a first slider S1 changing the light distribution state of the illumination device 1 in the H direction and a second slider S2 for changing the light distribution state of the illumination device 1 in the V direction are disposed on the outline of the light distribution shape object OBJ.

The light distribution shape object OBJ is a pictorial image corresponding to the light distribution state of light emitted from the illumination device 1.

The first slider S1 and the second slider S2 are, for example, pictorial images displayed on the display region DA, which a user can touch and move (drag operation) with a finger.

The shape of the light distribution shape object OBJ can be changed by moving the first slider S1 in the H direction. Simultaneously, the light distribution state of the illumination device 1 in the H direction (in other words, horizontal diffusion) is controlled. The shape of the light distribution shape object OBJ can be changed by moving the second slider S2 in the V direction.

Simultaneously, the light distribution state of the illumination device 1 in the V direction (in other words, vertical diffusion) is controlled.

In the present disclosure, the shape of the light distribution shape object OBJ on the setting change screen becomes a circular or elliptical shape in accordance with the light distribution value Sh in the H direction and the light distribution value Sv in the V direction. In other words, the shape of the light distribution shape object OBJ changes to a circular or elliptical shape with movement of the first slider S1 and the second slider S2.

The first slider S1 can be moved in the H direction between the position on the outline of the light distribution shape object OBJ in a case where the light distribution value Sh in the H direction is 0(%) and the position on the outline of the light distribution shape object OBJ in a case where the light distribution value Sh in the H direction is 100(%).

The second slider S2 can be moved in the V direction between the position on the outline of the light distribution shape object OBJ in a case where the light distribution value Sv in the V direction is 0(%) and the position on the outline of the light distribution shape object OBJ in a case where the light distribution value Sv in the V direction is 100(%).

On the setting change screen of the control device 200, the light distribution value Sh of the illumination device 1 in the H direction can be set by the movement amount of a position h of an intersection point of the H axis of the HV plane and the outline of the light distribution shape object OBJ.

In the present disclosure, the position h of the intersection point of the H axis and the outline of the light distribution shape object OBJ is the central point of the first slider S1. In other words, a position ho of the first slider S1 on the display region DA overlaps the position h of the intersection point of the H axis and the outline of the light distribution shape object OBJ. Accordingly, the light distribution value Sh of the illumination device 1 in the H direction can be changed by touching the first slider S1 and moving the first slider S1 in the H direction. In FIG. 13, "Sh" indicates the light distribution value (for example, "50" (%)) of the illumination device 1 in the H direction.

On the setting change screen of the control device 200, the light distribution value Sv of the illumination device 1 in the V direction can be set by the movement amount of a position v of an intersection point of the V axis of the HV plane and the outline of the light distribution shape object OBJ.

In the present disclosure, the position v of the intersection point of the V axis and the outline of the light distribution shape object OBJ is the central point of the second slider S2. In other words, a position vo of the second slider S2 on the display region DA overlaps the position v of the intersection point of the V axis and the outline of the light distribution shape object OBJ. Accordingly, the light distribution value Sv of the illumination device 1 in the V direction can be changed by touching the second slider S2 and moving the second slider S2 in the V direction. In FIG. 13, "Sv" indicates the light distribution value (for example, "50" (%)) of the illumination device 1 in the V direction.

Figure 14:
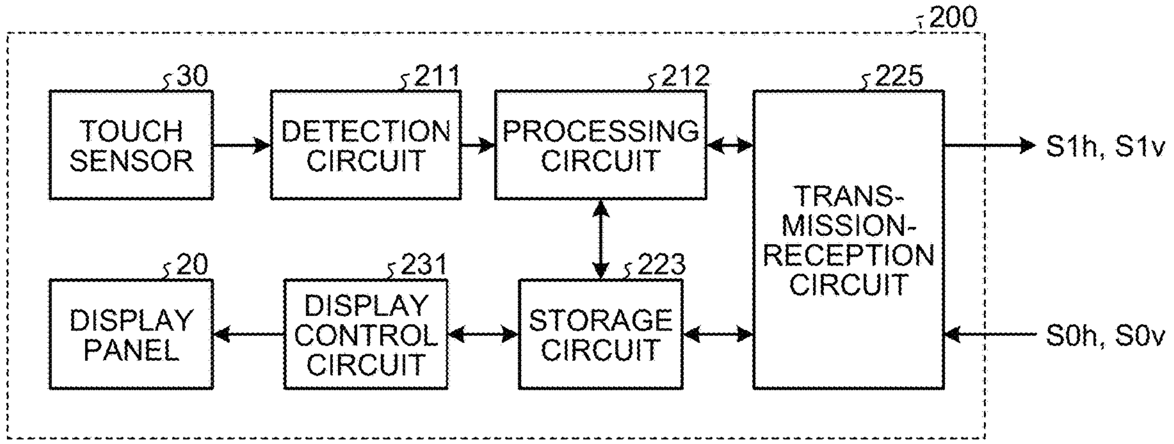
FIG. 14 is a diagram illustrating an example of a control block configuration of the control device according to the embodiment.

FIG. 14 is a diagram illustrating an example of a control block configuration of the control device 200 according to the embodiment. The following describes the control block configuration for changing the light distribution state of the illumination device 1 in the H and V directions with reference to FIG. 14.

As illustrated in FIG. 14, the control device 200 includes the display panel 20, the touch sensor 30, a detection circuit 211, a processing circuit 212, a storage circuit 223, a transmission-reception circuit 225, and a display control circuit 231. The detection circuit 211 is constituted by, for example, a detection IC. Alternatively, the detection circuit 211 and the display control circuit 231 may be mounted as one display IC on the display panel 20 or on an FPC coupled to the display panel 20. The processing circuit 212 and the storage circuit 223 are constituted by, for example, the CPU, RAM, EEPROM, and ROM of the smartphone or tablet constituting the control device 200. The display control circuit 231 may be a display IC mounted on the display panel 20 as described above, and moreover, may include, for example, the GPU of the smartphone or tablet constituting the control device 200. The transmission-reception circuit 225 is constituted by, for example, a wireless communication module of the smartphone or tablet constituting the control device 200.

The detection circuit 211 is a circuit that detects existence or absence of a touch on the touch sensor 30 based on a detection signal output from each detection element 31 of the touch sensor 30.

The processing circuit 212 is a circuit that executes conversion processing of the position of touch detection by the detection circuit 211 into various setting values (in the present disclosure, light distribution values) of the illumination device 1. In the present disclosure, the processing circuit 212 has a function to execute conversion processing of the position of touch detection by the detection circuit 211, that is the position of a touched object (pictorial image), into operation states on various screens. The processing circuit 212 is a component implemented in, for example, the CPU of the smartphone or tablet constituting the control device 200.

The storage circuit 223 is constituted by, for example, the RAM, EEPROM, and ROM of the smartphone or tablet constituting the control device 200. In the present disclosure, the storage circuit 223 stores various setting values (in the present disclosure, light distribution values) of the illumination device 1.

The transmission-reception circuit 225 transmits and receives various setting values (in the present disclosure, light distribution values) to and from the illumination device 1. Specifically, the transmission-reception circuit 225 transmits the light distribution value Sh in the H direction and the light distribution value Sv in the V direction, which are set by the control device 200, to the illumination device 1 as light distribution setting values Sh and S1*v*, respectively. In addition, the transmission-reception circuit 225 receives the light distribution setting values S0*h* and S0*v* transmitted from the illumination device 1.

The display control circuit 231 executes display control processing for displaying the above-described setting change screen on the display panel 20. The display control circuit 231 performs display control of the display panel 20 based on various setting values (in the present disclosure, light distribution values) and pictorial image position information stored in the storage circuit 223.

Figure 15:
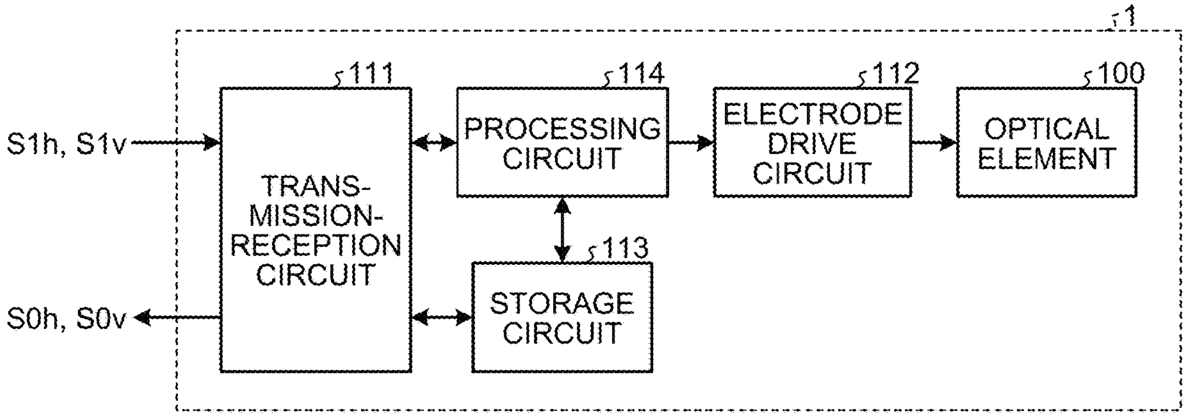
FIG. 15 is a diagram illustrating an example of a control block configuration of the illumination device according to the embodiment.

The following describes the illumination device in the above-described illumination system. FIG. 15 is a diagram illustrating an example of a control block configuration of the illumination device 1 according to the embodiment.

As illustrated in FIG. 15, the illumination device 1 according to the embodiment includes a transmission-reception circuit 111, an electrode drive circuit 112, a storage circuit 113, and a processing circuit 114 as control blocks for controlling the optical element 100 described above. The processing circuit 114 is constituted by a microcomputer for executing light distribution control and light modulation control of the illumination device 1.

The transmission-reception circuit 111 transmits and receives various setting values (in the present disclosure, light distribution setting values) to and from the control device 200. Specifically, the transmission-reception circuit 111 receives the light distribution setting values S1*h* and S1*v* transmitted from the control device 200. The transmission-reception circuit 111 transmits the light distribution setting values S0*h* and S0*v* stored in the storage region of the storage circuit 113 to the control device 200.

In the present disclosure, at activation of the illumination device 1, the transmission-reception circuit 111 transmits the light distribution setting values S0*h* and S0*v* stored in the storage region of the storage circuit 113 to the control device 200, and stores the light distribution setting values S1*h* and S1*v* transmitted from the control device 200 in the storage region of the storage circuit 113 as new light distribution setting values S0*h* and S0*v*. Accordingly, as the light distribution setting values S1*h* and S1*v* are transmitted from the control device 200 to the illumination device 1, the light distribution setting values S0*h* and S0*v* in the storage region of the storage circuit 113 are updated to the light distribution setting values S1*h* and S1*v*. Note that the illumination device 1 initially stores no light distribution setting values S0*h* and S0*v* (the light distribution setting values S0*h* and S0*v* are both 0(%)). In this case, as the light distribution setting values S1*h* and S1*v* are transmitted from the control device 200, the light distribution setting values S0*h* and S0*v* in the storage region of the storage circuit 113 are stored. Note that the present disclosure is not limited to the above description, and predetermined values such as 50(%) may be stored in advance for the initial light distribution setting values S0*h* and S0*v*.

The electrode drive circuit 112 supplies drive voltage to the drive electrodes 10 and 13 of each liquid crystal cell 2 of the optical element 100 based on the result of processing at the processing circuit 114.

The storage circuit 113 includes, for example, an internal memory mounted in the microcomputer constituting the processing circuit 114. In the present disclosure, a light distribution setting value S0*h* in the H direction and a light distribution setting value S0*v* in the V direction for the illumination device 1 are stored in a storage region of the storage circuit 113.

The light distribution setting value S0*h* in the H direction and the light distribution setting value S0*v* in the V direction, which are stored in the storage region of the storage circuit 113 may be, for example, setting values stored in the storage region of the storage circuit 113 during the previous operation of the illumination device 1 or may be transmitted from the control device 200 and stored in the storage region of the storage circuit 113.

The following describes a communication system for implementing a communication connection environment ensuring security between the control device 200 and the illumination device 1, without depending on communication platforms and user operations, in the illumination system with the above-described configuration, and a connection establishment method and a data transmission-reception method in the communication system.

First Embodiment

Figure 16:
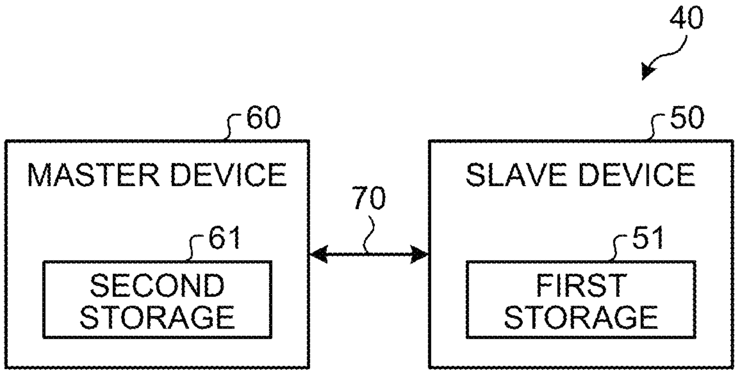
FIG. 16 is a diagram illustrating an example of a schematic configuration of a communication system according to a first embodiment.

FIG. 16 is a diagram illustrating an example of a schematic configuration of a communication system according to a first embodiment. This communication system 40 according to the first embodiment performs communication through a communication means 70 between a slave device 50, which is a device to be controlled, and a master device 60, which controls the slave device 50. In FIG. 16, the communication system 40 corresponds to the illumination system according to the embodiment. The slave device 50 corresponds to the illumination device 1 according to the embodiment. The master device 60 corresponds to the control device 200 according to the embodiment.

The main entity performing processing in the slave device 50 is, for example, a microcomputer constituting the illumination device 1 according to the embodiment. More specifically, processing in the slave device 50 may be executed by the processing circuit 114 illustrated in FIG. 15. In this case, data may be transmitted to and received from the master device 60 by the transmission-reception circuit 111 illustrated in FIG. 15.

The slave device 50 includes a first storage 51. The first storage 51 includes, for example, an internal memory implemented in a microcomputer. More specifically, the first storage 51 may be a common component with the storage circuit 113 illustrated in FIG. 15.

The main entity performing processing in the master device 60 is, for example, a CPU of a smartphone, a tablet, or the like constituting the control device 200 according to the embodiment. More specifically, processing in the master device 60 may be executed by a processing circuit 212 illustrated in FIG. 14. In this case, data may be transmitted to and received from the slave device 50 by a transmission-reception circuit 225 illustrated in FIG. 14.

The master device 60 includes a second storage 61. The second storage 61 is constituted by, for example, a RAM, EEPROM, or ROM of a smartphone, a tablet, or the like. More specifically, the second storage 61 may be a common component with the storage circuit 223 illustrated in FIG. 14.

In the present embodiment, the first storage 51 and the second storage 61 store connection codes, key codes, security codes, and the like generated in connection establishment processing to be described later.

In the present embodiment, the communication means 70 will be described below with Bluetooth as an example, but the communication means 70 may be a different wireless communication means such as WiFi, universal asynchronous receiver/transmitter (UART), or infrared data association (IrDA). Moreover, the communication means 70 is not limited to wireless communication, but the slave device 50 and the master device 60 may be coupled by wiring to perform wired communication. The present embodiment will be described below with an example of an aspect in which one slave device 50 and the master device 60 are coupled through the communication means 70 as illustrated in FIG. 16, the number of slave devices 50, which are devices to be controlled, may be more than one.

Figure 17A:
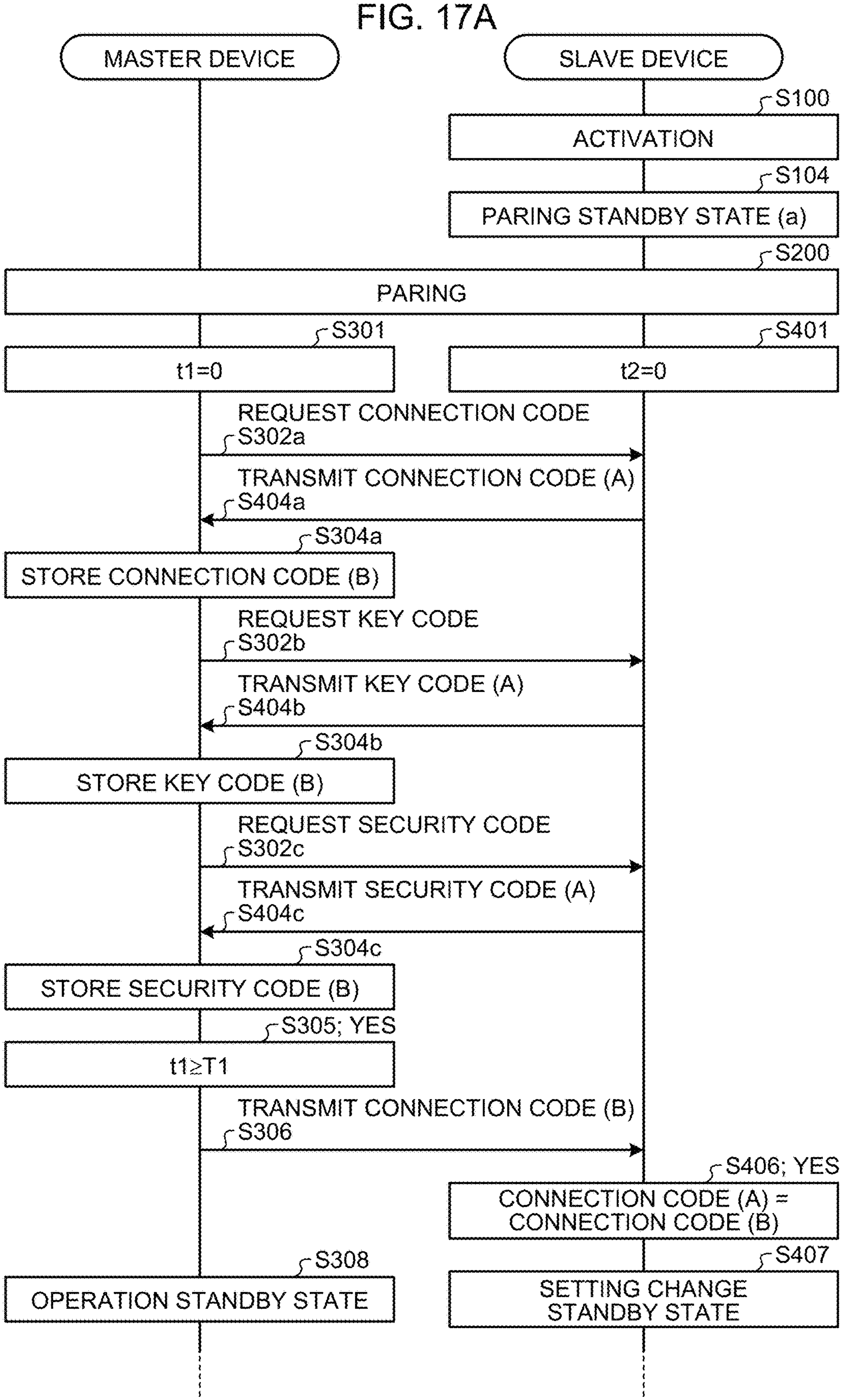
FIG. 17A is a first sequence diagram illustrating an example of connection establishment processing in the communication system according to the first embodiment.
Figure 17B:
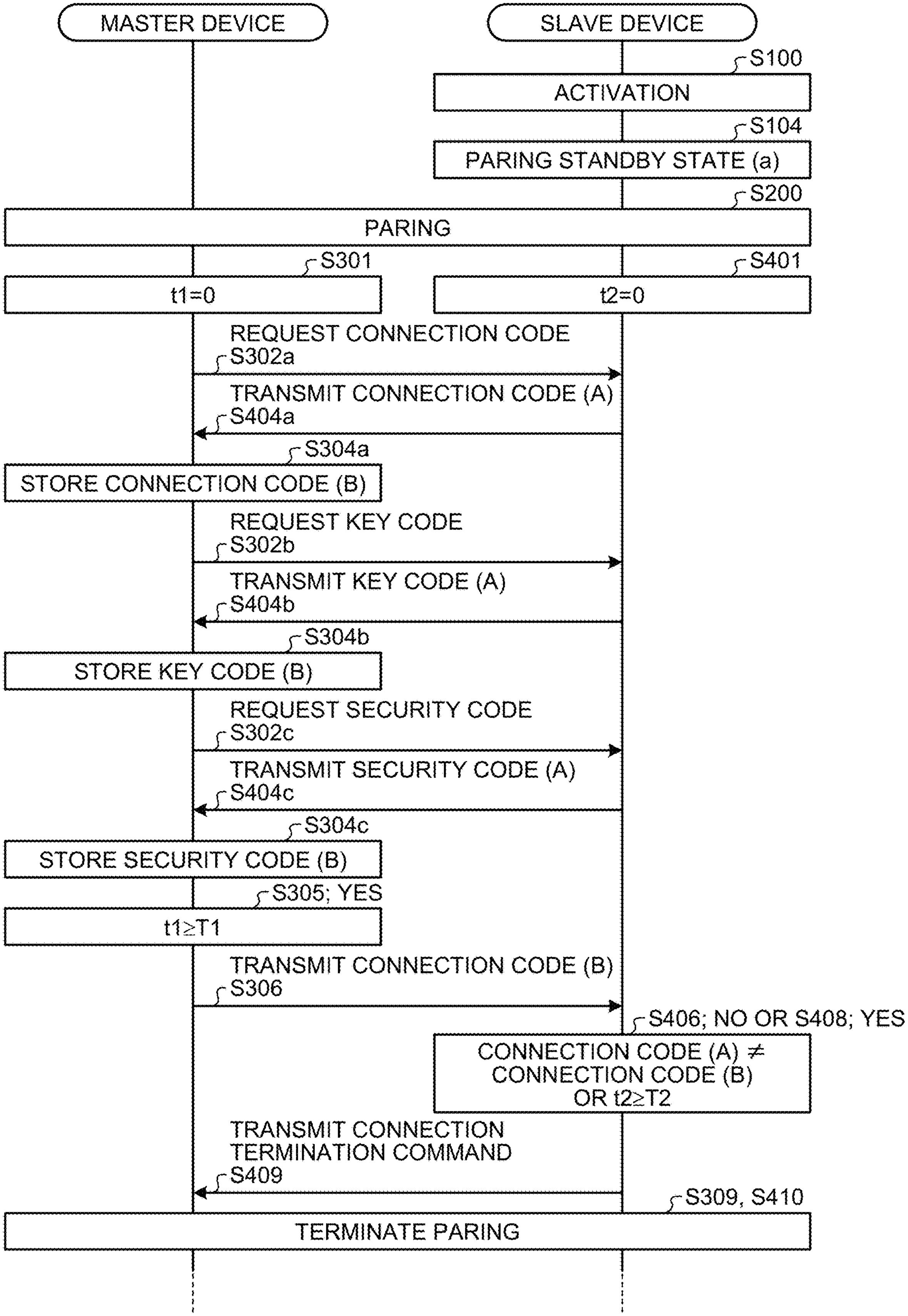
FIG. 17B is a second sequence diagram illustrating an example of the connection establishment processing in the communication system according to the first embodiment.
Figure 17C:
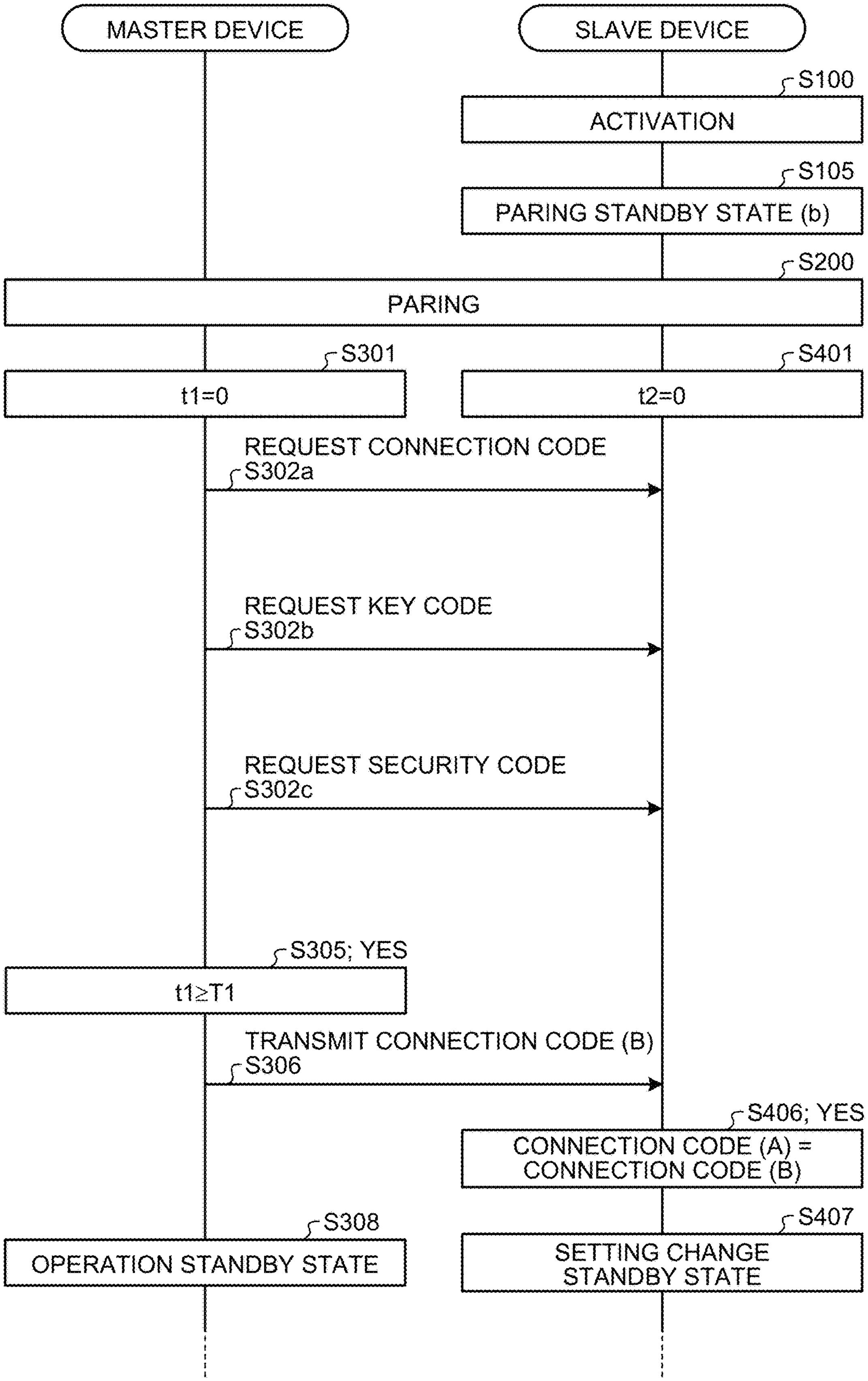
FIG. 17C is a third sequence diagram illustrating an example of the connection establishment processing in the communication system according to the first embodiment.
Figure 17D:
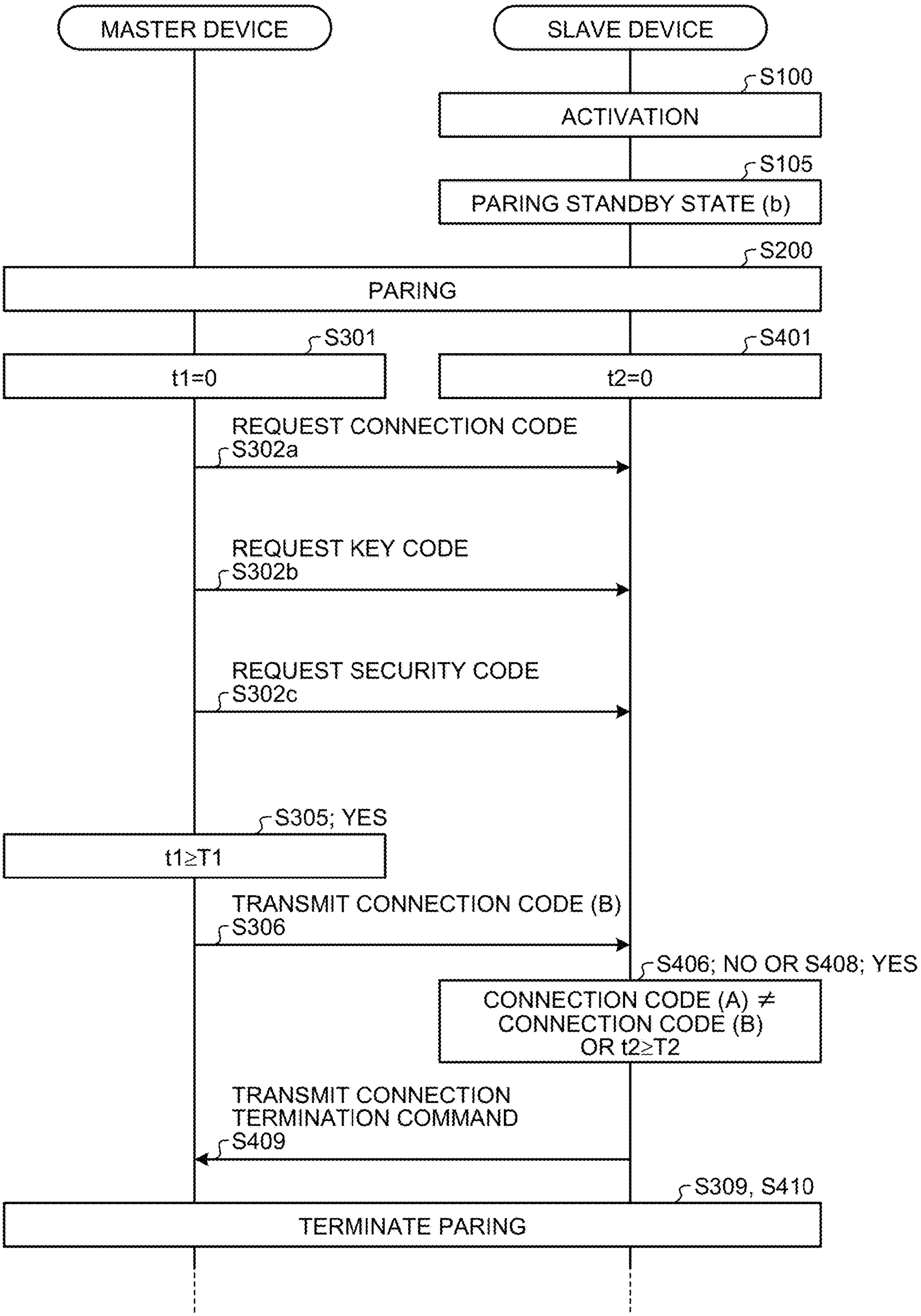
FIG. 17D is a fourth sequence diagram illustrating an example of the connection establishment processing in the communication system according to the first embodiment.
Figure 18:
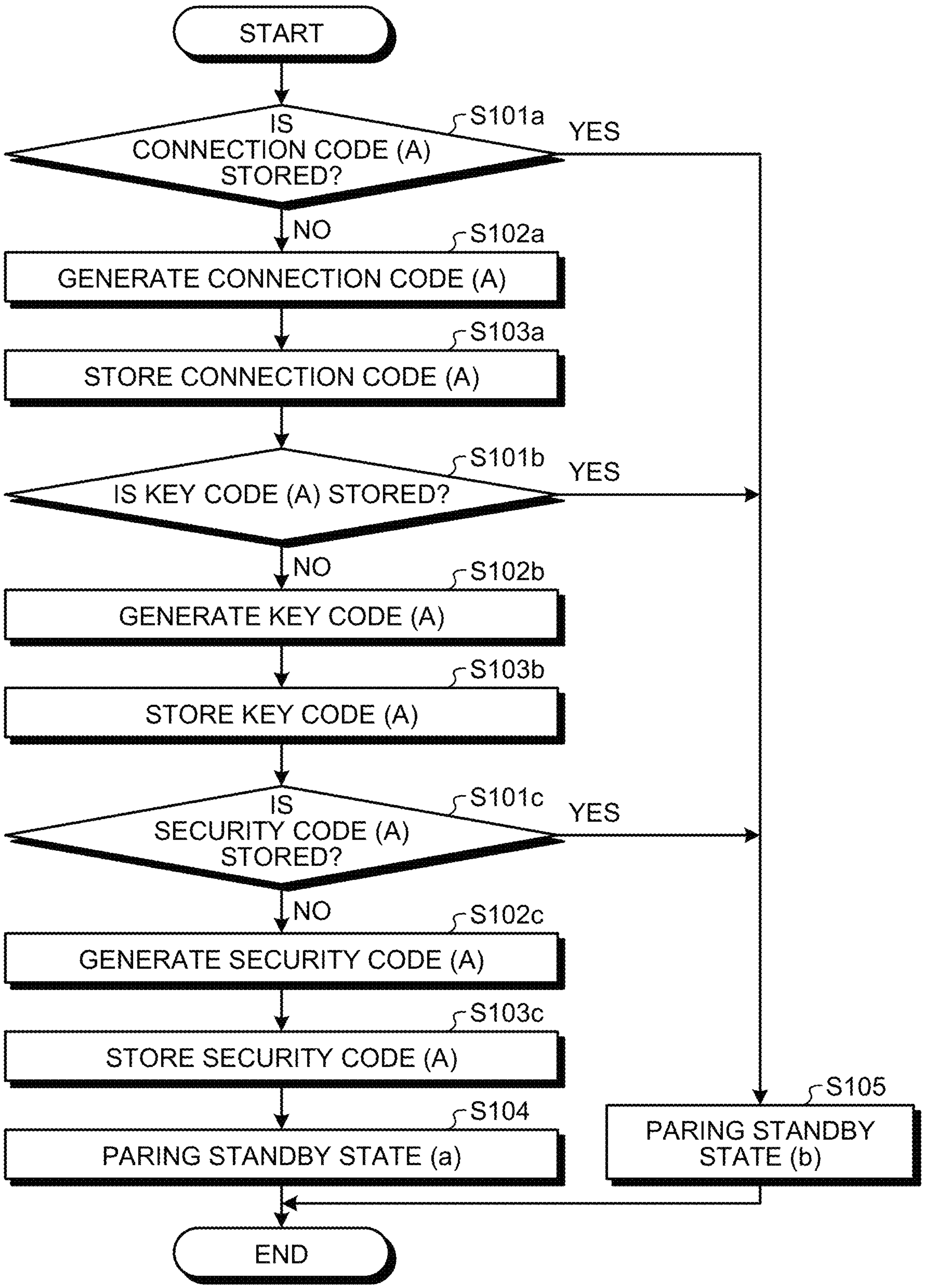
FIG. 18 is a flowchart illustrating an example of activation processing of a slave device according to the first embodiment.
Figure 19:
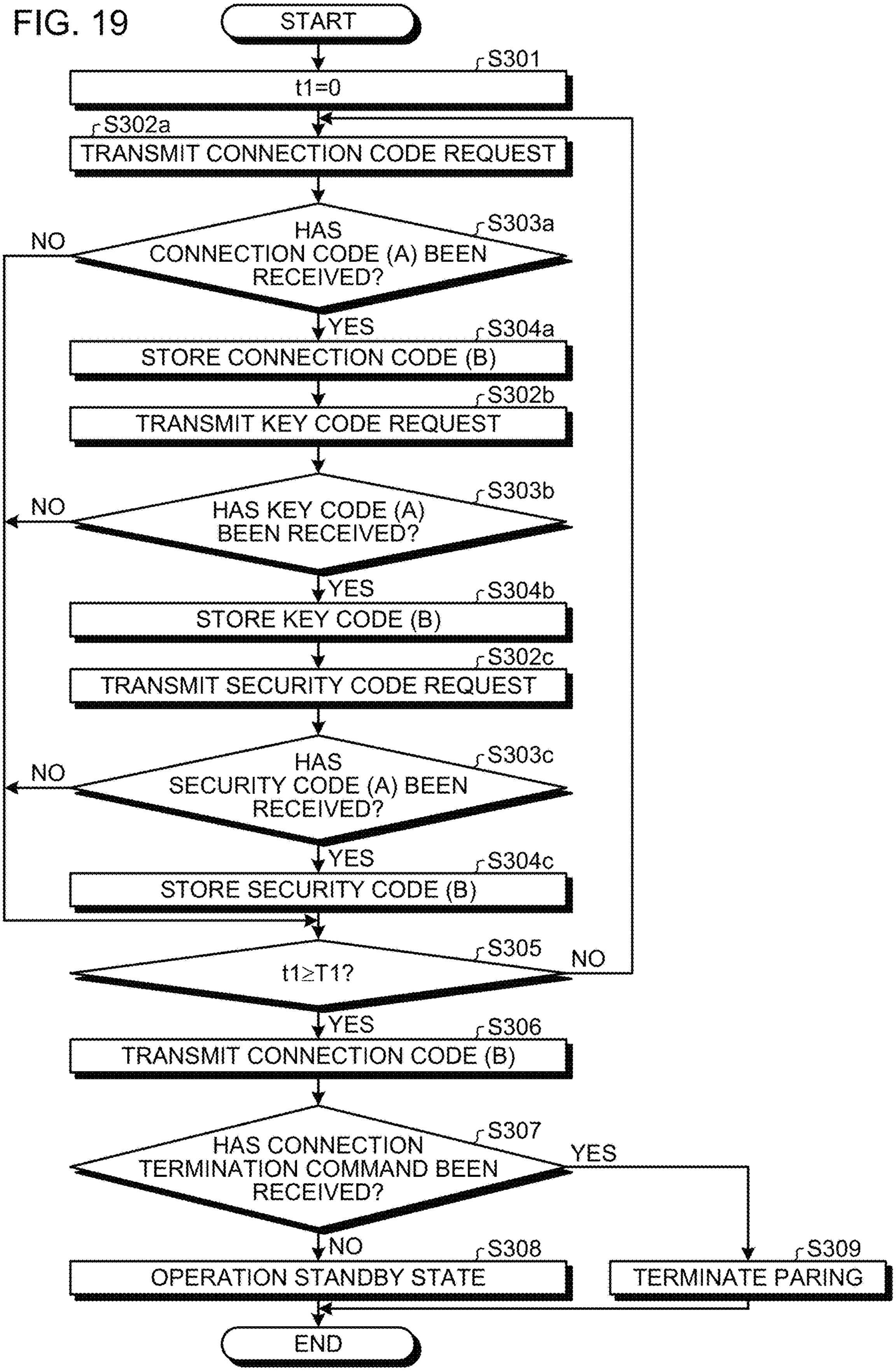
FIG. 19 is a flowchart illustrating an example of first processing of a master device according to the first embodiment.
Figure 20:
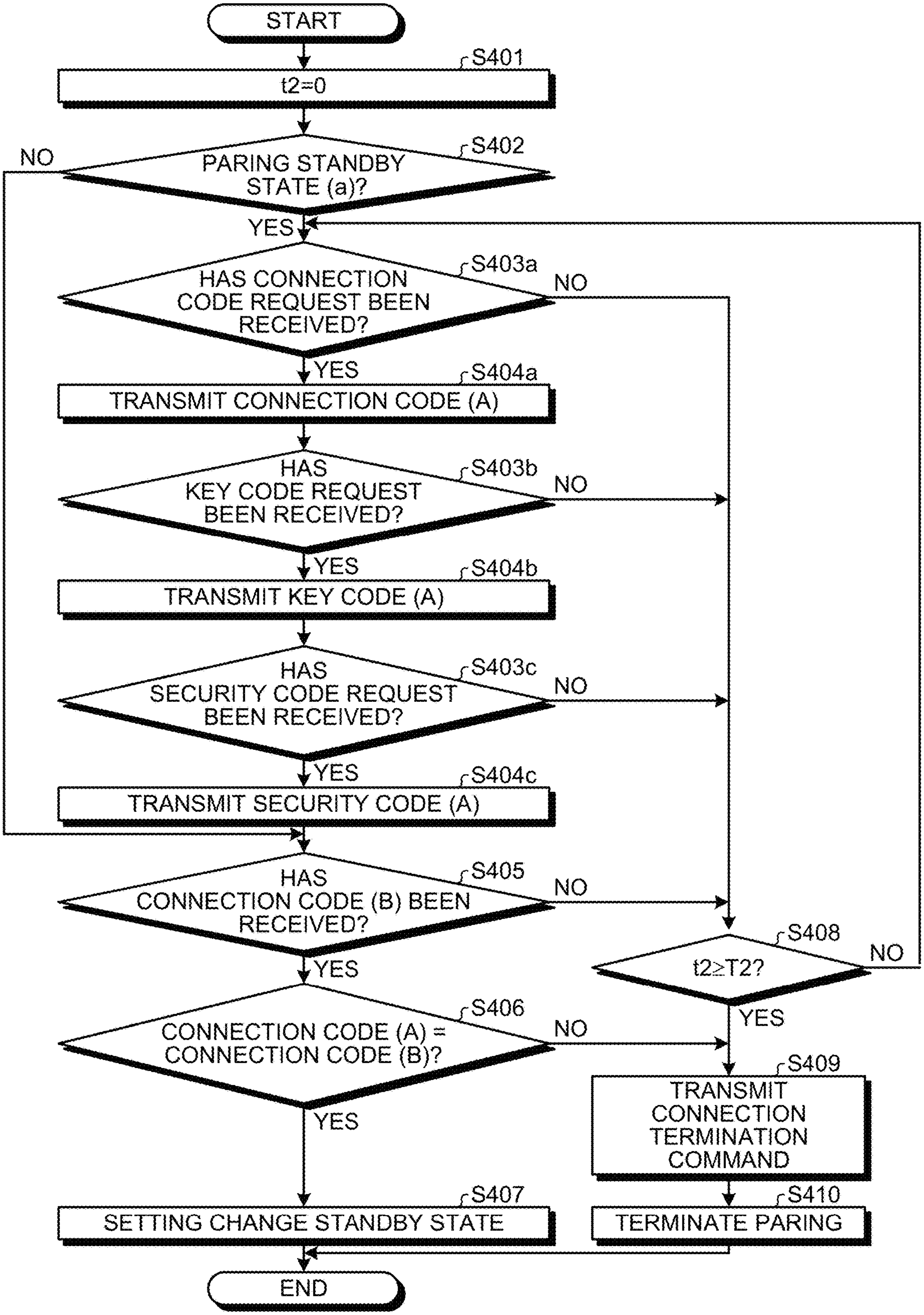
FIG. 20 is a flowchart illustrating an example of first processing of the slave device according to the first embodiment.

FIG. 17A is a first sequence diagram illustrating an example of connection establishment processing in the communication system according to the first embodiment. FIG. 17B is a second sequence diagram illustrating an example of connection establishment processing in the communication system according to the first embodiment. FIG. 17C is a third sequence diagram illustrating an example of connection establishment processing in the communication system according to the first embodiment. FIG. 17D is a fourth sequence diagram illustrating an example of connection establishment processing in the communication system according to the first embodiment. FIG. 18 is a flowchart illustrating an example of activation processing of the slave device 50 according to the first embodiment. FIG. 19 is a flowchart illustrating an example of first processing of the master device 60 according to the first embodiment. FIG. 20 is a flowchart illustrating an example of first processing of the slave device 50 according to the first embodiment.

The connection establishment processing illustrated in FIGS. 17A, 17B, 17C, and 17D is started based on power-on of the slave device 50. When the slave device 50 is powered on, the activation processing of the slave device 50 is executed (step S100 in FIGS. 17A, 17B, 17C, and 17D).

In the activation processing of the slave device 50 illustrated in FIG. 18, the slave device 50 determines whether connection code (A) (first connection code) is stored in the first storage 51 (step S101*a*). In a case where connection code (A) is not stored in the first storage 51 (No at step S101*a*), the slave device 50 executes initial activation processing at and after step S102*a*. In the initial activation processing, the slave device 50 generates a random multi-byte connection code (A) by using a random number table or the like stored in, for example, a storage region of the first storage 51 (step S102*a*), and stores the connection code (A) in the first storage 51 (step S103*a*).

Figure 21A:
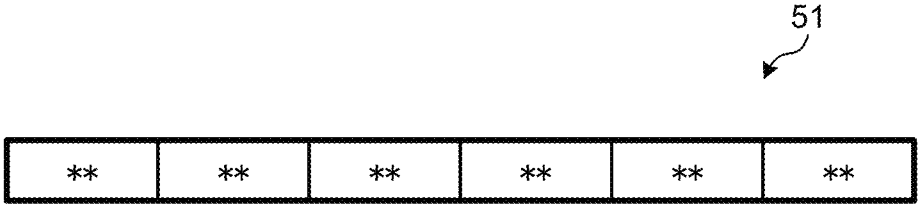
FIG. 21A is a schematic diagram of connection code (A) stored in a first storage of the slave device.

FIG. 21A is a schematic diagram of connection code (A) stored in the first storage 51 of the slave device 50. Connection code (A) illustrated in FIG. 21A is a 6-byte code of "0x, 0x, 0x, 0x, 0x, 0x", but the data length of connection code (A) is not limited to 6 bytes. Note that the initial value of connection code (A) stored in the first storage 51 of the slave device 50 is, for example, "Null value". The initial value of connection code (A) stored in the first storage 51 of the slave device 50 is not limited to "Null value".

Subsequently, the slave device 50 determines whether key code (A) (first key code) is stored in the first storage 51 (step S101*b*). In a case where key code (A) is not stored in the first storage 51 (No at step S101*b*), the slave device 50 generates a random multi-byte key code (A) by using a random number table or the like stored in, for example, a storage region of the first storage 51 (step S102*b*), and stores the key code (A) in the first storage 51 (step S103*b*).

Figure 21B:
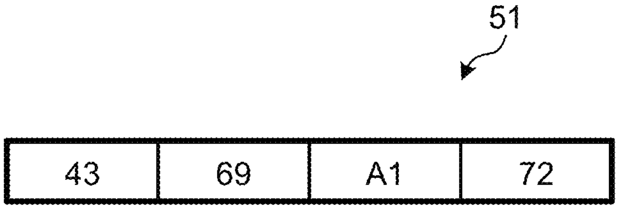
FIG. 21B is a schematic diagram of key code (A) stored in the first storage of the slave device.

FIG. 21B is a schematic diagram of key code (A) stored in the first storage 51 of the slave device 50. Key code (A) illustrated in FIG. 21B is a 4-byte code of "0x43, 0x69, 0xA1, 0x72", but the data length of key code (A) is not limited to 4 bytes. Note that the initial value of key code (A) stored in the first storage 51 of the slave device 50 is, for example, "Null value". The initial value of key code (A) stored in the first storage 51 of the slave device 50 is not limited to "Null value".

Subsequently, the slave device 50 determines whether security code (A) (first security code) is stored in the first storage 51 (step S101*c*). In a case where security code (A) is not stored in the first storage 51 (No at step S101*c*), the slave device 50 generates a random security code (A) in which a plurality of random number data corresponding to respective address data are assigned by using a random number table or the like stored in, for example, a storage region of the first storage 51 (step S102*c*), and stores the security code (A) in the first storage 51 (step S103*c*).

FIG. 21C is a first schematic diagram of security code (A) stored in the first storage 51 of the slave device 50. As illustrated in FIG. 21C, a plurality of random number data defined by a row-direction address α and a column-direction address β are two-dimensionally arrayed in security code (A). In the example illustrated in FIG. 21C, each of the random number data is a 1-byte code and corresponds to address data "0xαβ". Specifically, random number data corresponding to address data "0x17" is "0x12", random number data corresponding to address data "0x28" is "0xEF", random number data corresponding to address data "0x39" is "0x43", and random number data corresponding to address data "0x4A" is "0x68".

Although security code (A) illustrated in FIG. 21C is constituted by 36 ($N^2$ where N is a natural number) random number data of 6×6, the aspect of security code (A) is not limited thereto. FIG. 21D is a second schematic diagram of security code (A) stored in the first storage 51 of the slave device 50. The security code (A) illustrated in FIG. 21D is constituted by 65025 random number data of 255×255. In this case, specifically, random number data corresponding to address data "0x001100" is "0x12", random number data corresponding to address data "0x002101" is "0xEF", random number data corresponding to address data "0x003102" is "0x43", and random number data corresponding to address data "0x004103" is "0x68". Note that the initial value of random number data included in security code (A) stored in the first storage 51 of the slave device 50 is, for example, "Null value". The initial value of random number data included in security code (A) stored in the first storage 51 of the slave device 50 is not limited to "Null value".

When having stored connection code (A) (first connection code), key code (A) (first key code), and security code (A) (first security code) in the first storage 51 (steps S103*a*, S103*b*, and S103*c*), the slave device 50 transitions to pairing standby state (a) (step S104). At this time, the slave device 50 retains, in the first storage 51, that the slave device 50 is in pairing standby state (a), and ends the activation processing.

Note that, at factory shipment of the slave device 50, connection code (A), key code (A), and security code (A) are not set in the first storage 51. More specifically, as described above, they are set to their initial values, for example, "Null value". Through the initial activation processing after factory shipment of the slave device 50, connection code (A), key code (A), and security code (A) are set to random values by using a random number table or the like stored in, for example, a storage region of the first storage 51. Accordingly, in the second or subsequent activation processing after factory shipment of the slave device 50, connection code (A), key code (A), and security code (A) of values different from their initial set values are set in the first storage 51.

In a case where connection code (A), key code (A), and security code (A) of values different from their initial set values are set (Yes at step S101*b*), the slave device 50 does not execute the initial activation processing at and after step S102*a* but transitions to pairing standby state (b) (step S105). At this time, the slave device 50 retains, in the first storage 51, that the slave device 50 is in pairing standby state (b), and ends the activation processing.

Note that connection code (A), key code (A), and security code (A) stored in the first storage 51 can be erased by predetermined initializing processing. Specifically, in a case where transition is made to pairing standby state (a) in the above-described activation processing of the slave device 50 (step S104), connection code (A), key code (A), and security code (A) have their initial set values (for example, "Null value"), indicating that the current activation processing is the initial processing after factory shipment or after initialization. In a case where transition is made to pairing standby state (b) in the above-described activation processing of the slave device 50 (step S105), connection code (A), key code (A), and security code (A) are set to random values before the activation processing, indicating that the current activation processing is the second or subsequent processing after factory shipment or after initialization. Processing after execution of pairing between the slave device 50 and the master device 60 differs in accordance with whether the current activation processing is the initial activation processing after factory shipment or after initialization (pairing standby state (a)) or the second or subsequent activation processing after factory shipment or after initialization (pairing standby state (b)).

After pairing between the slave device 50 and the master device 60 is executed (step S200 in FIGS. 17A, 17B, 17C, and 17D) and communication connection between the slave device 50 and the master device 60 is established, the first processing of the master device 60 illustrated in FIG. 19 and the first processing of the slave device 50 illustrated in FIG. 20 are executed.

In the first processing of the master device 60 illustrated in FIG. 19, the master device 60 activates a first timer t1 (t1=0; step S301) and transmits a connection code request for requesting the slave device 50 to transmit connection code (A) (step S302*a*).

Meanwhile, in the first processing of the slave device 50 illustrated in FIG. 20, the slave device 50 activates a second timer t2 (t2=0; step S401) and determines whether the slave device 50 is in pairing standby state (a) (step S402). Specifically, it is determined whether the above-described activation processing is the initial activation processing after factory shipment or after initialization of the slave device 50.

In a case where the slave device 50 is in pairing standby state (a) (Yes at step S402), in other words, in a case where the above-described activation processing is the initial activation processing after factory shipment or after initialization of the slave device 50, the slave device 50 determines whether the connection code request transmitted from the master device 60 has been received (step S403*a*). In a case where the connection code request has been received (Yes at step S403*a*), the slave device 50 reads the connection code (A) (first connection code) stored in the first storage 51 and transmits the connection code (A) to the master device 60 (step S404*a*).

Figure 22A:
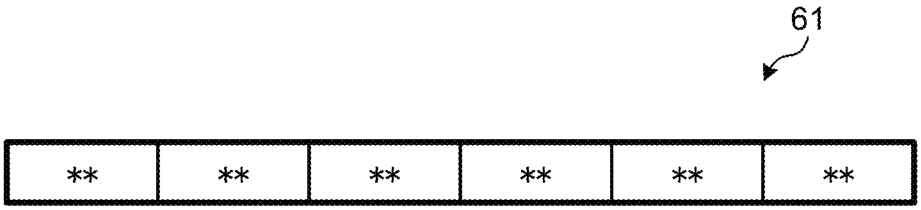
FIG. 22A is a schematic diagram of connection code (B) stored in a second storage of the master device.

The master device 60 determines whether the connection code (A) transmitted from the slave device 50 has been received (step S303*a*). In a case where the connection code (A) has been received from the slave device 50 (Yes at step S303*a*), the master device 60 stores the received connection code (A) (first connection code) as connection code (B) (second connection code) in the second storage 61 (step S304*a*). FIG. 22A is a schematic diagram of connection code (B) stored in the second storage 61 of the master device 60. Note that the initial value of connection code (B) stored in the second storage 61 of the master device 60 is, for example, "Null value". The initial value of connection code (B) stored in the second storage 61 of the master device 60 is not limited to "Null value".

Subsequently, the master device 60 transmits a key code request to the slave device 50 for requesting the transmission of key code (A) (step S302*b*).

The slave device 50 determines whether the key code request transmitted from the master device 60 has been received (step S403*b*). In a case where the key code request has been received (Yes at step S403*b*), the slave device 50 reads the key code (A) (first key code) stored in the first storage 51 and transmits the key code (A) to the master device 60 (step S404*b*).

Figure 22B:
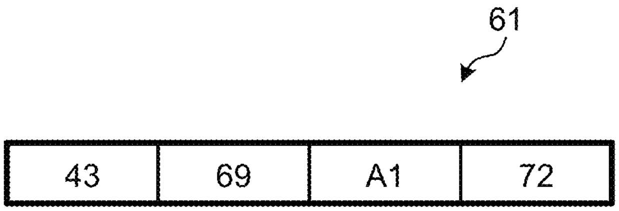
FIG. 22B is a schematic diagram of key code (B) stored in the second storage of the master device.

The master device 60 determines whether the key code (A) transmitted from the slave device 50 has been received (step S303*b*). In a case where the key code (A) has been received from the slave device 50 (Yes at step S303*b*), the master device 60 stores the received key code (A) (first key code) as key code (B) (second key code) in the second storage 61 (step S304*b*). FIG. 22B is a schematic diagram of key code (B) stored in the second storage 61 of the master device 60. Note that the initial value of key code (B) stored in the second storage 61 of the master device 60 is, for example, "Null value". The initial value of key code (B) stored in the second storage 61 of the master device 60 is not limited to "Null value".

Subsequently, the master device 60 transmits a security code request to the slave device 50 for requesting the transmission of security code (A) (step S302*c*).

The slave device 50 determines whether the security code request transmitted from the master device 60 has been received (step S403*c*). In a case where the security code request has been received from the master device 60 (Yes at step S403*c*), the slave device 50 reads security code (A)

(first security code) stored in the first storage 51 and transmits the security code (A) to the master device 60 (step S404*c*).

The master device 60 determines whether the security code (A) transmitted from the slave device 50 has been received (step S303*c*). In a case where the security code (A) has been received from the slave device 50 (Yes at step S303*c*), the master device 60 stores the received security code (A) (first security code) as the security code (B) (second security code) in the second storage 61 (step S304*c*). FIG. 22C is a first schematic diagram of security code (B) stored in the second storage 61 of the master device 60. That is, security code (B) (FIG. 22C) and security code (A) (FIG. 21C) include the same two-dimensional array. By receiving a security code from the slave device 50, the master device 60 has security code (B) identical to security code (A) that the slave device 50 initially has. FIG. 22D is a second schematic diagram of security code (B) stored in the second storage 61 of the master device 60. Note that the initial value of random number data included in security code (B) stored in the second storage 61 of the master device 60 is, for example, "Null value". The initial value of random number data included in security code (B) stored in the second storage 61 of the master device 60 is not limited to "Null value". Note that the master device 60 determines a matrix of a two-dimensional array based on the number of random number data in security code (A) transmitted from the slave device 50. Security code (A) is constituted by 36 random number data in the present embodiment, and the master device 60 determines that the security code (A) forms a two-dimensional array of 6×6 based on the number of the 36 random number data, and constructs security code (B). Security code (A) may include (n+1)×n random number data (for example, 256×255). In this case, the master device 60 constructs an (n+1)-column×n-row security code (B), prioritizing the number of columns being larger than the number of rows.

Subsequently, the master device 60 determines whether the first timer t1 is equal to or larger than a first timer threshold T1 (for example, 10 [sec]) (step S305). In a case where the first timer t1 is smaller than the first timer threshold T1 (No at step S305), the master device 60 repeatedly executes the processing at and after step S302*a* and transmits connection code (B) (second connection code) to the slave device 50 when the first timer t1 has become equal to or larger than the first timer threshold T1 (step S306).

In a case where the connection code request, the key code request, and the security code request transmitted from the master device 60 have not been received (No at step S403*a*; No at step S403*b*; No at step S403*c*) or in a case where the connection code (B) has not been received from the master device 60 (No at step S405), the slave device 50 determines whether the second timer t2 is equal to or larger than a second timer threshold T2 (for example, 10 [sec]) (step S408). In a case where the second timer t2 is smaller than the second timer threshold T2 (No at step S408), the slave device 50 repeatedly executes the processing at and after step S403*a*.

The slave device 50 determines whether the connection code (B) transmitted from the master device 60 has been received (step S405). In a case where the connection code (B) has been received from the master device 60 (Yes at step S405), the slave device 50 reads the connection code (A) (first connection code) stored in the first storage 51 and determines whether the connection code (A) (first connection code) and the connection code (B) (second connection code) received from the master device 60 match (connection code (A)=connection code (B); step S406).

In a case where the connection code (A) (first connection code) and the connection code (B) (second connection code) match (Yes at step S406), the slave device 50 transitions to a standby state. Specifically, for example, in a case where the slave device 50 is the illumination device 1 according to the embodiment, the slave device 50 transitions to a setting change standby state for various setting values (in the present disclosure, light distribution values) of the illumination device 1 and the like (step S407) to end the first processing of the slave device 50 illustrated in FIG. 20.

In a case where the second timer t2 is equal to or larger than the second timer threshold T2 (Yes at step S408) or connection code (A) (first connection code) and connection code (B) (second connection code) do not match (No at step S406), the slave device 50 transmits, to the master device 60, a connection termination command for terminating pairing between the slave device 50 and the master device 60 (step S409).

The master device 60 determines whether the connection termination command transmitted from the slave device 50 has been received (step S307). In a case where the connection termination command has not been received from the slave device 50 (No at step S307), the master device 60 transitions to a standby state. Specifically, for example, in a case where the master device 60 is the control device 200 for controlling the illumination device 1 according to the embodiment, the master device 60 transitions to an operation standby state for various setting values (in the present disclosure, light distribution values) of the illumination device 1 and the like (step S308) to end the first processing of the master device 60 illustrated in FIG. 19.

In a case where the connection termination command has been transmitted from the slave device 50 (step S409) and the master device 60 has received the connection termination command from the slave device 50 (Yes at step S307), pairing between the slave device 50 and the master device 60 is terminated (step S309 and step S410) to end the first processing of the master device 60 illustrated in FIG. 19 and the first processing of the slave device 50 illustrated in FIG. 20.

In a case where the slave device 50 is in pairing standby state (b) (No at step S402), in other words, in a case where the above-described activation processing is the second or subsequent activation processing after factory shipment or after initialization of the slave device 50, the slave device 50 transitions to step S405 and determines whether connection code (B) transmitted from the master device 60 has been received. Subsequent processing is the same as in the case of pairing standby state (a).

Cases corresponding to "a case where the slave device 50 is in pairing standby state (b) (No at step S402), in other words, a case where the above-described activation processing is the second or subsequent activation processing after factory shipment or after initialization of the slave device 50" are assumed to be two cases, namely, "a case where the master device 60 currently executing the connection establishment processing is the same as the master device 60 having previously executed the connection establishment processing including the initial activation processing after factory shipment or after initialization of the slave device 50" and "a case where the master device 60 currently executing the connection establishment processing is different from the master device 60 having previously executed the connection establishment processing including the initial activation processing after factory shipment or after initialization of the slave device 50".

In "a case where the master device 60 currently executing the connection establishment processing is the same as the master device 60 having previously executed the connection establishment processing including the initial activation processing after factory shipment or after initialization of the slave device 50", as illustrated in FIG. 17C, the connection code (A) (first connection code) stored in the first storage 51 of the slave device 50 and the connection code (B) (second connection code) received by the slave device 50 at step S405 match (Yes at step S406), and the slave device 50 and the master device 60 each transition to a standby state normally (step S308 and step S407).

In "a case where the master device 60 currently executing the connection establishment processing is different from the master device 60 having previously executed the connection establishment processing including the initial activation processing after factory shipment or after initialization of the slave device 50", as illustrated in FIG. 17D, the connection code (A) (first connection code) stored in the first storage 51 of the slave device 50 and the connection code (B) (second connection code) received by the slave device 50 at step S405 do not match (No at step S406), and pairing between the slave device 50 and the master device 60 is terminated (step S309 and step S410).

Note that, even in "a case where the master device 60 currently executing the connection establishment processing is different from the master device 60 having previously executed the connection establishment processing including the initial activation processing after factory shipment or after initialization of the slave device 50", for example, connection code (A) (first connection code) stored in the first storage 51 of the slave device 50 is hacked by malicious users or software and the slave device 50 and the master device 60 each unjustly transition to a standby state (step S308 and step S407), potentially resulting in a state in which normal control cannot be performed.

Figure 23A:
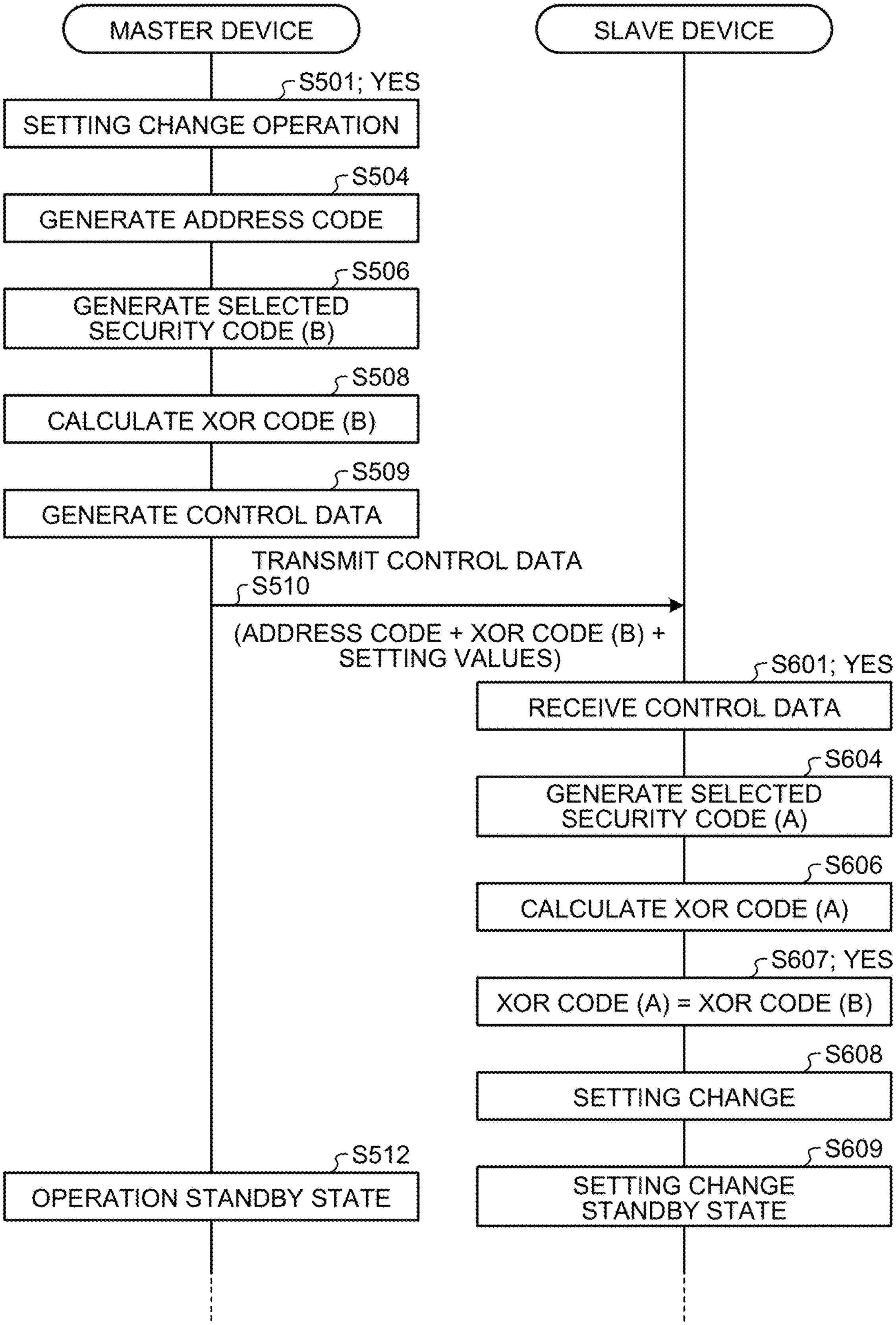
FIG. 23A is a first sequence diagram illustrating an example of data transmission-reception processing in the communication system according to the first embodiment.
Figure 23B:
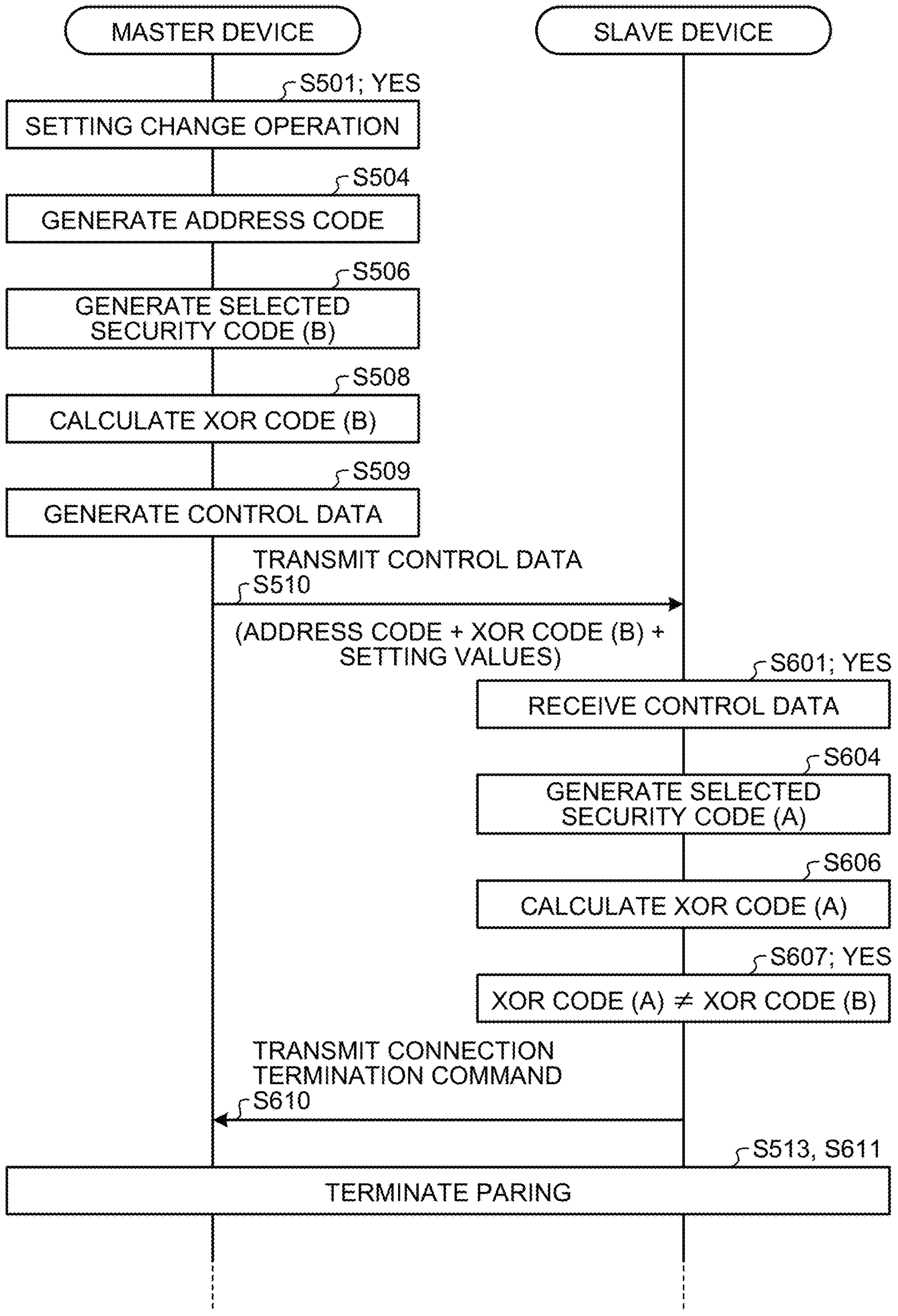
FIG. 23B is a second sequence diagram illustrating an example of data transmission-reception processing in the communication system according to the first embodiment.
Figure 24:
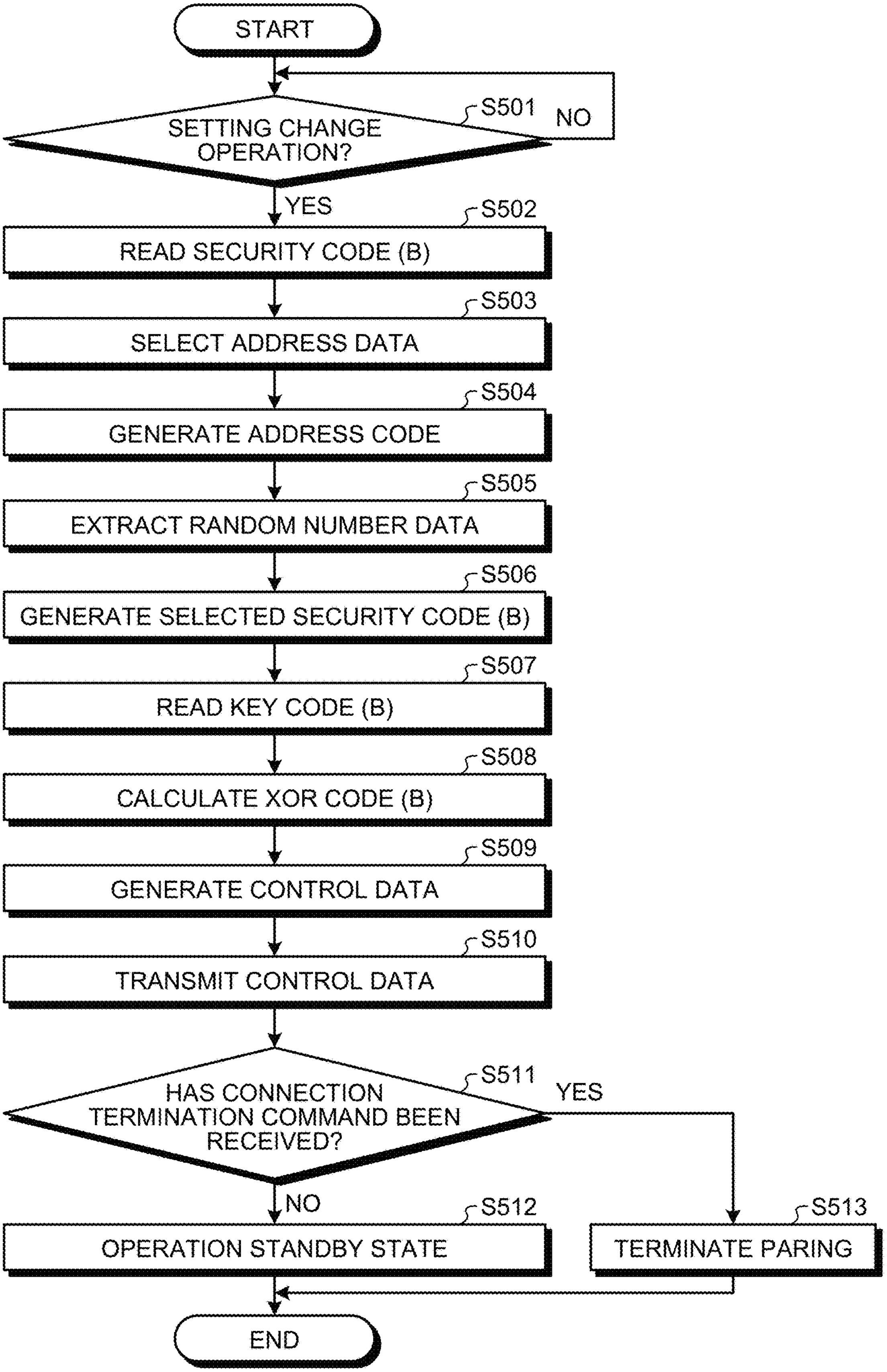
FIG. 24 is a flowchart illustrating an example of second processing of the master device according to the first embodiment.
Figure 25:
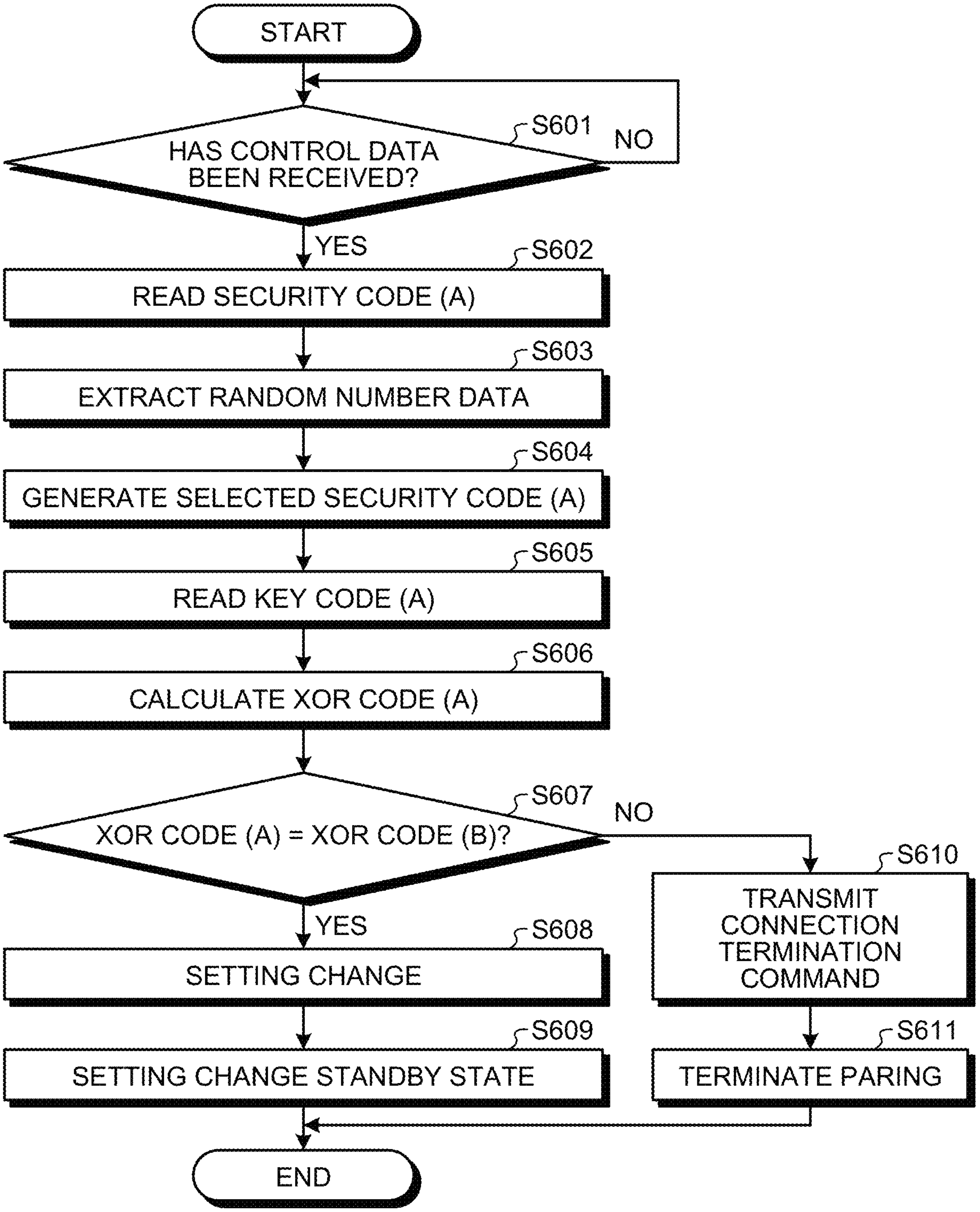
FIG. 25 is a flowchart illustrating an example of second processing of the slave device according to the first embodiment.

FIG. 23A is a first sequence diagram illustrating an example of data transmission-reception processing in the communication system according to the first embodiment. FIG. 23B is a second sequence diagram illustrating an example of data transmission-reception processing in the communication system according to the first embodiment. FIG. 24 is a flowchart illustrating an example of second processing of the master device 60 according to the first embodiment. FIG. 25 is a flowchart illustrating an example of second processing of the slave device 50 according to the first embodiment.

The data transmission-reception processing illustrated in FIGS. 23A and 23B is executed after the above-described connection establishment processing illustrated in FIG. 17A or 17C. More specifically, the second processing of the master device 60 illustrated in FIG. 24 is executed based on execution of a setting change operation of the slave device 50 on the master device 60 (step S501) after transition to an operation standby state in the first processing of the master device 60 illustrated in FIG. 19 (step S308). The second processing of the slave device 50 illustrated in FIG. 25 is executed based on reception of control data transmitted from the master device 60 (step S601) after transition to a setting change standby state in the first processing of the slave device 50 illustrated in FIG. 20 (step S407).

In the second processing of the master device 60 illustrated in FIG. 24, for example, in a case where the master device 60 is the control device 200 for controlling the illumination device 1 according to the embodiment, the master device 60 repeatedly executes determination processing (step S501) of determining whether a setting change operation for various setting values (in the present disclosure, light distribution values) of the illumination device 1 and the like corresponding to the slave device 50 has been performed on the setting change screen illustrated in FIG. 13, while a setting change operation of the slave device 50 (illumination device 1) is not performed (No at step S501). More specifically, the setting change operation of the illumination device 1 is assumed to be, for example, an operation that a user touches the first slider S1 and moves the first slider S1 in the H direction on the setting change screen illustrated in FIG. 13 to change the light distribution value Sh of the illumination device 1 in the H direction.

In a case where the setting change operation of the slave device 50 (illumination device 1) has been performed (Yes at step S501), the master device 60 (control device 200) reads the security code (B) (second security code) stored in the second storage 61 (step S502), randomly selects a plurality of address data from the security code (B) (step S503), and arranges the address data in the selection order to generate an address code (step S504).

Then, the master device 60 extracts, from the security code (B), random number data corresponding to the respective address data included in the generated address code (step S505), and arranges the extracted random number data in the order of selected address data to generate selected security code (B) (second selected security code) (step S506).

Figure 26C:
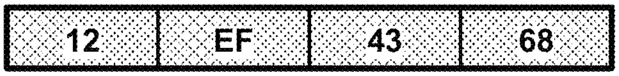
FIG. 26C is a schematic diagram of selected security code (B) in which random number data extracted from security code (B) is arranged in the order of selected address data.

FIG. 26A is a schematic diagram of security code (B) stored in the second storage 61 of the master device 60. FIG. 26A exemplarily illustrates security code (B) with α rows and β columns, which is defined by the row-direction address α and the column-direction address β. FIG. 26B is a schematic diagram of an address code in which address data selected from security code (B) is arranged in the selection order. The address code illustrated in FIG. 26B exemplarily indicates an aspect in which address data corresponding to hatched parts of the security code (B) illustrated in FIG. 26A is arranged in the selection order. FIG. 26C is a schematic diagram of selected security code (B) in which random number data extracted from security code (B) is arranged in the order of selected address data. The security code (B) illustrated in FIG. 26C exemplarily indicates an aspect in which random number data corresponding to respective address data of the address code illustrated in FIG. 26B are extracted from the security code (B) illustrated in FIG. 26A in the selection order of the address data.

In the example illustrated in FIGS. 26A, 26B, and 26C, the master device 60 (control device 200) randomly selects address data "0x17", address data "0x28", address data "0x39", and address data "0x4A" in the stated order from the security code (B) (FIG. 26A). Then, the master device 60 generates address code "0x1728394A" (FIG. 26B) in which these address data are arranged in the stated order. The master device 60 further generates selected security code (B) "0x12EF4368" (FIG. 26C) in which random number data "0x12" corresponding to address data "0x17", random number data "0xEF" corresponding to address data "0x28", random number data "0x43" corresponding to address data "0x39", and random number data "0x68" corresponding to address data "0x4A" are arranged in the selection order of address data. As illustrated in FIG. 26B, the data length of address code is 4 bytes, which is the same as that of key code (B) (second key code). Thus, as illustrated in FIG. 26C, similarly, the data length of selected security code (B) (second selected security code) in which random number data corresponding to the respective address data of the address code are arranged is 4 bytes, which is the same as that of key code (B). Key code (B), address code, and selected security code (B) are not limited to 4-byte codes, but at least key code (B) and address code need to be codes of the same length, and more preferably, all codes may be codes of the same length. In a case where a security code is large (for example, 256×255), the numbers of digits may be different between the columns and rows of randomly selected address data. More specifically, in a case where a security code is a two-dimensional array of 256×255, for example, the second column and the 255-th row are employed as address data. In this case, the master device 60 prepends "0" to address data with the smaller number of digits for orientation with the larger number of digits. That is, where the actual address data is "0x2 (column) 1FE (row)", a measure is taken to align the numbers of digits in the vertical and horizontal address data by setting "0x002 (column) 1FE (row)".

Subsequently, the master device 60 reads key code (B) (second key code) stored in the second storage 61 (step S507) and performs an XOR operation on the selected security code (B) (second selected security code) generated at step S506 using the key code (B) (second key code) read at step S507 to calculate XOR code (B) (second code) (step S508).

Figure 26D:
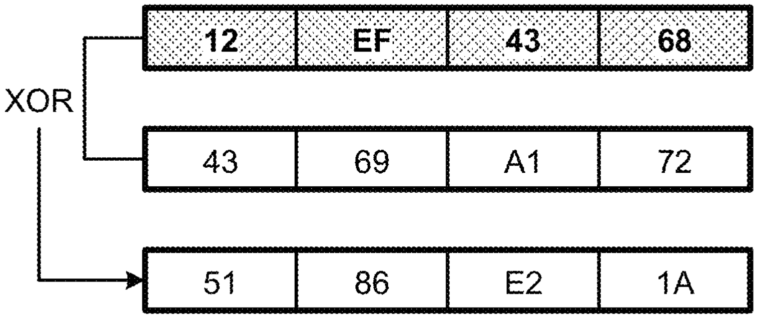
FIG. 26D is a schematic diagram illustrating a calculation example of XOR code (B)

FIG. 26D is a schematic diagram illustrating a calculation example of XOR code (B). In the example illustrated in FIG. 26D, an XOR operation is performed on the selected security code (B) "0x12EF4368" generated at step S506 using key code (B) "0x4369A172" stored in the second storage 61 to calculate an XOR code (B) "0x5186E21A".

Then, the master device 60 generates control data in which the address code generated at step S504 and the XOR code (B) (second code) calculated at step S508 are added to setting values of the slave device 50 (for example, the illumination device 1) (step S509), and transmits the control data to the slave device 50 (step S510).

The slave device 50 (illumination device 1) repeatedly executes determination processing (step S601) of determining whether the control data from the master device 60 (control device 200) to the own device has been received, while the control data from the master device 60 is not received (No at step S601).

In a case where the control data from the master device 60 has been received (Yes at step S601), the slave device 50 reads security code (A) (first security code) stored in the first storage 51 (step S602), extracts, in the arrangement order of a plurality of address data included in the address code added to the setting values included in the control data received from the master device 60, random number data corresponding to the respective address data from the read security code (A) (step S603), and generates first selected security code (A) (step S604).

FIG. 26E is a schematic diagram of security code (A) stored in the first storage of the slave device. FIG. 26F is a schematic diagram of selected security code (A) in which random number data extracted from security code (A) is arranged in the order of received address data.

In the example illustrated in FIGS. 26E and 26F, the selected security code (A) "0x12EF4368" (FIG. 26F) in which random number data "0x12" corresponding to address data "0x17", random number data "0xEF" corresponding to address data "0x28", random number data "0x43" corresponding to address data "0x39", and random number data "0x68" corresponding to address data "0x4A" are arranged is generated from the security code (A) (FIG. 26E) in the arrangement order of address data "0x17", address data "0x28", address data "0x39", and address data "0x4A" included in the address code received from the master device 60. As illustrated in FIG. 26F, the data length of the selected security code (A) (first selected security code) in which random number data corresponding to respective address data of the address code are arranged is 4 bytes, which is the same as that of key code (A). Note that, in a case where key code (A) and address code are not 4-byte codes, selected security code (A) only needs to be a code of the same length as that of key code (A) and address code.

Subsequently, the slave device 50 reads key code (A) (first key code) stored in the first storage 51 (step S605) and calculates an XOR code (A) (first code) through an XOR operation on the selected security code (A) (first selected security code) generated at step S604 using the key code (A) (first key code) read at step S605 (step S606).

Figure 26G:
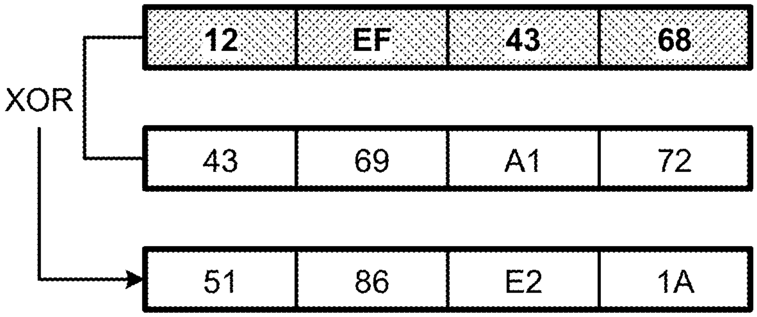
FIG. 26G is a schematic diagram illustrating a calculation example of XOR code (A)

FIG. 26G is a schematic diagram illustrating a calculation example of XOR code (A). In the example illustrated in FIG. 26G, an XOR operation is performed on the selected security code (A) "0x12EF4368" generated at step S604 using key code (A) "0x4369A172" stored in the first storage 51 to calculate an XOR code (A) "0x5186E21A". Then, the slave device 50 determines whether the XOR code (A) (first code) calculated at step S606 and the XOR code (B) (second code) added to the setting values included in the control data received from the master device 60 match (XOR code (A)=XOR code (B); step S607).

In a case where the XOR code (A) (first code) and the XOR code (B) (second code) match (Yes at step S607), the slave device 50 executes setting change of the own device based on the setting values included in the control data received from the master device 60 (step S608), and transitions to a standby state. Specifically, for example, in a case where the slave device 50 is the illumination device 1 according to the embodiment, the slave device 50 executes setting change of various setting values (in the present disclosure, light distribution values) of the illumination device 1 and the like (step S608), and then transitions to a setting change standby state (step S609) to end the second processing of the slave device 50 illustrated in FIG. 25.

In a case where the XOR code (A) (first code) and the XOR code (B) (second code) do not match (No at step S607), the slave device 50 transmits, to the master device 60, a connection termination command for terminating pairing between the slave device 50 and the master device 60 (step S610).

The master device 60 determines whether the connection termination command transmitted from the slave device 50 has been received (step S511). In a case where the connection termination command has not been received from the slave device 50 (No at step S511), the master device 60 transitions to a standby state. Specifically, for example, in a case where the master device 60 is the control device 200 for controlling the illumination device 1 according to the embodiment, the master device 60 transitions to an operation standby state for various setting values (in the present disclosure, light distribution values) of the illumination device 1 and the like (step S512) to end the second processing of the master device 60 illustrated in FIG. 24.

In a case where the connection termination command has been transmitted from the slave device 50 (step S610) and the master device 60 has received the connection termination command from the slave device 50 (Yes at step S511), pairing between the slave device 50 and the master device 60 is terminated (step S513 and step S611) to end the second processing of the master device 60 illustrated in FIG. 24 and the second processing of the slave device 50 illustrated in FIG. 25.

In the present embodiment, in the data transmission-reception processing when control data of various setting values and the like is transmitted and received, in addition to the above-described connection establishment processing, XOR code (B) (second code) is calculated through an XOR operation on selected security code (B) (second selected security code) generated based on an address code generated by the master device 60 and security code (B) (second security code) retained by the master device 60, using key code (B) retained by the master device 60, and is added to the setting values together with the address code and transmitted to the slave device 50, XOR code (A) (first code) is calculated through an XOR operation on selected security code (A) (first selected security code) generated based on the address code received from the master device 60 and security code (A) (first security code) retained by the slave device 50, using key code (A) retained by the slave device 50, and is subjected to match determination with XOR code (B) (second code) received from the master device 60, and communication connection between the slave device 50 and the master device 60 is disconnected in a case where the codes do not match.

Accordingly, in the connection establishment processing, for example, even in a case where connection code (A) (first connection code) stored in the first storage 51 of the slave device 50 is hacked by malicious users and/or software, and communication connection to a network between the slave device 50 and the master device 60 is unjustly made from the outside, further encryption is implemented in the data transmission-reception processing of transmitting and receiving control data of various setting values and the like, which enables realization of a more secure communication connection environment.

Note that, in the aspect described above in the present embodiment, connection codes are exchanged between the slave device 50 and the master device 60 in the connection establishment processing, but the present disclosure is not limited thereto. That is, connection codes may not be exchanged between the slave device 50 and the master device 60 in the connection establishment processing. In this case as well, a secure communication connection environment can be realized in the above-described data transmission-reception processing when control data of various setting values and the like is transmitted and received.

Second Embodiment

Figure 27A:
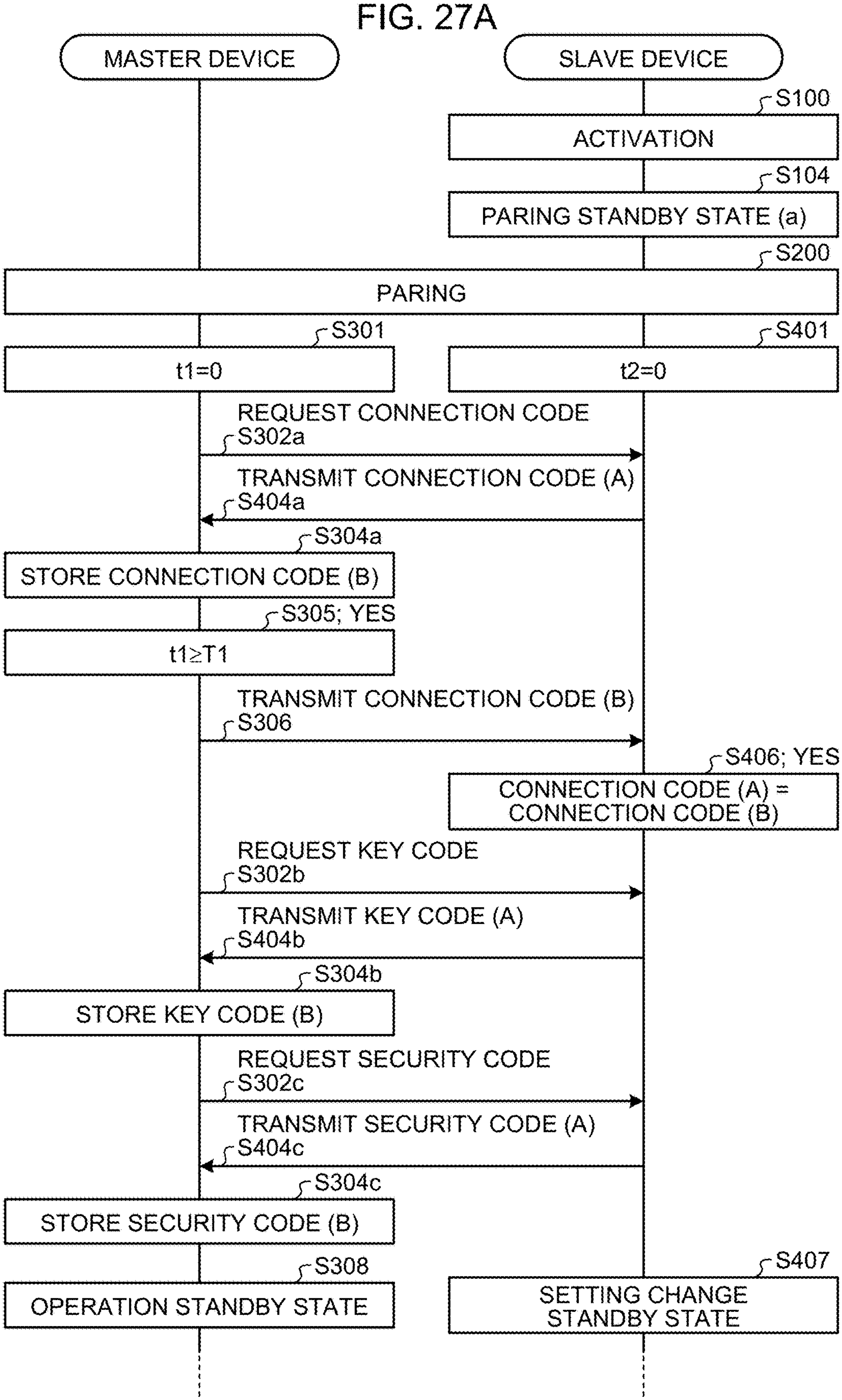
FIG. 27A is a first sequence diagram illustrating an example of connection establishment processing in a communication system according to a second embodiment.
Figure 27B:
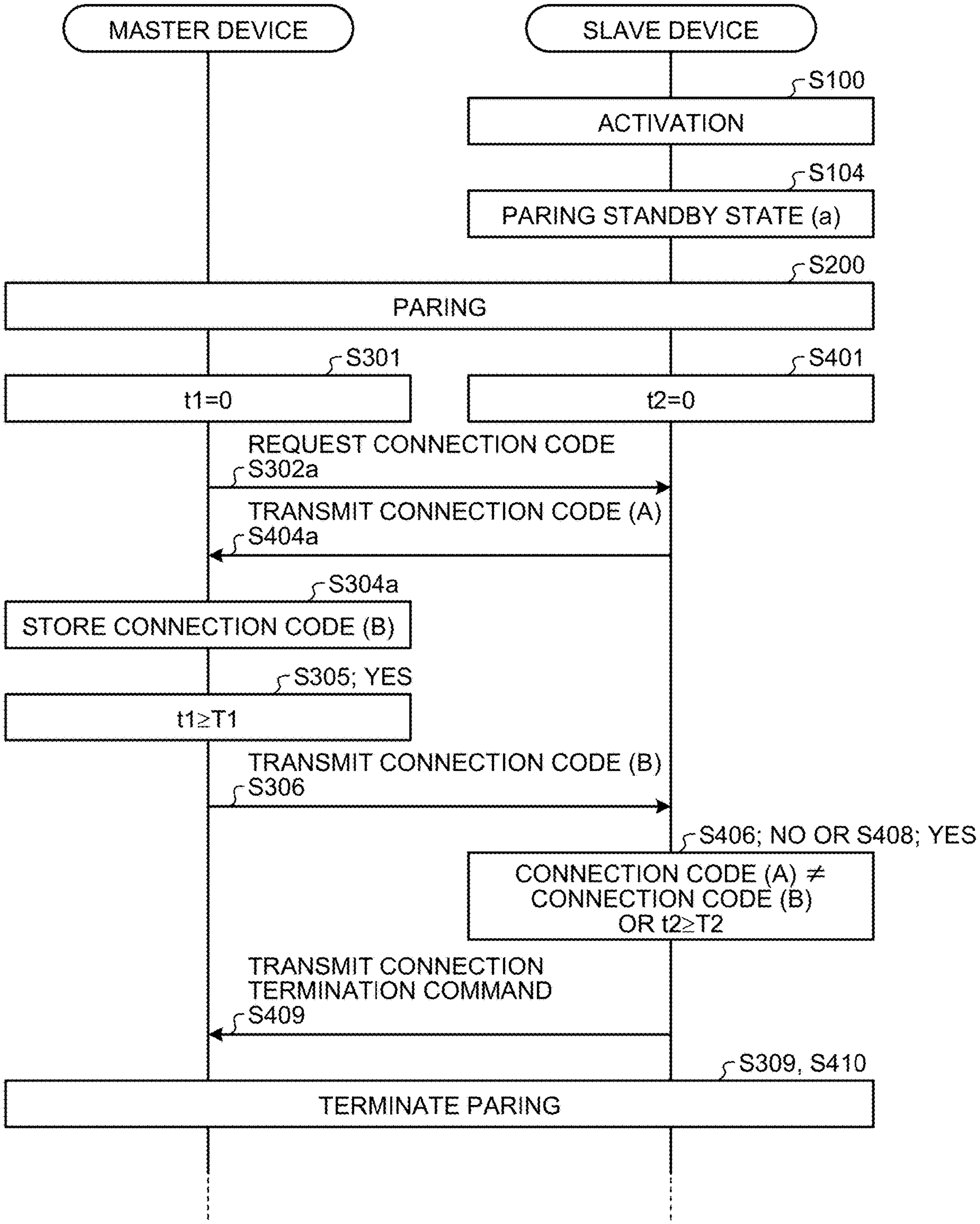
FIG. 27B is a second sequence diagram illustrating an example of connection establishment processing in the communication system according to the second embodiment.
Figure 27C:
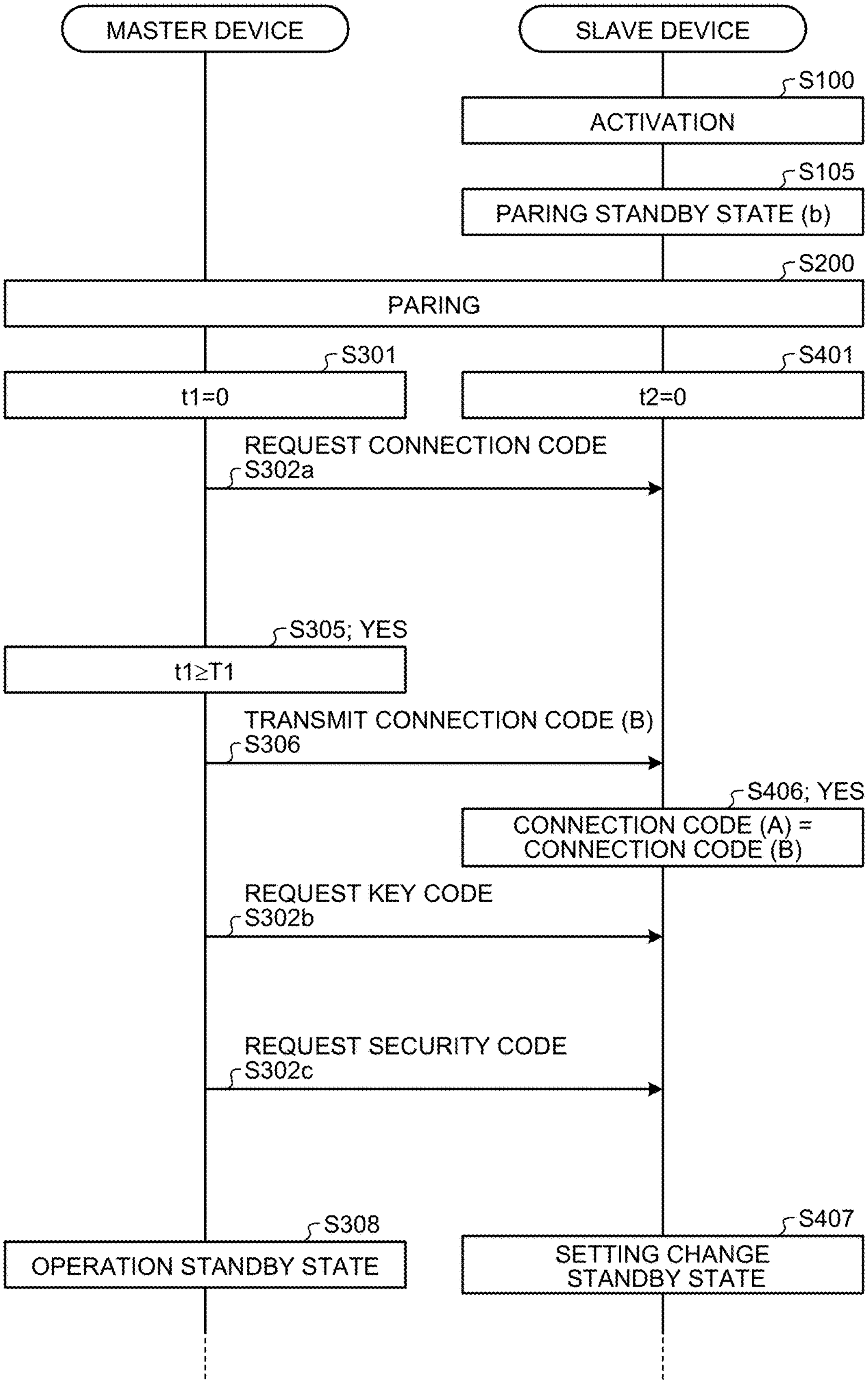
FIG. 27C is a third sequence diagram illustrating an example of connection establishment processing in the communication system according to the second embodiment.
Figure 27D:
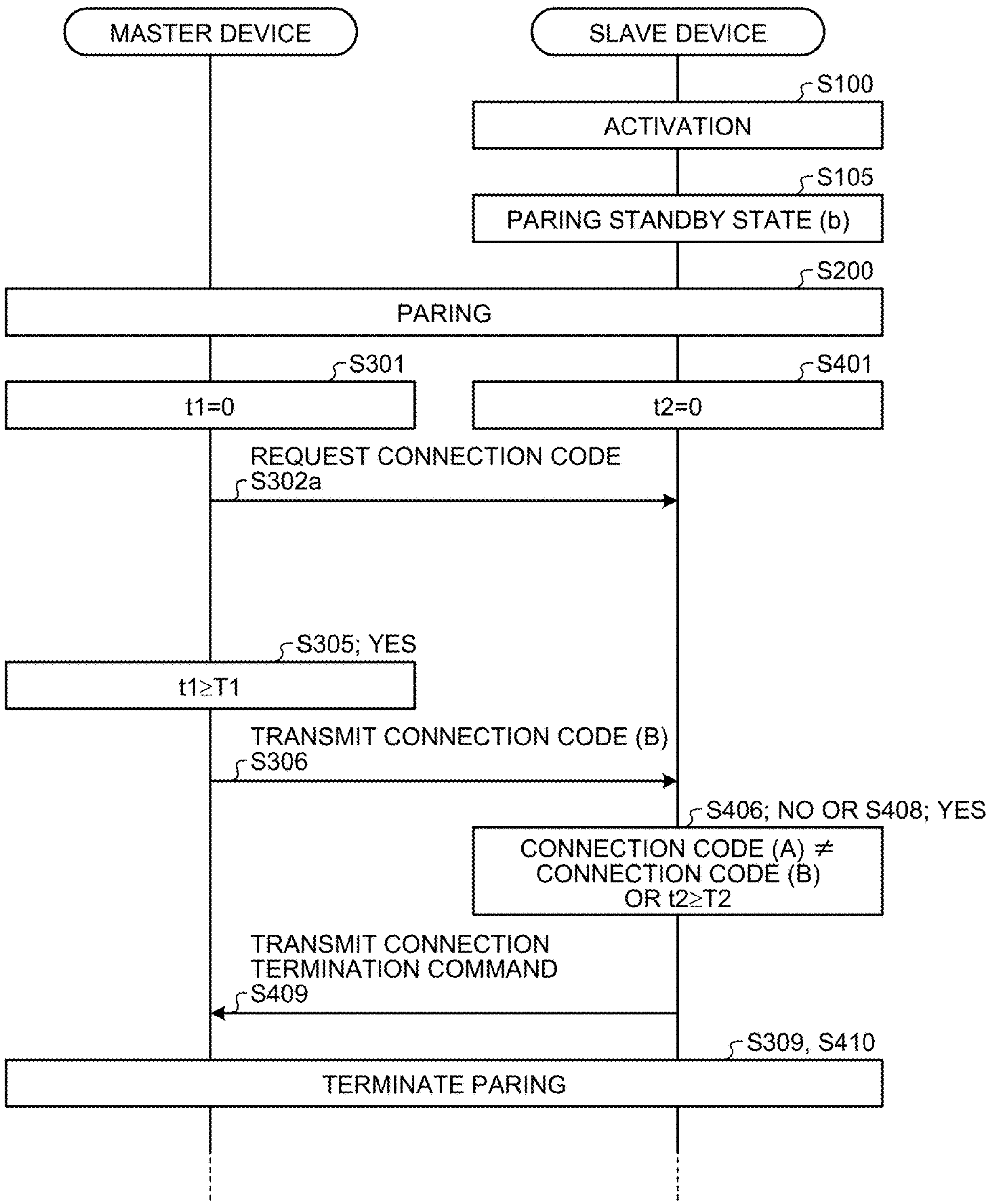
FIG. 27D is a fourth sequence diagram illustrating an example of connection establishment processing in the communication system according to the second embodiment.
Figure 28:
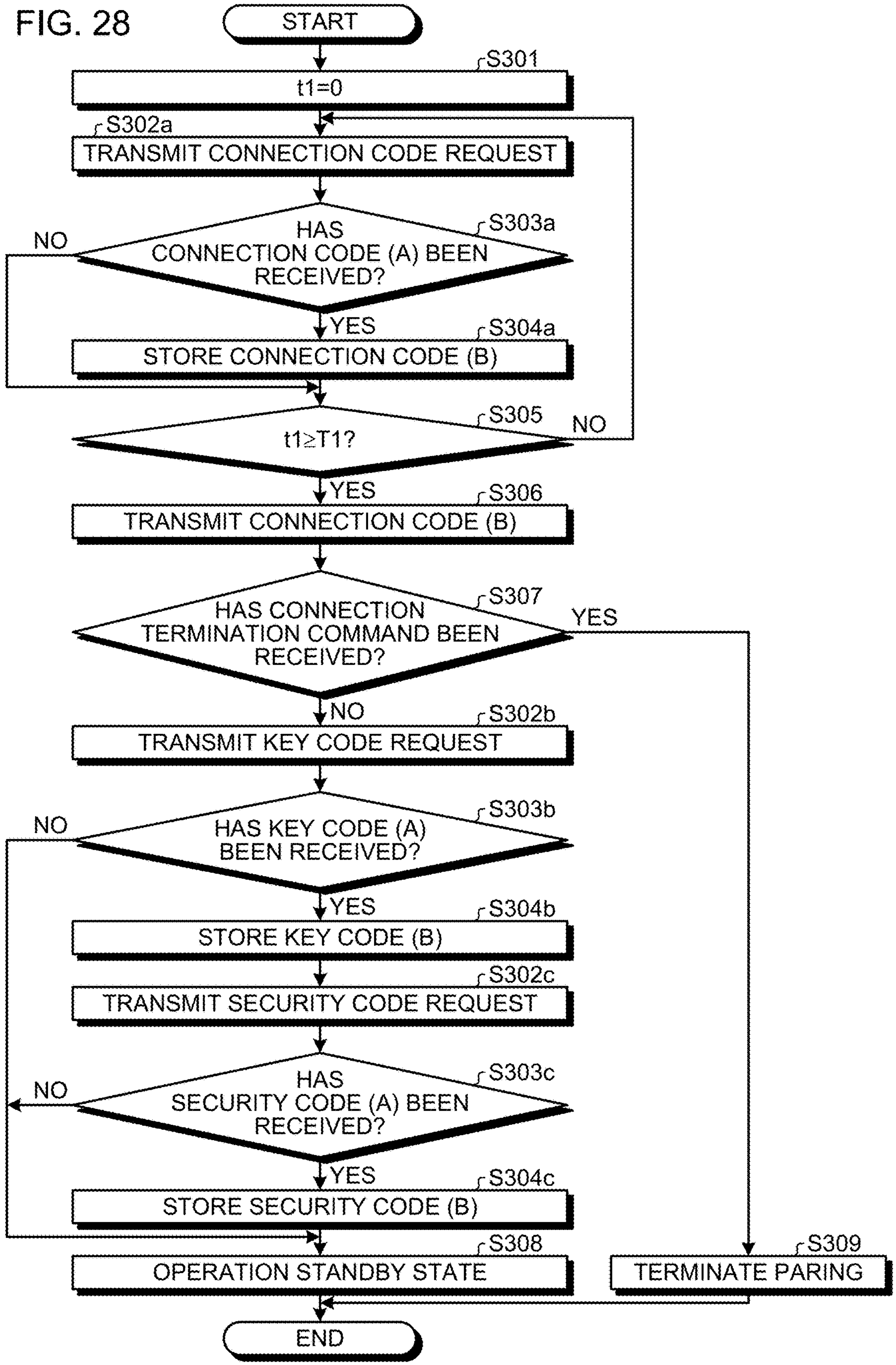
FIG. 28 is a flowchart illustrating an example of first processing of the master device according to the second embodiment.
Figure 29:
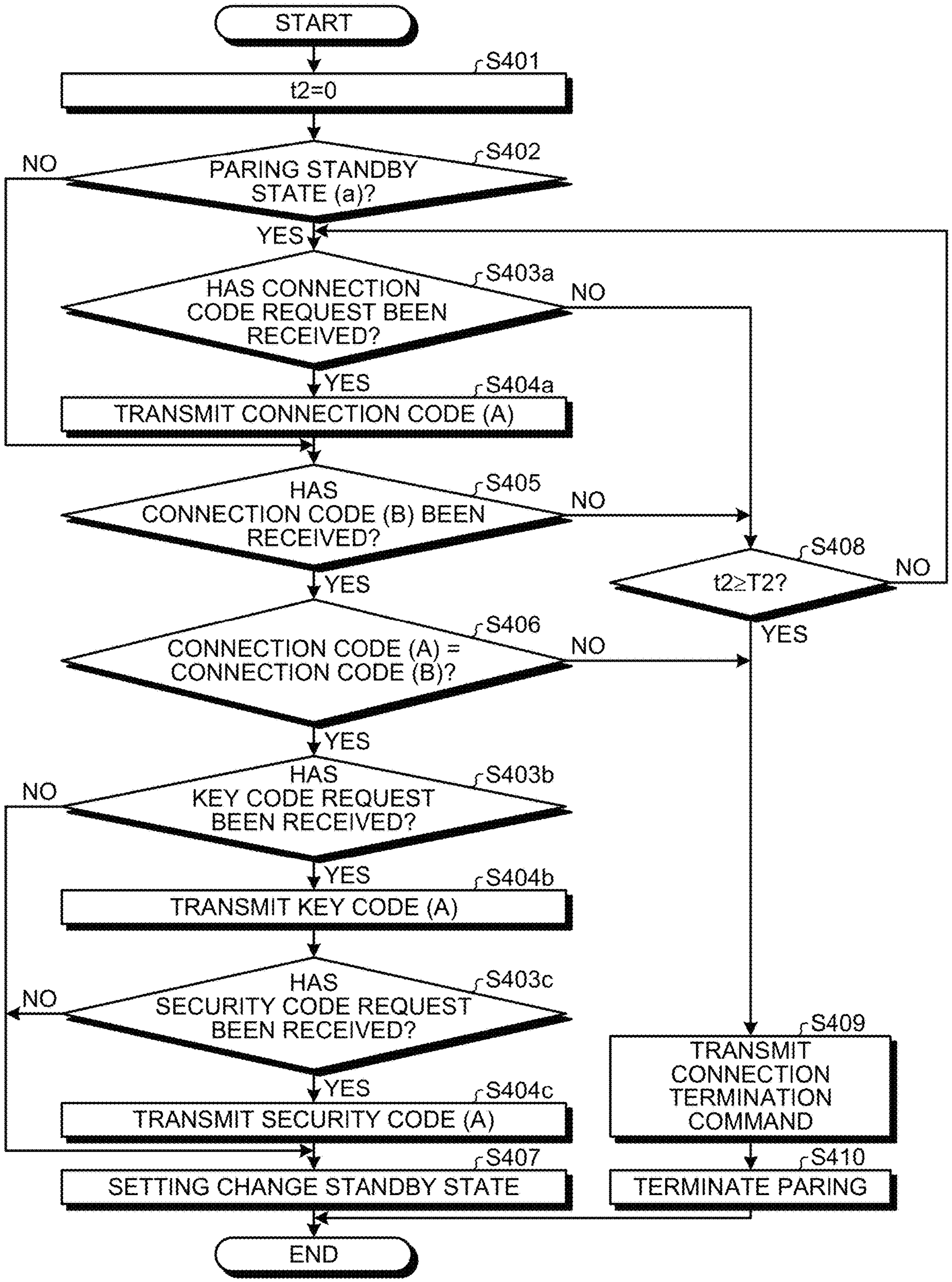
FIG. 29 is a flowchart illustrating an example of first processing of the slave device according to the second embodiment.

FIG. 27A is a first sequence diagram illustrating an example of connection establishment processing in a communication system according to a second embodiment. FIG. 27B is a second sequence diagram illustrating an example of connection establishment processing in the communication system according to the second embodiment. FIG. 27C is a third sequence diagram illustrating an example of connection establishment processing in the communication system according to the second embodiment. FIG. 27D is a fourth sequence diagram illustrating an example of connection establishment processing in the communication system according to the second embodiment. FIG. 28 is a flowchart illustrating an example of first processing of the master device 60 according to the second embodiment. FIG. 29 is a flowchart illustrating an example of first processing of the slave device 50 according to the second embodiment.

Similarly to the first embodiment, the connection establishment processing illustrated in FIGS. 27A, 27B, 27C, and 27D is started based on power-on of the slave device 50. When the slave device 50 is powered on, the activation processing of the slave device 50 is executed (step S100 in FIGS. 27A, 27B, 27C, and 27D). Note that the activation processing of the slave device 50 is the same as the first embodiment, and thus description thereof is omitted. In addition, data transmission-reception processing, second processing of the master device 60, and second processing of the slave device 50 are the same as the first embodiment, and thus description thereof is omitted.

After pairing between the slave device 50 and the master device 60 is executed (step S200 in FIGS. 27A, 27B, 27C, and 27D) and communication connection between the slave device 50 and the master device 60 is established, the first processing of the master device 60 illustrated in FIG. 28 and the first processing of the slave device 50 illustrated in FIG. 29 are executed.

In the first processing of the master device 60 illustrated in FIG. 28, the master device 60 activates a first timer t1 (t1=0; step S301) and transmits a connection code request to the slave device 50 for requesting the transmission of connection code (A) (step S302*a*).

Meanwhile, in the first processing of the slave device 50 illustrated in FIG. 20, the slave device 50 activates a second timer t2 (t2=0; step S401) and determines whether the slave device 50 is in pairing standby state (a) (step S402). Specifically, it is determined whether the above-described activation processing is the initial activation processing after factory shipment or after initialization of the slave device 50.

In a case where the slave device 50 is in pairing standby state (a) (Yes at step S402), in other words, in a case where the above-described activation processing is the initial activation processing after factory shipment or after initialization of the slave device 50, the slave device 50 determines whether the connection code request transmitted from the master device 60 has been received (step S403*a*). In a case where the connection code request has been received (Yes at step S403*a*), the slave device 50 reads connection code (A) (first connection code) stored in the first storage 51 and transmits the connection code (A) to the master device 60 (step S404*a*).

The master device 60 determines whether the connection code (A) transmitted from the slave device 50 has been received (step S303*a*). In a case where the connection code (A) has been received from the slave device 50 (Yes at step S303*a*), the master device 60 stores the received connection code (A) (first connection code) as connection code (B) (second connection code) in the second storage 61 (step S304*a*).

Subsequently, the master device 60 determines whether the first timer t1 is equal to or larger than a first timer threshold T1 (for example, 10 [sec]) (step S305). In a case where the first timer t1 is smaller than the first timer threshold T1 (No at step S305), the master device 60 repeatedly executes the processing at and after step S302*a* and transmits connection code (B) (second connection code) to the slave device 50 when the first timer t1 has become equal to or larger than the first timer threshold T1 (step S306).

In a case where the connection code request transmitted from the master device 60 has not been received (No at step S403*a*) or in a case where connection code (B) has not been received from the master device 60 (No at step S405), the slave device 50 determines whether the second timer t2 is equal to or larger than a second timer threshold T2 (for example, 10 [sec]) (step S408). In a case where the second timer t2 is smaller than the second timer threshold T2 (No at step S408), the slave device 50 repeatedly executes the processing at and after step S403*a*.

The slave device 50 determines whether the connection code (B) transmitted from the master device 60 has been received (step S405). In a case where the connection code (B) has been received from the master device 60 (Yes at step S405), the slave device 50 reads connection code (A) (first connection code) stored in the first storage 51 and determines whether the connection code (A) (first connection code) and the connection code (B) (second connection code) received from the master device 60 match (connection code (A)=connection code (B); step S406).

In a case where the connection code (A) (first connection code) and the connection code (B) (second connection code) match (Yes at step S406), the slave device 50 transitions to step S403*b*.

In a case where the second timer t2 is equal to or larger than the second timer threshold T2 (Yes at step S408) or connection code (A) (first connection code) and connection code (B) (second connection code) do not match (No at step S406), the slave device 50 transmits, to the master device 60, a connection termination command for terminating pairing between the slave device 50 and the master device 60 (step S409).

The master device 60 determines whether the connection termination command transmitted from the slave device 50 has been received (step S307).

In a case where the connection termination command has been transmitted from the slave device 50 (step S409) and the master device 60 has received the connection termination command from the slave device 50 (Yes at step S307), pairing between the slave device 50 and the master device 60 is terminated (step S309 and step S410) to end the first processing of the master device 60 illustrated in FIG. 19 and the first processing of the slave device 50 illustrated in FIG. 20.

In a case where the connection termination command has not been received from the slave device 50 (No at step S307), the master device 60 subsequently transmits a key code request for requesting the slave device 50 to transmit key code (A) (step S302*b*).

In a case where the key code request has been received (Yes at step S403*b*), the slave device 50 reads key code (A) (first key code) stored in the first storage 51 and transmits the key code (A) to the master device 60 (step S404*b*).

The master device 60 determines whether the key code (A) transmitted from the slave device 50 has been received (step S303*b*). In a case where the key code (A) has been received from the slave device 50 (Yes at step S303*b*), the master device 60 stores the received key code (A) (first key code) as key code (B) (second key code) in the second storage 61 (step S304*b*).

Subsequently, the master device 60 transmits a security code request to the slave device 50 for requesting the transmission of security code (A) (step S302*c*).

The slave device 50 determines whether the security code request transmitted from the master device 60 has been received (step S403*c*). In a case where the security code request has been received from the master device 60 (Yes at step S403*c*), the slave device 50 reads security code (A) (first security code) stored in the first storage 51, transmits the security code (A) to the master device 60 (step S404*c*), and transitions to a standby state. Specifically, for example, in a case where the slave device 50 is the illumination device 1 according to the embodiment, the slave device 50 transitions to a setting change standby state for various setting values (in the present disclosure, light distribution values) of the illumination device 1 and the like (step S407) to end the first processing of the slave device 50 illustrated in FIG. 29.

The master device 60 determines whether the security code (A) transmitted from the slave device 50 has been received (step S303*c*). In a case where the security code (A) has been received from the slave device 50 (Yes at step S303*c*), stores the received security code (A) (first security code) as security code (B) (second security code) in the second storage 61 (step S304*c*), and transitions to a standby state. Specifically, for example, in a case where the master device 60 is the control device 200 for controlling the illumination device 1 according to the embodiment, the master device 60 transitions to an operation standby state for various setting values (in the present disclosure, light distribution values) of the illumination device 1 and the like (step S308) to end the first processing of the master device 60 illustrated in FIG. 28.

In a case where the slave device 50 is in pairing standby state (b) (No at step S402), in other words, in a case where the above-described activation processing is the second or subsequent activation processing after factory shipment or after initialization of the slave device 50, the slave device 50 transitions to step S405 and determines whether connection code (B) transmitted from the master device 60 has been received. Subsequent processing is the same as in the case where the slave device 50 is in pairing standby state (a).

In the connection establishment processing of the second embodiment, connection code (A) (first connection code) retained by the slave device 50 and connection code (B) (second connection code) received from the master device 60 are subjected to match determination, and exchange of key codes and security codes is executed in a case where the codes match. In other words, in a case where connection code (A) (first connection code) retained by the slave device 50 and connection code (B) (second connection code) received from the master device 60 do not match, communication connection between the slave device 50 and the master device 60 is disconnected without executing exchange of key codes and security codes.

Accordingly, in the connection establishment processing, in "a case where the master device 60 currently executing the connection establishment processing is different from the master device 60 having previously executed the connection establishment processing including the initial activation processing after factory shipment or after initialization of the slave device 50", it is possible to reduce the amount of communication until communication connection between the slave device 50 and the master device 60 is disconnected in a case where connection code (A) (first connection code) retained by the slave device 50 and connection code (B) (second connection code) received from the master device 60 do not match.

The preferable embodiments of the present disclosure are described above, but the present disclosure is not limited to the embodiments. Contents disclosed in the embodiments are merely exemplary and may be modified in various kinds of manners without departing from the scope of the present disclosure. Appropriate modifications made without departing from the scope of the present disclosure naturally belong to the technical scope of the present disclosure.

What is claimed is:

1. A communication system comprising:

a slave device; and a master device configured to control the slave device, the communication system being configured to transmit and receive control data between the master device and the slave device, wherein the slave device generates a first key code and a first security code in which a plurality of random number data corresponding to respective address data are assigned, in first processing after communication connection between the slave device and the master device is established, the slave device transmits the first key code and the first security code to the master device, and the master device retains the first key code as a second key code and retains the first security code as a second security code, and in second processing after the first processing, the master device transmits an address code and a second code to the slave device, the address code being generated based on the second security code, the second code being generated based on the address code and the second key code, and the slave device terminates the communication connection with the master device in a case where a first code and the second code received from the master device do not match, the first code being generated based on the address code, the first key code, and the first security code.

2. The communication system according to claim 1, wherein in the second processing, the master device selects a plurality of address data from the second security code to generate the address code, extracts, from the second security code, random number data corresponding to the respective address data included in the address code, generates a second selected security code in which the extracted random number data are arranged in a selection order of address data, and performs an XOR operation on the second selected security code using the second key code to calculate the second code, and in an arrangement order of the address data included in the address code received from the master device, the slave device extracts random number data corresponding to the respective address data from the first security code to generate a first selected security code and performs an XOR operation on the first selected security code using the first key code to calculate the first code.

3. The communication system according to claim 2, wherein a plurality of random number data defined by a row-direction address and a column-direction address are two-dimensionally arrayed in the first security code and the second security code, and each of the address data included in the address code is data combining the row-direction address and the column-direction address.

4. The communication system according to claim 3, wherein each of the random number data constituting the first security code and the second security code is a 1-byte code.

5. The communication system according to claim 4, wherein the first key code and the first selected security code are codes of a same length, and the second key code and the second selected security code are codes of a same length.

6. The communication system according to claim 5, wherein the first key code and the first selected security code are 4-byte codes, and the second key code and the second selected security code are 4-byte codes.

7. The communication system according to claim 1, wherein the slave device further generates a first connection code, and in the first processing, the slave device transmits the first connection code to the master device, the master device retains, as a second connection code, the first connection code received from the slave device, the master device transmits the second connection code to the slave device, and the slave device terminates the communication connection with the master device in a case where the first connection code and the second connection code received from the master device do not match.

8. The communication system according to claim 7, wherein the slave device generates the first connection code, the first key code, and the first security code in initial activation processing.

9. The communication system according to claim 8, wherein the slave device includes a first storage configured to store the first connection code, the first key code, and the first security code generated in the initial activation processing, and the master device includes a second storage configured to store the second connection code, the second key code, and the second security code.

10. The communication system according to claim 9, wherein in the first processing, the slave device transmits, to the master device, the first connection code, the first key code, and the first security code read from the first storage, and the master device stores, as the second connection code in the second storage, the first connection code received from the slave device, stores, as the second key code in the second storage, the first key code received from the slave device, and stores the first security code as the second security code in the second storage.

11. The communication system according to claim 10, wherein in the first processing, the master device reads the second connection code stored in the second storage and transmits the read second connection code to the slave device, and the slave device reads the first connection code stored in the first storage and terminates the communication connection with the master device in a case where the first connection code and the second connection code received from the master device do not match.

12. The communication system according to claim 11, wherein the slave device transmits the first key code and the first security code to the master device in a case where the first connection code and the second connection code match.

13. An illumination system comprising:

a light source;

an illumination device provided on an optical axis of the light source and including an optical element capable of setting a light distribution state of light emitted from the light source; and a control device capable of changing the light distribution state, wherein the illumination device generates a first key code and a first security code in which a plurality of random number data corresponding to respective address data are assigned, in first processing after communication connection between the illumination device and the control device is established, the illumination device transmits the first key code and the first security code to the control device, the control device retains the first key code as a second key code and retains the first security code as a second security code, and in second processing after the first processing, the control device transmits an address code and a second code to the illumination device, the address code being generated based on the second security code, the second code being generated based on the address code and the second key code, and the illumination device terminates the communication connection with the control device in a case where a first code and the second code received from the control device do not match, the first code being generated based on the address code, the first key code, and the first security code.

14. The illumination system according to claim 13, wherein in the second processing, the control device selects a plurality of address data from the second security code to generate the address code, extracts, from the second security code, random number data corresponding to the respective address data included in the address code, generates a second selected security code in which the extracted random number data are arranged in a selection order of address data, and performs an XOR operation on the second selected security code using the second key code to calculate the second code, and in an arrangement order of the address data included in the address code received from the control device, the illumination device extracts random number data corresponding to the respective address data from the first security code to generate a first selected security code and performs an XOR operation on the first selected security code using the first key code to calculate the first code.

15. The illumination system according to claim 14, wherein a plurality of random number data defined by a row-direction address and a column-direction address are two-dimensionally arrayed in the first security code and the second security code, and each of the address data included in the address code is data combining the row-direction address and the column-direction address.

16. The illumination system according to claim 15, wherein each of the random number data constituting the first security code and the second security code is a 1-byte code.

17. The illumination system according to claim 16, wherein the first key code and the first selected security code are codes of a same length, and the second key code and the second selected security code are codes of a same length.

18. The illumination system according to claim 17, wherein the first key code and the first selected security code are 4-byte codes, and the second key code and the second selected security code are 4-byte codes.

19. The illumination system according to claim 13, wherein the illumination device further generates a first connection code, and in the first processing, the illumination device transmits the first connection code to the control device, the control device retains, as a second connection code, the first connection code received from the illumination device, the control device transmits the second connection code to the illumination device, and the illumination device terminates the communication connection with the control device in a case where the first connection code and the second connection code received from the control device do not match.

20. A communication method of transmitting and receiving control data between a slave device and a master device configured to control the slave device, the communication method comprising:

a first step of generating, by the slave device, a first key code and a first security code in which a plurality of random number data corresponding to respective address data are assigned; and after communication connection between the slave device and the master device is established, a second step of transmitting, by the slave device, the first key code and the first security code to the master device;

a third step of retaining, by the master device, the first key code as a second key code and retaining the first security code as a second security code;

a fourth step of transmitting, by the master device, an address code and a second code to the slave device, the address code being generated based on the second security code, the second code being generated based on the address code and the second key code; and a fifth step of terminating, by the slave device, the communication connection with the master device in a case where a first code and the second code received from the master device do not match, the first code being generated based on the address code, the first key code, and the first security code.

* * * * *